US012707055B2

(12) United States Patent
Zhu et al.

(10) Patent No.: US 12,707,055 B2
(45) Date of Patent: Aug. 11, 2026

(54) METHODS OF CODING IMAGES/VIDEOS WITH ALPHA CHANNELS

(71) Applicant: Lemon Inc., Grand Cayman (KY)

(72) Inventors: Weijia Zhu, Los Angeles, CA (US); Jizheng Xu, Los Angeles, CA (US); Li Zhang, Los Angeles, CA (US); Yue Wang, Beijing (CN)

(73) Assignee: LEMON INC., Grand Cayman (KY)

( * ) Notice: Subject to any disclaimer, the term of this patent is extended or adjusted under 35 U.S.C. 154(b) by 0 days.

(21) Appl. No.: 17/187,670

(22) Filed: Feb. 26, 2021

(65) Prior Publication Data

US 2022/0279185 A1 Sep. 1, 2022

(51) Int. Cl.

| | |
|---|---|
| ***H04N 19/13*** | (2014.01) |
| ***H04N 19/105*** | (2014.01) |
| ***H04N 19/117*** | (2014.01) |
| ***H04N 19/132*** | (2014.01) |
| ***H04N 19/169*** | (2014.01) |
| ***H04N 19/176*** | (2014.01) |
| ***H04N 19/186*** | (2014.01) |
| ***H04N 19/82*** | (2014.01) |

(52) U.S. Cl.

CPC ........... *H04N 19/13* (2014.11); *H04N 19/105* (2014.11); *H04N 19/117* (2014.11); *H04N 19/132* (2014.11); *H04N 19/176* (2014.11); *H04N 19/186* (2014.11); *H04N 19/1883* (2014.11); *H04N 19/82* (2014.11)

(58) Field of Classification Search

CPC ...... H04N 19/30; H04N 19/70; H04N 19/187; H04N 19/172; H04N 19/597; H04N 19/46; H04N 19/33; H04N 19/186; H04N 21/234327; H04N 19/176; H04N 19/169; H04N 19/174; H04N 19/61

See application file for complete search history.

(56) References Cited

U.S. PATENT DOCUMENTS 7,414,632 B1 * 8/2008 Piazza ...................... G09G 5/14 345/592
8,294,823 B2 * 10/2012 Ciudad .................. H04N 7/147 348/14.08
9,854,235 B2 * 12/2017 Wang ..................... H04N 19/91
10,681,348 B2 * 6/2020 Hinz ...................... H04N 19/59
11,012,489 B2 * 5/2021 Huang ................. H04N 19/172

(Continued)

OTHER PUBLICATIONS

Non-Final Office Action for U.S. Appl. No. 17/187,667, mailed on Mar. 13, 2025, 11 pages.

(Continued)

*Primary Examiner* — Daniel Chang

(74) *Attorney, Agent, or Firm* — Astute IP Law Group

(57) ABSTRACT

Example implementations include a method, apparatus and computer-readable medium of video coding, comprising determining, for a conversion between a video comprising a plurality of pictures and a bitstream of the video, first layer information which is utilized in a first process performed on a first layer of each picture. The implementations further include determining, second layer information which is utilized in a second process performed on a second layer of each picture. Additionally, the implementations further include performing the conversion for the second layer based on the first layer information and the second layer information.

18 Claims, 37 Drawing Sheets

(56) References Cited

U.S. PATENT DOCUMENTS

2003/0138043 A1* 7/2003 Hannuksela ......... H04N 19/587 375/E7.146
2003/0142751 A1* 7/2003 Hannuksela ......... H04N 19/142 375/E7.076
2005/0134739 A1* 6/2005 Bian .................. H04N 21/4316 348/600
2007/0014348 A1* 1/2007 Bao ........................ H04N 19/29 375/240.1
2007/0160133 A1* 7/2007 Bao ...................... H04N 19/159 375/E7.17
2007/0201551 A1* 8/2007 Wang ..................... H04N 19/46 375/240.1
2008/0080620 A1* 4/2008 Lee ........................ H04N 19/61 375/E7.186
2008/0211901 A1* 9/2008 Civanlar ................ H04N 19/61 348/14.09
2009/0252229 A1* 10/2009 Cieplinski ............ H04N 19/139 375/E7.123
2010/0020871 A1* 1/2010 Hannuksela ........... H04N 19/34 375/E7.076
2010/0098156 A1* 4/2010 Karczewicz ........... H04N 19/13 375/E7.076
2012/0044322 A1* 2/2012 Tian ....................... H04N 19/70 348/E13.001
2012/0099831 A1* 4/2012 Wada ..................... H04N 5/765 386/E5.069
2012/0154530 A1* 6/2012 Yamada ............... H04N 13/183 348/E13.064
2013/0208792 A1* 8/2013 He ....................... H04N 19/105 375/240.12
2013/0329806 A1* 12/2013 Tu .......................... H04N 19/61 375/240.18
2014/0003505 A1* 1/2014 Lainema ................ H04N 19/30 375/240.12
2014/0063043 A1* 3/2014 Mahe ....................... G09G 5/04 345/592
2014/0064365 A1* 3/2014 Wang ..................... H04N 19/30 375/240.12
2014/0086329 A1* 3/2014 Seregin .................. H04N 19/56 375/240.16
2014/0092985 A1* 4/2014 Kim ..................... H04N 19/436 375/E7.027
2014/0140399 A1* 5/2014 Seregin ................ H04N 19/187 375/240.12
2014/0192880 A1* 7/2014 Deng ................... H04N 19/513 375/240.16
2014/0247878 A1* 9/2014 Xu ......................... H04N 19/36 375/240.16
2014/0254681 A1 9/2014 Aminlou et al.
2015/0016531 A1 1/2015 Hannuksela
2015/0098510 A1* 4/2015 Ye ........................ H04N 19/597 375/240.16
2015/0103927 A1* 4/2015 Hannuksela ......... H04N 19/159 375/240.26
2015/0156501 A1* 6/2015 Hannuksela ........... H04N 19/70 375/240.12
2015/0195566 A1* 7/2015 Hinz ...................... H04N 19/52
2015/0195573 A1* 7/2015 Aflaki Beni ......... H04N 19/513 375/240.16
2015/0222913 A1* 8/2015 Sato ....................... H04N 19/80 375/240.25
2015/0237323 A1* 8/2015 Du ........................ G06T 1/0028 348/43
2015/0245063 A1* 8/2015 Rusanovskyy ...... H04N 19/597 375/240.12
2015/0264404 A1* 9/2015 Hannuksela ........... H04N 19/30 375/240.16
2015/0304665 A1* 10/2015 Hannuksela ........... H04N 19/30 375/240.02
2015/0309687 A1* 10/2015 Herigstad ............ H04N 21/478 715/784
2015/0312580 A1* 10/2015 Hannuksela ............ G06F 9/268 375/240.02
2015/0326883 A1* 11/2015 Rosewarne .......... H04N 19/136 375/240.18
2015/0350671 A1* 12/2015 Alshin ................... H04N 19/13 375/240.15
2016/0014425 A1* 1/2016 Hinz .................... H04N 19/615
2016/0073124 A1* 3/2016 Mrak ..................... H04N 19/21 375/240.12
2016/0112648 A1* 4/2016 Liu ........................ H04N 5/275 348/586
2016/0156917 A1* 6/2016 Ugur ...................... H04N 19/70 375/240.08
2016/0165248 A1* 6/2016 Lainema ................ H04N 19/70 375/240.08
2016/0165262 A1* 6/2016 Rusanovskyy ........ H04N 19/44 375/240.25
2016/0212439 A1* 7/2016 Hannuksela ........... H04N 19/46
2016/0234499 A1* 8/2016 Chuang .................. H04N 19/70
2016/0249108 A1* 8/2016 Sexton ............... H04N 21/4622
2016/0381385 A1* 12/2016 Ugur .................... H04N 19/136 375/240.12
2017/0019673 A1* 1/2017 Tsukuba ................. H04N 19/30
2017/0034519 A1* 2/2017 Rosewarne ............ H04N 19/85
2017/0064313 A1* 3/2017 Wu ........................ H04N 19/70
2017/0332085 A1* 11/2017 Ramasubramonian ..................... H04N 19/167
2018/0020204 A1* 1/2018 Pang ...................... H04N 23/90
2018/0124419 A1* 5/2018 He ....................... H04N 19/105
2018/0131951 A1 5/2018 Hannuksela
2018/0139469 A1* 5/2018 Lainema .............. H04N 19/105
2019/0141339 A1* 5/2019 Madajczak ........... G06T 15/005
2019/0149792 A1* 5/2019 Luo ........................... G06T 5/50 348/571
2019/0182504 A1* 6/2019 Lainema ................ H04N 19/56
2019/0222623 A1* 7/2019 Huang ................. H04N 19/172
2020/0099942 A1* 3/2020 Tourapis .............. H04N 19/176
2020/0267388 A1* 8/2020 Lainema .............. H04N 19/176
2020/0322599 A1 10/2020 Chuang et al.
2020/0351484 A1* 11/2020 Aflaki ....................... G06T 7/41
2021/0136395 A1* 5/2021 Jun ...................... H04N 19/186
2021/0211716 A1 7/2021 Zhang et al.
2022/0021900 A1 1/2022 Jeong
2022/0159226 A1* 5/2022 Wang ..................... H04N 19/44
2022/0279185 A1* 9/2022 Zhu ........................ H04N 19/82
2023/0090481 A1 3/2023 Ustarroz-Calonge et al.
2023/0388534 A1 11/2023 Ustarroz-Calonge et al.
2024/0031608 A1* 1/2024 Wang ..................... H04N 19/46
2024/0040157 A1* 2/2024 Wang ................... H04N 19/597
2024/0357181 A1* 10/2024 Lu ........................ H04N 19/597
2025/0106436 A1* 3/2025 Wenger .................. H04N 19/86
2025/0106437 A1* 3/2025 Wenger ................ H04N 19/172

OTHER PUBLICATIONS

Notice of Allowance received for U.S. Appl. No. 17/187,667, mailed on Aug. 27, 2025, 9 pages.

* cited by examiner

600

| VPS VPS_extension 608(1) |
| --- |
| Base layer SPS 608(2) |
| Alpha layer SPS 608(3) |
| Base layer PPS 608(4) |
| Alpha layer PPS 608(5) |
| Base layer NAL units 608(6) |
| Alpha layer NAL units 608(7) |
| Alpha_channel_information SEI 608(8) |

700

| NAL unit for VPS 702(1) | NAL unit for SPS0 702(2) | NAL unit for SPS1 702(3) | NAL unit for PPS0 702(4) | NAL unit for PPS1 702(5) | NAL unit for SEI 702(6) | NAL unit for slice 0 in layer 0 702(7) | NAL unit for slice 0 in layer 1 702(8) | NAL unit for slice 1 in layer 0 702(9) | NAL unit for slice 1 in layer 1 702(3) | … | … | NAL unit for slice N in layer 0 702(N-1) | NAL unit for slice N in layer 1 702(N) |
|---|---|---|---|---|---|---|---|---|---|---|---|---|---|

1400

1600

1602

2100

2400

2402

Performing a conversion between a video comprising a plurality of pictures and a bitstream of the video, wherein each picture comprises an alpha layer and at least one base layer, wherein the bitstream comprises first layer information which is utilized in a first process performed on the at least one base layer and second layer information which is utilized in a second process performed on the alpha layer

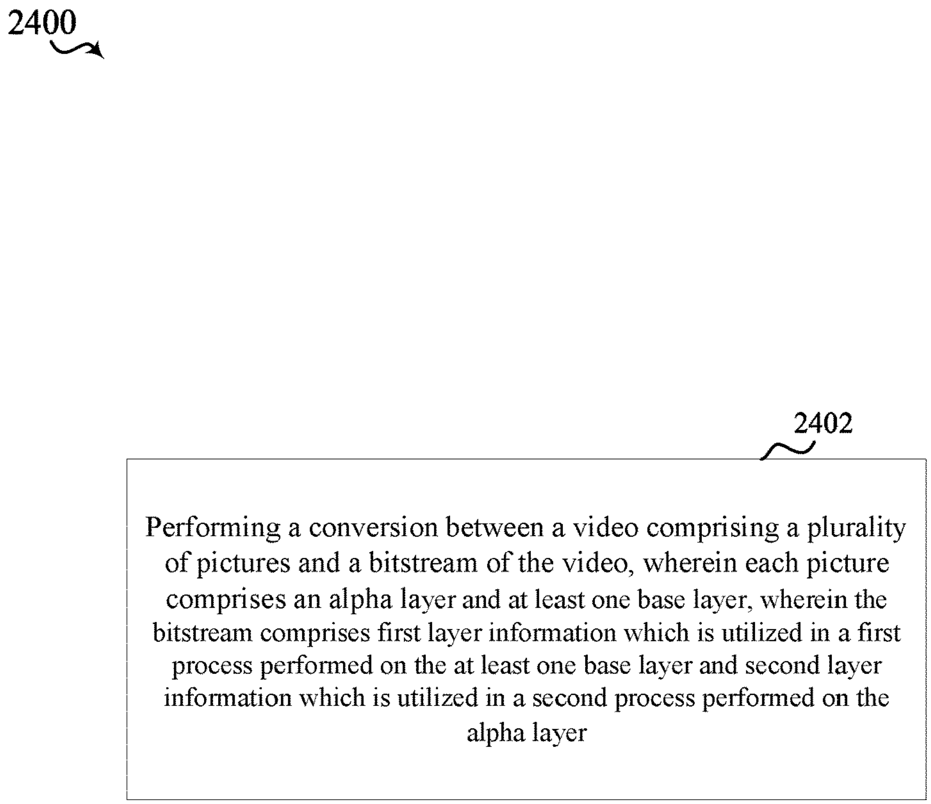

Performing a single-pass conversion between a video comprising a plurality of pictures and a bitstream of the video, wherein each picture comprises an alpha layer and at least one base layer; wherein the bitstream comprises a plurality of units interleaved with the channel information, the plurality of units and channel information determined during the single-pass conversion

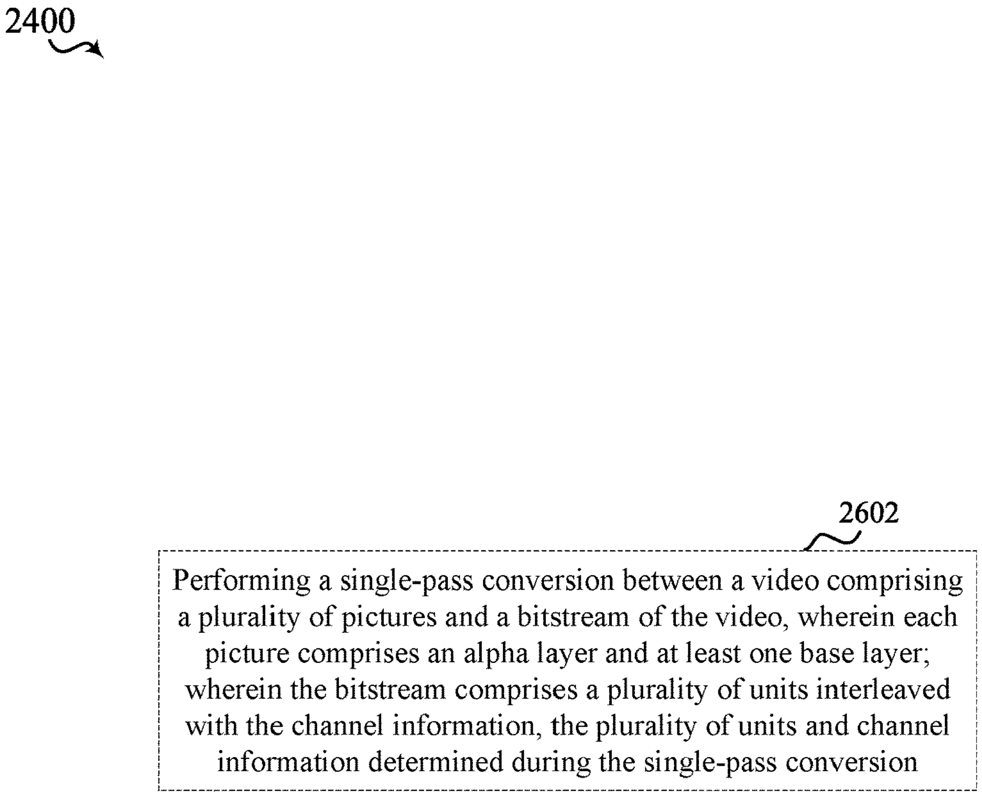

Determining a context modeling for context-based adaptive binary arithmetic coding (CABAC) based on the first block information, wherein the context modeling based on the first block information is used for coding a second block in the second layer

2800

3002

Determining prediction information based on a portion of the first layer information associated with a luma component of the first layer; and wherein the second layer information is determined based on the prediction information

3300

3302

Performing a conversion between a video comprising a plurality of pictures and a bitstream of the video, wherein each picture comprises a first layer and a second layer; wherein first layer information which is utilized in a first process performed on a first layer and second layer information which is utilized in a second process performed on a second layer are included in the bitstream; and wherein the second process comprises a reconstruction in which a second block in the second layer is reconstructed based on the samples of at least a first block in the first layer

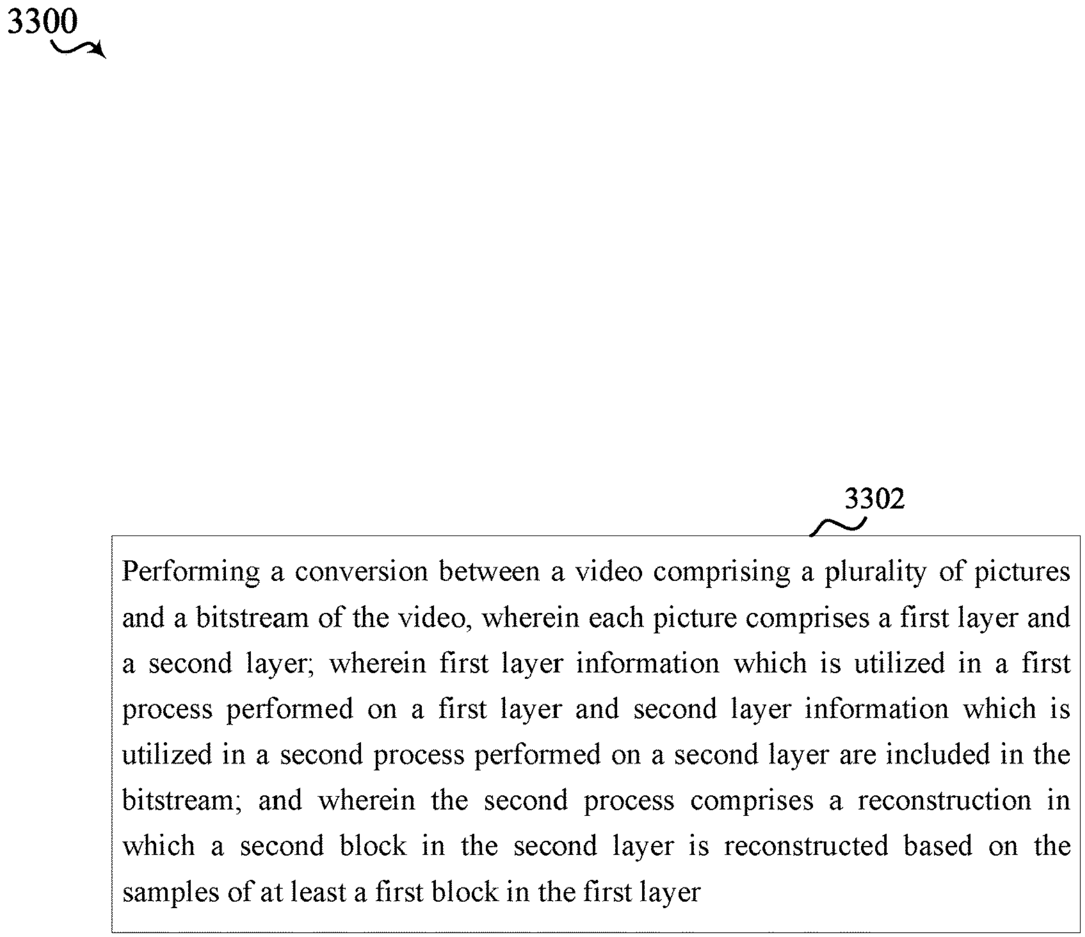

Performing a conversion between a video comprising a plurality of pictures and a bitstream of the video, wherein each picture comprises an alpha layer and a base layer, wherein the bitstream comprises a current block in the alpha layer of a current picture that is predicted from one or more reference blocks in the base layer

3500

3602

Determining a predicted motion vector of the current block, and wherein the current block is determined using a motion vector difference based on the predicted motion vector and an actual motion vector

METHODS OF CODING IMAGES/VIDEOS WITH ALPHA CHANNELS

CROSS-REFERENCE TO RELATED APPLICATION(S)

This application is related to co-pending U.S. application Ser. No. 17/187,667 to Zhu et al., "Methods of Coding Images/Videos with Alpha Channels," filed herewith, and co-pending U.S. Application Ser. No. 17/187,674 to Zhu et al., "Methods of Coding Images/Videos with Alpha Channels," filed herewith. Both of these applications are hereby incorporated by reference in their entirety.

BACKGROUND

The present disclosure relates generally to video coding, and more particularly, to video encoding and decoding of an alpha layer.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method of video processing, comprising performing a conversion between a video comprising a plurality of pictures and a bitstream of the video, wherein each picture comprises an alpha layer and at least one base layer, wherein the bitstream comprises first layer information which is utilized in a first process performed on the at least one base layer and second layer information which is utilized in a second process performed on the alpha layer.

Another example implementation includes an apparatus for processing video data comprising a processor and a non-transitory memory with instructions thereon, wherein the instructions upon execution by the processor, cause the processor to perform a conversion between a video comprising a plurality of pictures and a bitstream of the video, wherein each picture comprises an alpha layer and at least one base layer, wherein the bitstream comprises first layer information which is utilized in a first process performed on the at least one base layer and second layer information which is utilized in a second process performed on the alpha layer.

Another example implementation includes a non-transitory computer-readable recording medium storing a bitstream of a video which is generated by a method performed by a video processing apparatus, wherein the method comprises: generating a bitstream of the video from the video comprising a plurality of picture, wherein each picture comprises an alpha layer and at least one base layer, wherein the bitstream comprises first layer information which is utilized in a first process performed on the at least one base layer and second layer information which is utilized in a second process performed on the alpha layer.

Another example implementation includes a non-transitory computer-readable medium storing instructions that cause a processor to perform a conversion between a video comprising a plurality of pictures and a bitstream of the video, wherein each picture comprises an alpha layer and at least one base layer, wherein the bitstream comprises first layer information which is utilized in a first process performed on the at least one base layer and second layer information which is utilized in a second process performed on the alpha layer.

An example implementation includes a method of video processing, comprising determining, for a conversion between a video comprising a plurality of pictures and a bitstream of the video, first layer information which is utilized in a first process performed on a first layer of each picture; and determining, second layer information which is utilized in a second process performed on a second layer of each picture. Additionally, the method further includes performing the conversion for the second layer based on the first layer information and the second layer information.

Another example implementation includes an apparatus for processing video data comprising a processor and a non-transitory memory with instructions thereon, wherein the instructions upon execution by the processor, cause the processor to determine, for a conversion between a video comprising a plurality of pictures and a bitstream of the video, first layer information which is utilized in a first process performed on a first layer of each picture; determine, second layer information which is utilized in a second process performed on a second layer of each picture; and perform the conversion for the second layer based on the first layer information and the second layer information; and perform the conversion for the second layer based on the first layer information and the second layer information.

Another example implementation includes a non-transitory computer-readable recording medium storing a bitstream of a video which is generated by a method performed by a video processing apparatus, wherein the method comprises: determining, for a conversion between a video comprising a plurality of pictures and a bitstream of the video, first layer information which is utilized in a first process performed on a first layer of each picture; determining, second layer information which is utilized in a second process performed on a second layer of each picture; and generating a bitstream of the video from the video comprises the second layer based on the first layer information and the second layer information, wherein the first layer information and the second layer information is utilized for the second layer.

Another example implementation includes a non-transitory computer-readable medium storing instructions that cause a processor to determine, for a conversion between a video comprising a plurality of pictures and a bitstream of the video, first layer information which is utilized in a first process performed on a first layer of each picture; determine, second layer information which is utilized in a second process performed on a second layer of each picture; and perform the conversion for the second layer based on the first layer information and the second layer information.

An example implementation includes a method for video decoding, comprising: performing a conversion between a video comprising a plurality of pictures and a bitstream of the video, wherein each picture comprises a first layer and a second layer, wherein first layer information which is utilized in a first process performed on a first layer and second layer information which is utilized in a second process performed on a second layer are included in the bitstream. Additionally, the method further includes wherein the second process comprises a reconstruction in which a second block in the second layer is reconstructed based on the samples of at least a first block in the first layer.

An example implementation includes an apparatus for processing video data comprising a processor and a non-transitory memory with instructions thereon, wherein the instructions upon execution by the processor, cause the processor to perform a conversion between a video comprising a plurality of pictures and a bitstream of the video, wherein each picture comprises a first layer and a second layer; wherein first layer information which is utilized in a first process performed on a first layer and second layer information which is utilized in a second process performed on a second layer are included in the bitstream; and wherein the second process comprises a reconstruction in which a second block in the second layer is reconstructed based on the samples of at least a first block in the first layer.

Another example implementation includes a non-transitory computer-readable recording medium storing a bitstream of a video which is generated by a method performed by a video processing apparatus, wherein the method comprises generating a bitstream of the video from a video comprising a plurality of pictures, wherein each picture comprises a first layer and a second layer; wherein first layer information which is utilized in a first process performed on a first layer and second layer information which is utilized in a second process performed on a second layer are included in the bitstream; and wherein the second process comprises a reconstruction in which a second block in the second layer is reconstructed based on the samples of at least a first block in the first layer.

Another example implementation includes a non-transitory computer-readable storage medium storing instructions that cause a processor to perform a conversion between a video comprising a plurality of pictures and a bitstream of the video, wherein each picture comprises a first layer and a second layer; wherein first layer information which is utilized in a first process performed on a first layer and second layer information which is utilized in a second process performed on a second layer are included in the bitstream; and wherein the second process comprises a reconstruction in which a second block in the second layer is reconstructed based on the samples of at least a first block in the first layer.

Another example implementation includes a non-transitory computer-readable storage medium storing instructions that cause a processor to perform a conversion between a video comprising a plurality of pictures and a bitstream of the video, wherein each picture comprises a first layer and a second layer; wherein first layer information which is utilized in a first process performed on a first layer and second layer information which is utilized in a second process performed on a second layer are included in the bitstream; and wherein the second process comprises a reconstruction in which a second block in the second layer is reconstructed based on the samples of at least a first block in the first layer.

An example implementation includes a method of video processing, comprising performing a conversion between a video comprising a plurality of pictures and a bitstream of the video, wherein each picture comprises an alpha layer and a base layer, wherein the bitstream comprises a current block in the alpha layer of a current picture that is predicted from one or more reference blocks in the base layer.

An example implementation includes an apparatus for processing video data comprising a processor and a non-transitory memory with instructions thereon, wherein the instructions upon execution by the processor, cause the processor to performing a conversion between a video comprising a plurality of pictures and a bitstream of the video, wherein each picture comprises an alpha layer and a base layer, and wherein the bitstream comprises a current block in the alpha layer of a current picture that is predicted from one or more reference blocks in the base layer.

Another example implementation includes a non-transitory computer-readable recording medium storing a bitstream of a video which is generated by a method performed by a video processing apparatus, wherein the method comprises generating the bitstream from the video comprising a plurality of pictures, wherein each picture comprises an alpha layer and a base layer, wherein the bitstream comprises a current block in the alpha layer of a current picture that is predicted from one or more reference blocks in the base layer.

Another example implementation includes a non-transitory computer-readable storage medium storing instructions that cause a processor to performing a conversion between a video comprising a plurality of pictures and a bitstream of the video, wherein each picture comprises an alpha layer and a base layer, wherein the bitstream comprises a current block in the alpha layer of a current picture that is predicted from one or more reference blocks in the base layer.

Another example implementation includes a method for storing bitstream of a video, comprising generating the bitstream from the video comprising a plurality of pictures and the bitstream of the video, wherein each picture comprises an alpha layer and a base layer, wherein the bitstream comprises a current block in the alpha layer of a current picture that is predicted from one or more reference blocks in the base layer; and storing the bitstream in a non-transitory computer-readable recording medium.

To the accomplishment of the foregoing and related ends, the one or more aspects include the features hereinafter fully described and particularly pointed out in the claims. The following description and the annexed drawings set forth in detail some illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 24 is a flowchart of a first example method for video processing, in accordance with some aspects of the present disclosure.

FIG. 26 is a flowchart of a second example method for video processing, in accordance with some aspects of the present disclosure.

FIG. 33 is a flowchart of a seventh example method for video decoding, in accordance with some aspects of the present disclosure.

DETAILED DESCRIPTION

Figure 1:
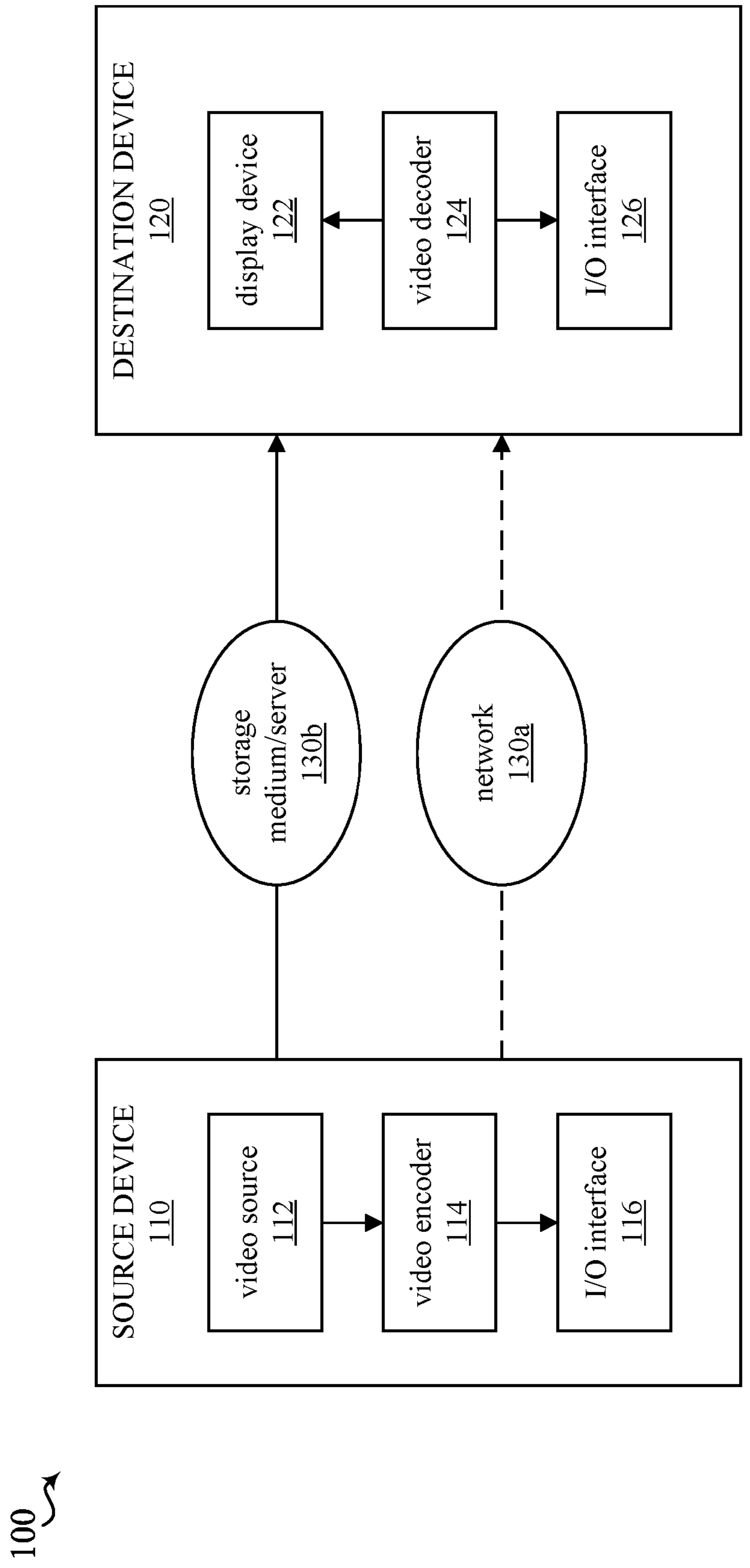
FIG. 1 is a block diagram that illustrates an example video coding system, in accordance with some aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to a person having ordinary skill in the art that these concepts may be practiced without these specific details. In some instances, structures and components are shown in block diagram form in order to avoid obscuring such concepts.

Several aspects of video coding and decoding will now be presented with reference to various apparatus and methods. These apparatus and methods will be described in the following detailed description and illustrated in the accompanying drawings by various blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The present aspects generally relate to the compression of alpha channels in video coding. As described in detail herein, an alpha channel is an additional channel that defines degrees of transparency in images/videos. In some aspects, a plurality of pictures may include a base layer and an alpha layer. Typically, a video coder may employ the same encoding and decoding processes for the base layer and alpha layer. Further, some decoding methods may require sequential decoding of the base layer and the alpha later. Accordingly, processing of alpha channels may be inefficient and suffer from unnecessarily slow encoding and decoding speeds due to the application of ineffective tools and/or processes.

Specifically, the present disclosure relates to enhancements to alpha channel coding, and in particular, leveraging cross-layer correlations between the base layer and the alpha layer, leveraging correlation between different alpha channels, intelligent selection of coding tools based upon the relevant layer, application of different video encoding processes to different layers, and interleaving of information of two different channels. For example, in some aspects, a video coder may disable one or more coding tools that have proven ineffective when coding alpha channels. In another example, a video coder may utilize coding information from a first layer to code a second layer or utilize coding information from a first alpha channel to code another alpha channel to improve prediction accuracy and/or speed. As yet still another example, a video coder may interleave the color channel corresponding to a base layer and an alpha channel to permit efficient decoding of a bitstream.

FIG. 1 is a block diagram that illustrates an example video coding system 100 that may utilize the techniques of this disclosure. As shown in FIG. 1, video coding system 100 may include a source device 110 and a destination device 120. The source device 110, which may be referred to as a video encoding device, generates encoded video data. The destination device 120, which may be referred to as a video decoding device, may decode the encoded video data generated by the source device 110. The source device 110 may include a video source 112, a video encoder 114, and an input/output (I/O) interface 116.

The video source 112 may include a source such as a video capture device, an interface to receive video data from a video content provider, and/or a computer graphics system for generating video data, or a combination of such sources. The video data may comprise one or more pictures. The video encoder 114 encodes the video data from the video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. The (I/O) interface 116 may include a modulator/demodulator (modem) and/or a transmitter. The encoded video data may be transmitted directly to destination device 120 via the (I/O) interface 116 through the network 130*a*. The encoded video data may also be stored onto a storage medium/server 130*b* for access by destination device 120.

The destination device 120 may include an (I/O) interface 126, a video decoder 124, and a display device 122. The (I/O) interface 126 may include a receiver and/or a modem. The (I/O) interface 126 may acquire encoded video data from the source device 110 or the storage medium/server 130*b*. The video decoder 124 may decode the encoded video data. The display device 122 may display the decoded video data to a user. The display device 122 may be integrated with the destination device 120, or may be external to the destination device 120 which be configured to interface with an external display device.

The video encoder 114 and the video decoder 124 may operate according to a video compression standard, such as the High Efficiency Video Coding (HEVC) standard, Versatile Video Coding (VVC) standard and other current and/or further standards.

Figure 2:
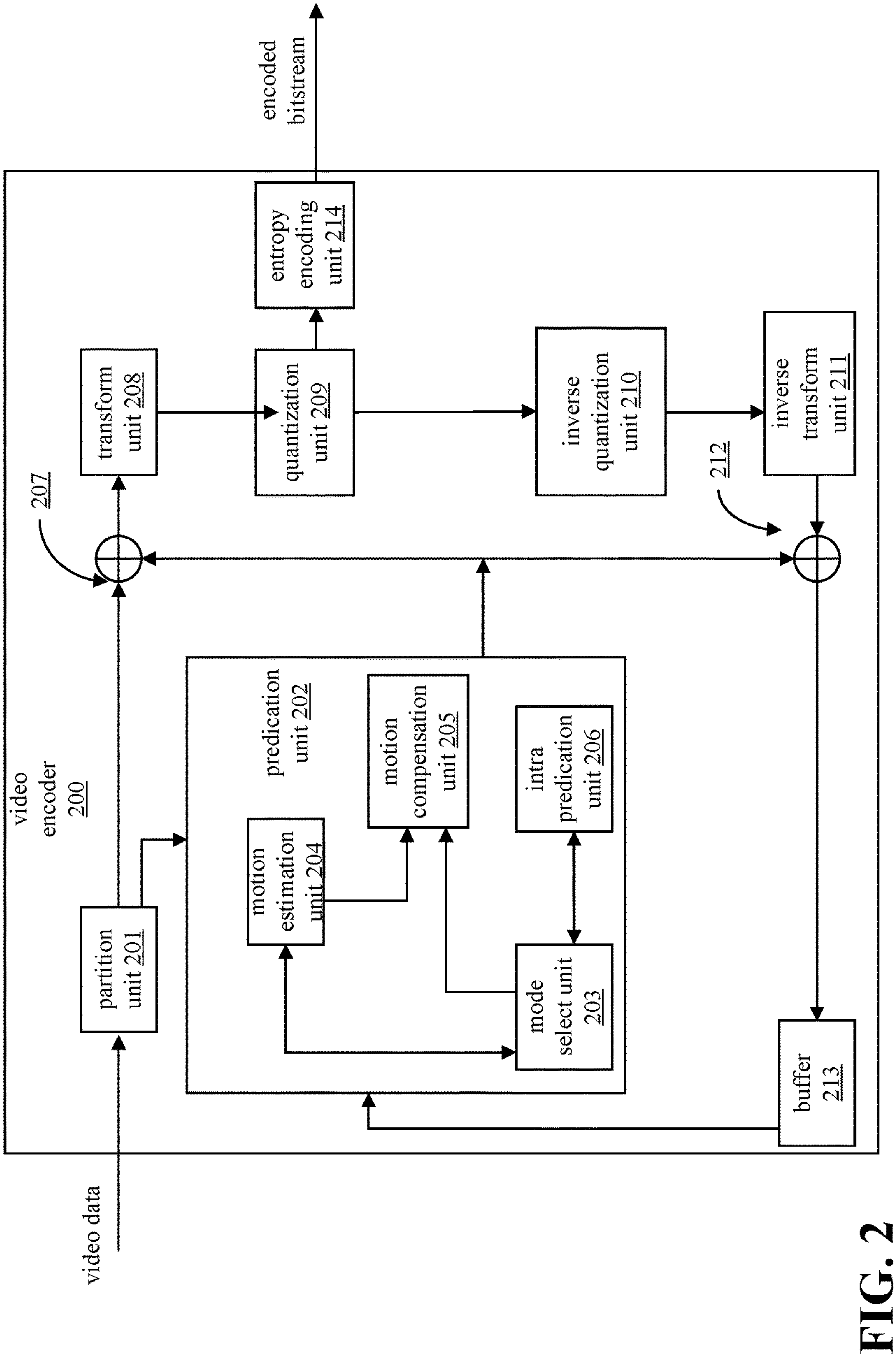
FIG. 2 is a block diagram that illustrates a first example video encoder, in accordance with some aspects of the present disclosure.

FIG. 2 is a block diagram illustrating an example of video encoder 200, which may be an example of the video encoder 114 in the video coding system 100 illustrated in FIG. 1, in accordance with some aspects of the present disclosure.

The video encoder 200 may be configured to perform any or all of the techniques of this disclosure. In the example of FIG. 2, the video encoder 200 includes a plurality of functional components. The techniques described in this disclosure may be shared among the various components of the video encoder 200. In some examples, a processor may be configured to perform any or all of the techniques described in this disclosure.

The functional components of video encoder 200 may include a partition unit 201, a predication unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, the video encoder 200 may include more, fewer, or different functional components. In an example, the predication unit 202 may include an intra block copy (IBC) unit. The IBC unit may perform predication in an IBC mode in which at least one reference picture is a picture where the current video block is located.

Furthermore, some components, such as the motion estimation unit 204 and the motion compensation unit 205, may be highly integrated, but are represented in the example of FIG. 2 separately for purposes of explanation.

The partition unit 201 may partition a picture into one or more video blocks. The video encoder 200 and the video decoder 300 may support various video block sizes.

The mode select unit 203 may select one of the coding modes, intra or inter, e.g., based on error results, and provide the resulting intra-or inter-coded block to a residual generation unit 207 to generate residual block data and to a reconstruction unit 212 to reconstruct the encoded block for use as a reference picture. In some example, the mode select unit 203 may select a combination of intra and inter predication (CIIP) mode in which the predication is based on an inter predication signal and an intra predication signal. The mode select unit 203 may also select a resolution for a motion vector (e.g., a sub-pixel or integer pixel precision) for the block in the case of inter-predication.

To perform inter prediction on a current video block, the motion estimation unit 204 may generate motion information for the current video block by comparing one or more reference frames from buffer 213 to the current video block. The motion compensation unit 205 may determine a predicted video block for the current video block based on the motion information and decoded samples of pictures from the buffer 213 other than the picture associated with the current video block.

The motion estimation unit 204 and the motion compensation unit 205 may perform different operations for a current video block, for example, depending on whether the current video block is in an I-slice, a P-slice, or a B-slice. As used herein, in some aspect, an "I-slice" may refer to a portion of a picture composed of macroblocks, all of which are based upon macroblocks within the same picture. Further, as used herein, in some aspects, "P-slices" and "B-slices" may refer to portions of a picture composed of macroblocks that are not dependent on macroblocks in the same picture.

In some examples, the motion estimation unit 204 may perform uni-directional prediction for the current video block, and the motion estimation unit 204 may search reference pictures of list 0 or list 1 for a reference video block for the current video block. The motion estimation unit 204 may then generate a reference index that indicates the reference picture in list 0 or list 1 that contains the reference video block and a motion vector that indicates a spatial displacement between the current video block and the reference video block. The motion estimation unit 204 may output the reference index, a prediction direction indicator, and the motion vector as the motion information of the current video block. The motion compensation unit 205 may generate the predicted video block of the current block based on the reference video block indicated by the motion information of the current video block.

In other examples, the motion estimation unit 204 may perform bi-directional prediction for the current video block, motion estimation unit 204 may search the reference pictures in list 0 for a reference video block for the current video block and may also search the reference pictures in list 1 for another reference video block for the current video block. The motion estimation unit 204 may then generate reference indexes that indicate the reference pictures in list 0 and list 1 containing the reference video blocks and motion vectors that indicate spatial displacements between the reference video blocks and the current video block. The motion estimation unit 204 may output the reference indexes and the motion vectors of the current video block as the motion information of the current video block. The motion compensation unit 205 may generate the predicted video block of the current video block based on the reference video blocks indicated by the motion information of the current video block.

In some examples, the motion estimation unit 204 may output a full set of motion information for decoding processing of a decoder.

In some examples, the motion estimation unit 204 may not output a full set of motion information for the current video. Rather, the motion estimation unit 204 may signal the motion information of the current video block with reference to the motion information of another video block. For example, the motion estimation unit 204 may determine that the motion information of the current video block is sufficiently similar to the motion information of a neighboring video block.

In one example, the motion estimation unit 204 may indicate, in a syntax structure associated with the current video block, a value that indicates to the video decoder 300 that the current video block has the same motion information as the another video block.

In another example, the motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

The intra prediction unit 206 may perform intra prediction on the current video block. When the intra prediction unit 206 performs intra prediction on the current video block, the intra prediction unit 206 may generate prediction data for the current video block based on decoded samples of other video blocks in the same picture. The prediction data for the current video block may include a predicted video block and various syntax elements.

The residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and the residual generation unit 207 may not perform the subtracting operation.

The transform unit 208, which may also be referred to as a transform processing unit, may generate one or more transform coefficient video blocks for the current video block by applying one or more transforms to a residual video block associated with the current video block.

After the transform unit 208 generates a transform coefficient video block associated with the current video block, the quantization unit 209 may quantize the transform coefficient video block associated with the current video block based on one or more quantization parameter (QP) values associated with the current video block.

The inverse quantization unit 210 and the inverse transform unit 211 may apply inverse quantization and inverse transforms to the transform coefficient video block, respectively, to reconstruct a residual video block from the transform coefficient video block. The reconstruction unit 212 may add the reconstructed residual video block to corresponding samples from one or more predicted video blocks generated by the predication unit 202 to produce a reconstructed video block associated with the current block for storage in the buffer 213.

After the reconstruction unit 212 reconstructs the video block, loop filtering operation may be performed reduce video blocking artifacts in the video block.

The entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 3:
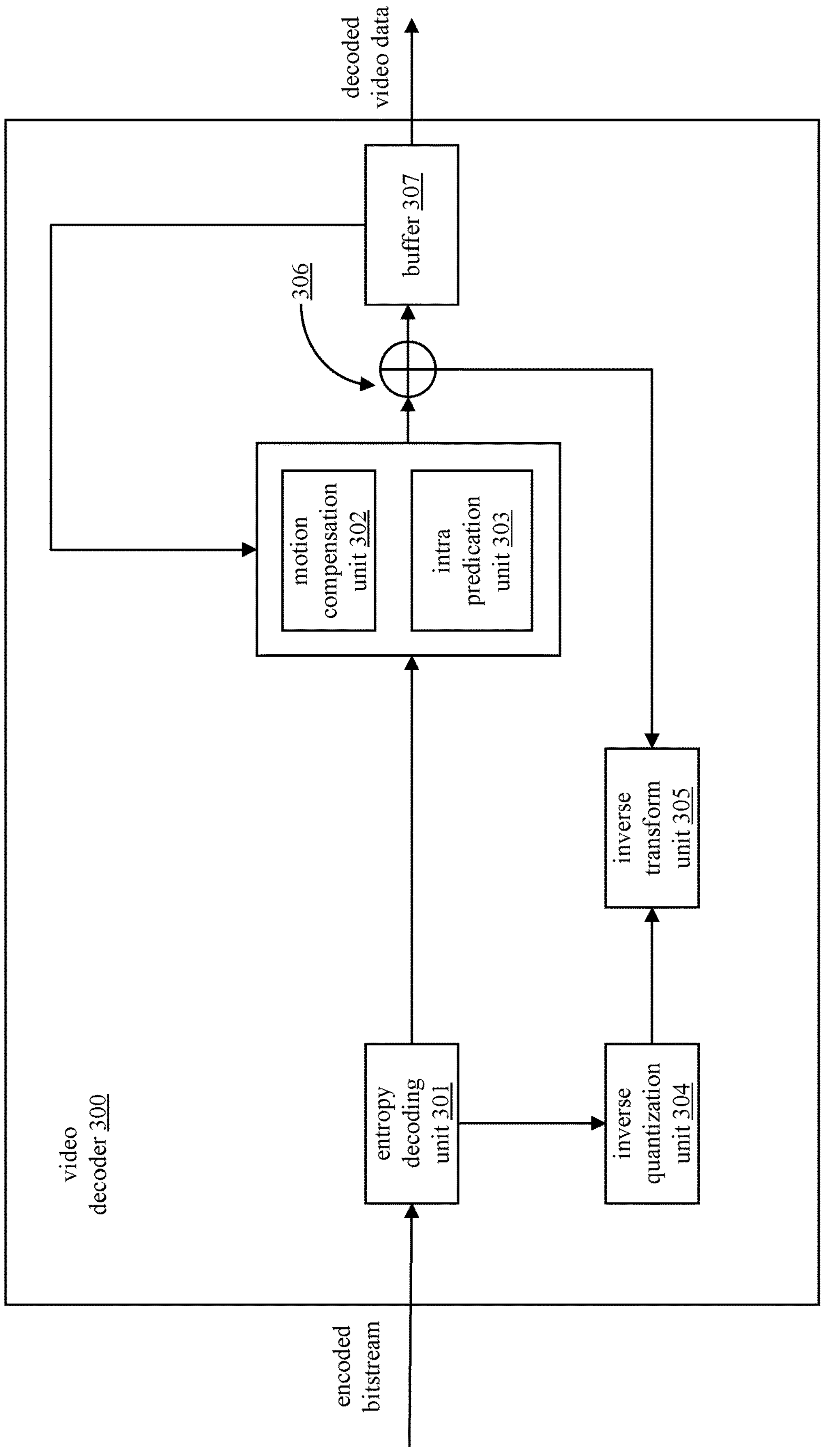
FIG. 3 is a block diagram that illustrates an example video decoder, in accordance with some aspects of the present disclosure.

FIG. 3 is a block diagram illustrating an example of video decoder 300, which may be an example of the video decoder 124 in the video coding system 100 illustrated in FIG. 1, in accordance with some aspects of the present disclosure.

The video decoder 300 may be configured to perform any or all of the techniques of this disclosure. In the example of FIG. 3, the video decoder 300 includes a plurality of functional components. The techniques described in this disclosure may be shared among the various components of the video decoder 300. In some examples, a processor may be configured to perform any or all of the techniques described in this disclosure.

In the example of FIG. 3, the video decoder 300 includes an entropy decoding unit 301, a motion compensation unit 302, an intra prediction unit 303, an inverse quantization unit 304, an inverse transform unit 305, and a reconstruction unit 306 and a buffer 307. The video decoder 300 may, in some examples, perform a decoding pass generally reciprocal to the encoding pass described with respect to video encoder 200 (FIG. 2) .

The entropy decoding unit 301 may retrieve an encoded bitstream. The encoded bitstream may include entropy coded video data (e.g., encoded blocks of video data). The Entropy decoding unit 301 may decode the entropy coded video data, and from the entropy decoded video data, the motion compensation unit 302 may determine motion information including motion vectors, motion vector precision, reference picture list indexes, and other motion information. The motion compensation unit 302 may, for example, determine such information by performing the AMVP and merge mode. AMVP is used, including derivation of several most probable candidates based on data from adjacent PBs and the reference picture. Motion information typically includes the horizontal and vertical motion vector displacement values, one or two reference picture indices, and, in the case of prediction regions in B slices, an identification of which reference picture list is associated with each index. As used herein, in some aspects, a "merge mode" may refer to deriving the motion information from spatially or temporally neighboring blocks.

The motion compensation unit 302 may produce motion compensated blocks, possibly performing interpolation based on interpolation filters. Identifiers for interpolation filters to be used with sub-pixel precision may be included in the syntax elements.

The motion compensation unit 302 may use interpolation filters as used by video encoder 200 during encoding of the video block to calculate interpolated values for sub-integer pixels of a reference block. The motion compensation unit 302 may determine the interpolation filters used by video encoder 200 according to received syntax information and use the interpolation filters to produce predictive blocks.

The motion compensation unit 302 may uses some of the syntax information to determine sizes of blocks used to encode frame (s) and/or slice (s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence. As used herein, in some aspects, a "slice" may refer to a data structure that can be decoded independently from other slices of the same picture, in terms of entropy coding, signal prediction, and residual signal reconstruction. A slice can either be an entire picture or a region of a picture.

The intra prediction unit 303 may use intra prediction modes for example received in the bitstream to form a prediction block from spatially adjacent blocks. The inverse quantization unit 304 inverse quantizes, i.e., de-quantizes, the quantized video block coefficients provided in the bitstream and decoded by entropy decoding unit 301. Inverse transform unit 305 applies an inverse transform.

The reconstruction unit 306 may sum the residual blocks with the corresponding prediction blocks generated by motion compensation unit 302 or intra prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra predication and also produces decoded video for presentation on a display device.

Although the following description may be focused on High Efficiency Video

Coding (HEVC), and/or the standard Versatile Video Coding (VVC), the concepts described herein may be applicable to other coding standards or video codec.

Figure 4:
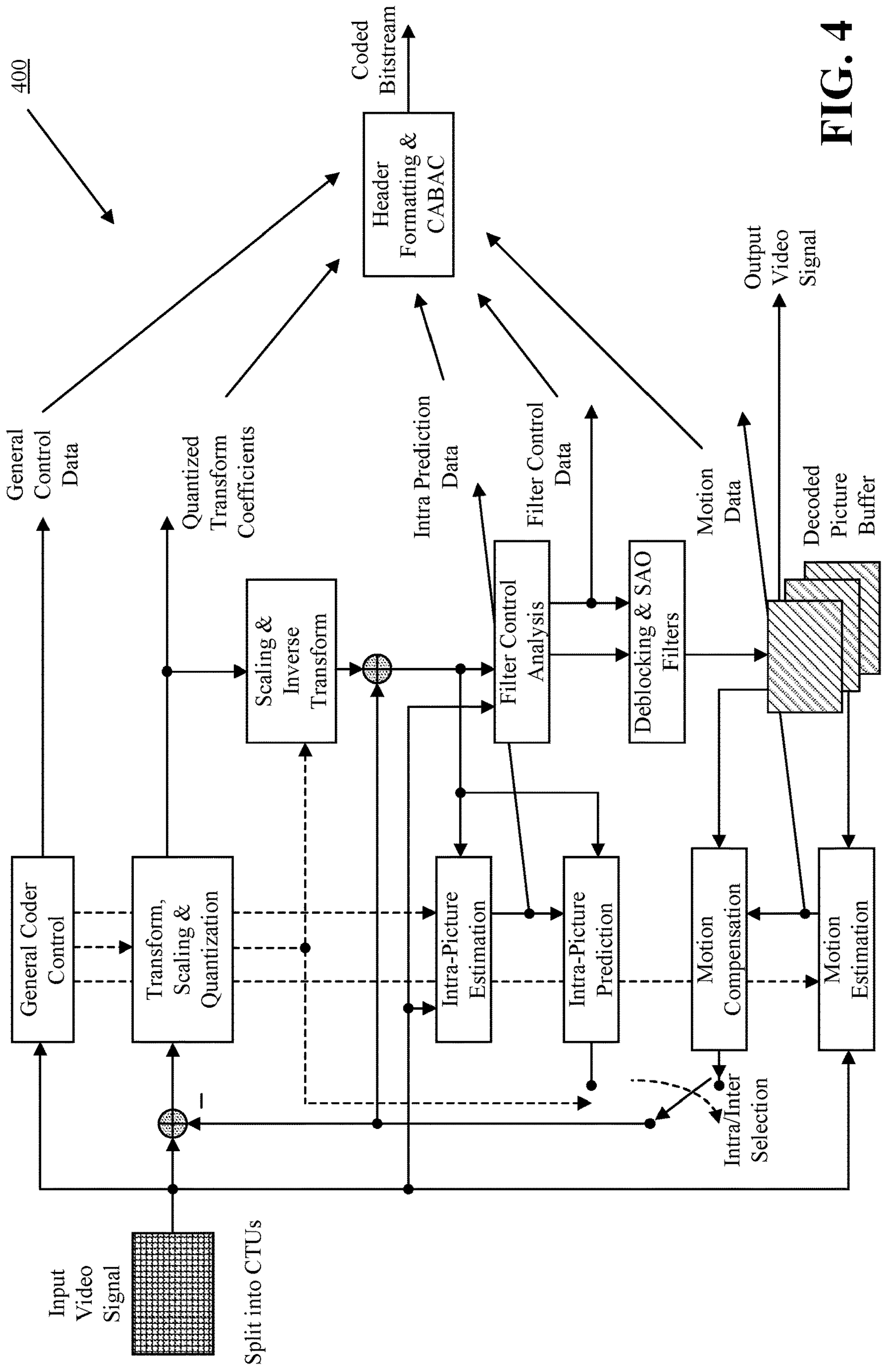
FIG. 4 is a block diagram that illustrates a second example video encoder, in accordance with some aspects of the present disclosure.

FIG. 4 shows an example block diagram of a HEVC video encoder and decoder 400, which may be the video encoder 114 and video decoder 124 in the video coding system 100 illustrated in FIG. 1, in accordance with some aspects of the present disclosure. The encoding algorithm for generating HEVC-compliant bitstreams usually proceeds as follows. Each picture is divided into block regions (e.g., coding tree units (CTUs)), and the precise block division may be transmitted to the decoder. A CTU consists of a luma CTB and the corresponding chroma CTBs and syntax elements. The size LxL of a luma CTB can be chosen as L=16, 32, or 64 samples, with the larger sizes typically enabling better compression. HEVC then supports a partitioning of the CTBs into smaller blocks using a tree structure and quadtree-like signaling. The quadtree syntax of the CTU specifies the size and positions of its luma and chroma CBs. The root of the quadtree is associated with the CTU. Hence, the size of the luma CTB is the largest supported size for a luma CB. The splitting of a CTU into luma and chroma CBs may be signaled jointly. One luma CB and ordinarily two chroma CBs, together with associated syntax, form a coding unit (CU). A CTB may contain only one CU or may be split to form multiple CUs, and each CU has an associated partitioning into prediction units (PUs) and a tree of transform units (TUs).

The first picture of the video sequence (and the first picture at each clean random access point that enters the video sequence) only uses intra-picture prediction, which uses region-to-region spatial data prediction within the same picture, but does not rely on other pictures to encode the first picture. For the remaining pictures between sequential or random access points, the inter-picture temporal prediction coding mode may be used for most blocks. The encoding process for inter-picture prediction includes selecting motion data including a selected reference picture and a motion vector (MV) to be applied to predict samples of each block.

The decision whether to code a picture area using inter-picture or intrapicture prediction is made at the CU level. A PU partitioning structure has its root at the CU level. Depending on the basic prediction-type decision, the luma and chroma CBs can then be further split in size and predicted from luma and chroma prediction blocks (PBs). HEVC supports variable PB sizes from 64×64 down to 4×4 samples. The prediction residual is coded using block transforms. A TU tree structure has its root at the CU level. The luma CB residual may be identical to the luma transform block (TB) or may be further split into smaller luma TBs. The same applies to the chroma TBs.

The encoder and decoder may apply motion compensation (MC) by using MV and mode decision data to generate the same inter-picture prediction signal, which is transmitted as auxiliary information. The residual signal of intra-picture or inter-picture prediction is transformed by linear spatial transformation, which is the difference between the original block and its prediction. Then the transform coefficients are scaled, quantized, entropy encoded, and transmitted together with the prediction information.

The encoder duplicates the decoder processing loop so that both will generate the same prediction for subsequent data. Therefore, the quantized transform coefficients are constructed by inverse scaling, and then inversely transformed to replicate the decoding approximation of the residual signal. The residual is then added to the prediction, and the result of this addition can then be fed into one or two loop filters to smooth the artifacts caused by block-by-block processing and quantization. The final picture representation (i.e., the copy output by the decoder) is stored in the decoded picture buffer for prediction of subsequent pictures. In general, the order of encoding or decoding processing of pictures is usually different from the order in which they arrive from the source; it may be necessary to distinguish between the decoding order of the decoder (that is, the bit stream order) and the output order (that is, the display order).

Video material encoded by HEVC is usually expected to be input as a progressive image (because the source video originates from this format or is generated by de-interlacing before encoding). There is no explicit coding feature in the HEVC design to support the use of interlaced scanning, because interlaced scanning is no longer used for displays and becomes very uncommon for distribution. However, metadata syntax has been provided in HEVC to allow the encoder to indicate that it has been sent by encoding each area of the interlaced video (i.e., even or odd lines of each video frame) into a separate picture Interlaced video, or by encoding each interlaced frame as a HEVC encoded picture to indicate that it has been sent. This provides an effective method for encoding interlaced video without the need to support special decoding processes for it.

Figure 5:
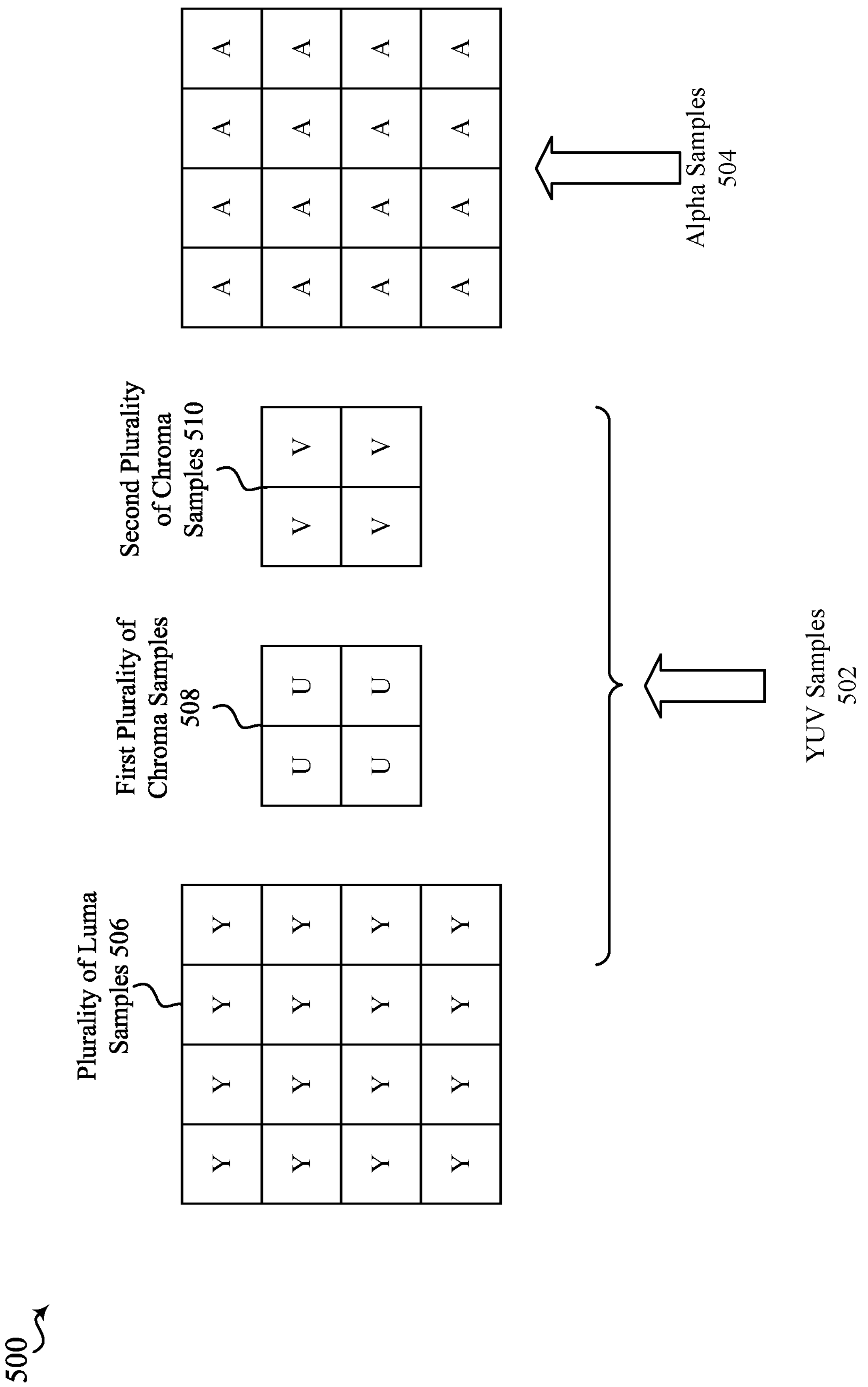
FIG. 5 is a diagram that illustrates an example of a YUV 4:2:0 block with an alpha channel, in accordance with some aspects of the present disclosure.

FIG. 5 illustrates an example of a YUV 4:2:0 block with an alpha channel 500, in accordance with some aspects of the present disclosure. As illustrated in FIG. 5, a representation of a color video signal may be sampled in accordance with a four part sampling scheme (e.g., 4:2:0:4) including YUV samples 502 representing color and a corresponding plurality of alpha samples 504 representing transparency. The YUV samples 502 may include a plurality of luma (Y) samples 506, a plurality of first chroma (U) samples 508, and a plurality of second chroma (V) samples 510. Further, the plurality of luma samples 506 may represent brightness, and the two plurality of chroma samples 508-510 may represent the extent to which the color deviates from gray toward blue and red, respectively. Because the human visual system is more sensitive to luma than chroma, the 4:2:0 sampling structure may be used, wherein each of the plurality of chroma samples 508-510 has one fourth of the number of samples of the plurality of luma samples 506. Further, as described in detail herein, the plurality of alpha samples 504 are auxiliary picture information that define degrees of transparency for the corresponding YUV samples 502. In addition, as illustrated in FIG. 5, the plurality of alpha samples 504 may be arranged into a block.

Figure 6:
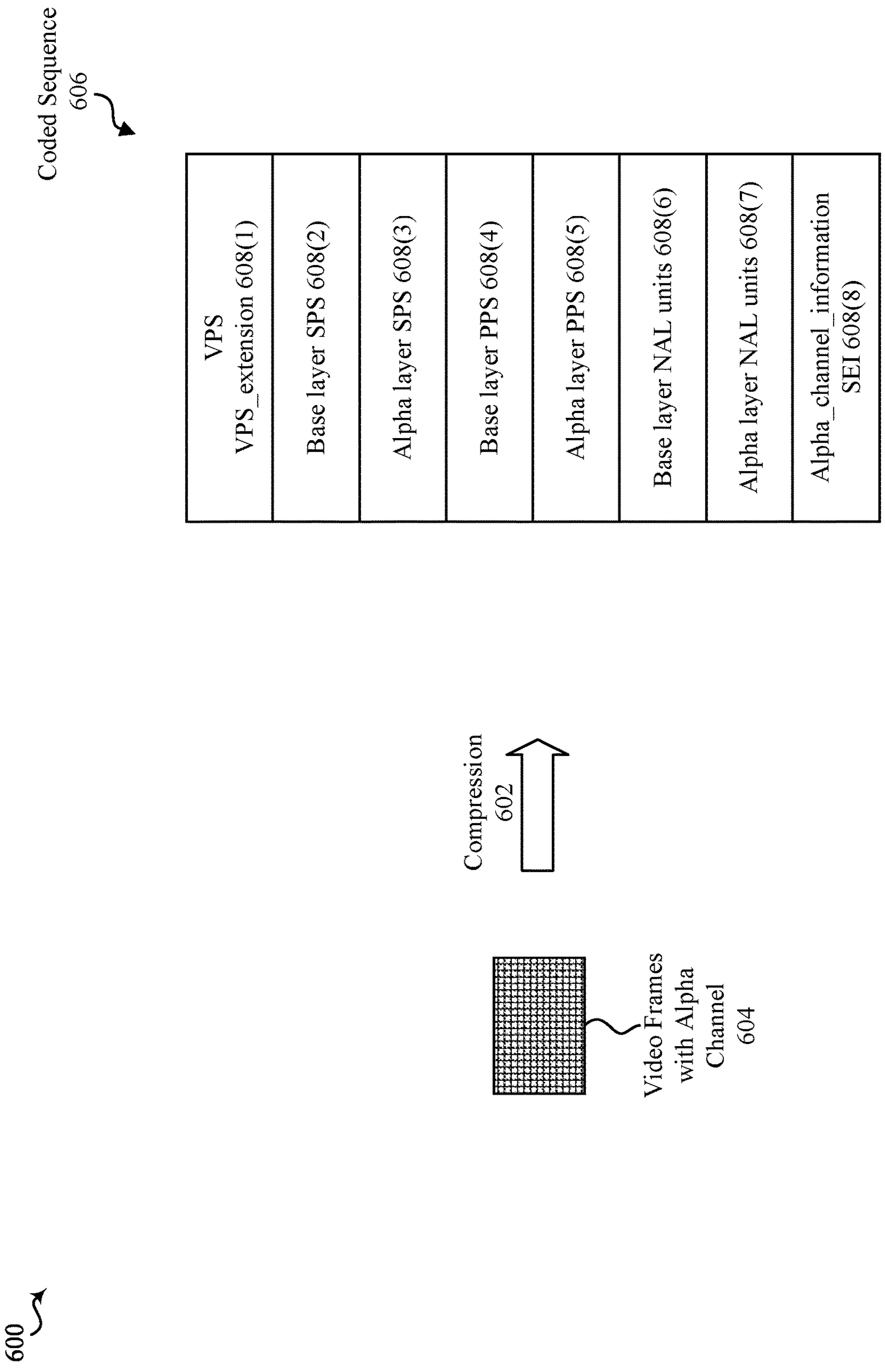
FIG. 6 is a diagram that illustrates a process for compressing video frames with an alpha channel into a high efficiency image file format (HEIF), in accordance with some aspects of the present disclosure.

FIG. 6 illustrates a process 600 for compressing video frames with an alpha channel into a high efficiency image file format (HEIF), in accordance with some aspects of the present disclosure. HEIF is a container format for individual images and image sequences. HEIF may be used for multimedia files that can also include other media streams, such as timed text, audio and video. As illustrated in FIG. 6, a compression process 602 (e.g., HEVC) may be applied to a plurality of pictures with an alpha channel 604 to generate coded sequence 606.

Further, the coded sequence 606 may be an ordered sequence of syntax elements. As described below with reference to FIG. 7. Each syntax element may be placed into a logical packet called a NAL (network abstraction layer) Unit. As illustrated in FIG. 6, the coded sequence 606 may include a video parameter set (VPS) and a VPS extension 608(1) signaling a coded sequence and the presence of an alpha channel. The VPS may include defining common syntax elements shared by multiple layers or operation points, in order to avoid unnecessary duplications, operation points information used for session negotiation, including, e.g., profile and level, other operation point specific information.

In addition, the coded sequence 606 may include a base layer sequence parameter set (SPS) 608(2) and an alpha layer SPS 608(3). As used herein, in some aspects, a "base layer" may represent a color channel (e.g., YUV, RGB, etc.). As used herein, in some aspects, an "alpha layer" may represent an alpha channel. The SPS elements 608(2)-(3) may include parameters that apply to a series of consecutive coded video pictures (e.g., a sequence of pictures (SOP)). For example, an SPS element may include decoder operation point related information (profile, level, picture size, number sub-layers, etc.), enabling flags for certain tools within a profile and associated coding tool parameters, information restricting the flexibility of structures and transform coefficient coding, temporal scalability control, and visual usability information.

Further, the coded sequence 606 may include a base layer picture parameter set (PPS) 608(4) and an alpha layer PPS 608(5). The PPS elements 608(4)-(5) may include parameters that apply to the decoding of one or more individual pictures inside a coded video sequence. For example, the PPS elements may include initial picture control information, flags indicating the use of or presence of certain tools or control information in the slice header, and tiling information. The parameter sets 608(1)-608(5) are header information signaled in parameter set NAL units. Additionally, the coded sequence 606 may include base layer NAL units 608(6) and alpha layer NAL units 608(7) generated for every picture (i.e., frame). The base layer NAL units 608(6) and alpha layer NAL units 608(7) are coded video NAL units that may reference the parameter sets 608(1)-608(5). In addition, the coded sequence 606 may include alpha channel information supplemental enhancement information (SEI). The SEI may provide support for different types of metadata. The SEI mechanism enables a video encoder to include metadata in the bitstream that is not required for correct decoding of the sample values of the output pictures but can be used for various other purposes, such as picture output timing, displaying, as well as loss detection and concealment. In some aspects, video encoders may include any number of SEI NAL units in an access unit, and an individual SEI NAL unit may contain one or more SEI messages.

In some aspects, the alpha layer may be coded without chroma information. The decoded chroma samples in the alpha layer may be set to the (1<<(bitDepth−1)), where the bitDepth is the internal bit depth of a chroma component.

Figure 7:
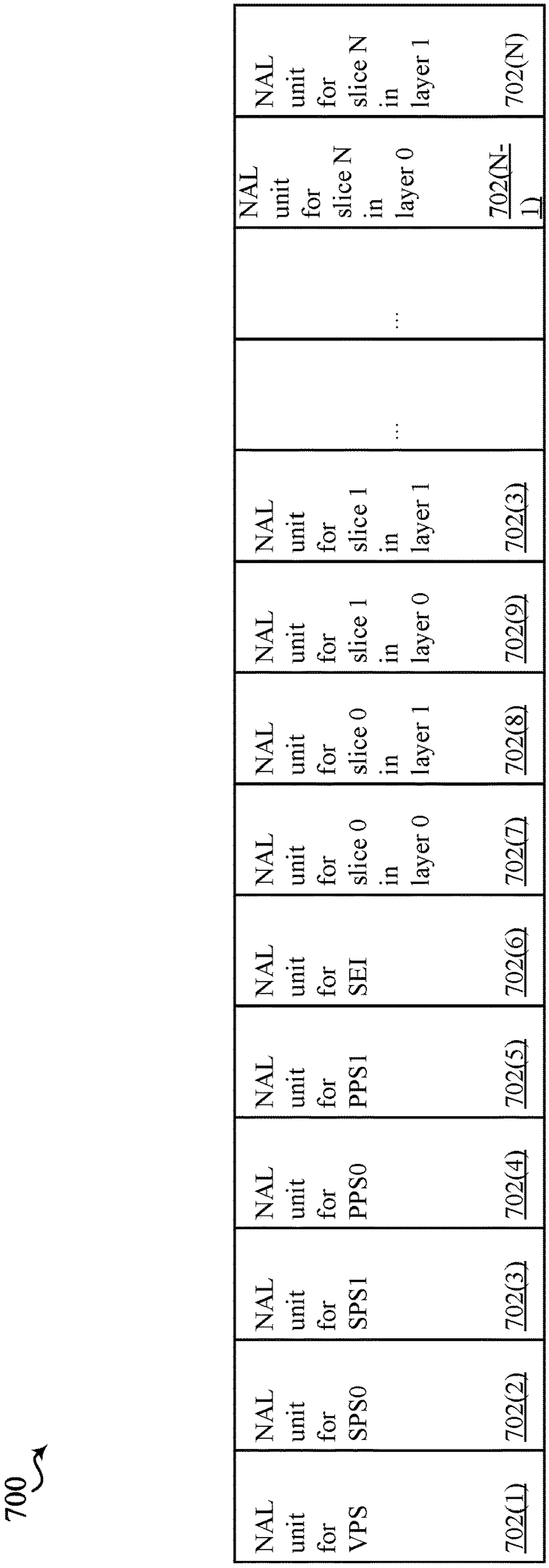
FIG. 7 is a diagram that illustrates a HVEC bitstream for coding videos with an alpha channel, in accordance with some aspects of the present disclosure.

FIG. 7 illustrates a HVEC bitstream 700 for coding videos with an alpha channel, in accordance with some aspects of the present disclosure. As illustrated in FIG. 7, the bit stream 700 including the NAL units 702(1)-(N) may correspond to the coded sequence 606. In some aspects, as illustrated in FIG. 7, each syntax element is placed into a logical packet called an individual NAL unit.

The syntax table and semantic related to the alpha channel are shown as follows in Table 1.

TABLE 1

Syntax and Semantics - Alpha Channel

| alpha_channel_info( payloadSize ) { | Descriptor |
|---|---|
| alpha_channel_cancel_flag | u(1) |
| if( !alpha_channel_cancel_flag ) { | |
| alpha_channel_use_idc | u(3) |
| alpha_channel_bit_depth_minus8 | u(3) |
| alpha_transparent_value | u(v) |
| alpha_opaque_value | u(v) |
| alpha_channel_incr_flag | u(1) |
| alpha_channel_clip_flag | u(1) |
| if( alpha_channel_clip_flag ) | |
| alpha_channel_clip_type_flag | u(1) |
| } | |
| } | |

An alpha_channel_cancel_flag equal to 1 may indicate that the alpha channel information SEI message cancels the persistence of any previous alpha channel information SEI message in output order that applies to the current layer. An alpha_channel_cancel_flag equal to 0 may indicate that alpha channel information follows. In some aspects, the semantics of alpha channel information SEI message persist for the current layer in output order until one or more of the following conditions are true: a new CLVS of the current layer begins, the bitstream ends, or a picture picB with nuh_layer_id equal to targetLayerId in an access unit containing an alpha channel information SEI message with nuh_layer_id equal to targetLayerId is output having PicOrderCnt(picB) greater than PicOrderCnt(currPic), where PicOrderCnt(picB) and PicOrderCnt(currPic) are the PicOrderCntVal values of picB and currPic, respectively, immediately after the invocation of the decoding process for picture order count for picB. In some aspects, the currPic may be the picture that the alpha channel information SEI message is associated with.

An alpha_channel_use_idc equal to 0 may indicate that for alpha blending purposes the decoded samples of the associated primary picture should be multiplied by the interpretation sample values of the auxiliary coded picture in the display process after output from the decoding process. An alpha_channel_use_idc equal to 1 may indicate that for alpha blending purposes the decoded samples of the associated primary picture should not be multiplied by the interpretation sample values of the auxiliary coded picture in the display process after output from the decoding process. An alpha_channel_use_idc equal to 2 indicates that the usage of the auxiliary picture is unspecified. In some aspects, values greater than 2 for alpha_channel_use_idc are reserved for future use by ITU-T ISO/IEC. When not present, the value of alpha_channel_use_idc is inferred to be equal to 2.

An alpha_ channel_bit_depth_minus8 plus 8 may specify the bit depth of the samples of the luma sample array of the auxiliary picture. An alpha_channel_bit_depth_minus8 shall be in the range 0 to 7 inclusive. An alpha_channel_bit_depth_minus8 shall be equal to bit_depth_luma_minus8 of the associated primary picture. An alpha_transparent_value may specify the interpretation sample value of an auxiliary coded picture luma sample for which the associated luma and chroma samples of the primary coded picture are considered transparent for purposes of alpha blending. In some aspects, the number of bits used for the representation of the alpha_transparent_value syntax element is alpha_channel_bit_depth_minus8 +9.

An alpha_opaque_value may specify the interpretation sample value of an auxiliary coded picture luma sample for which the associated luma and chroma samples of the primary coded picture are considered opaque for purposes of alpha blending. In some aspects, the number of bits used for the representation of the alpha_opaque_value syntax element is alpha_channel_bit_depth_minus8 +9.

An alpha_channel_incr_flag equal to 0 may indicate that the interpretation sample value for each decoded auxiliary picture luma sample value is equal to the decoded auxiliary picture sample value for purposes of alpha blending. An alpha_channel_incr_flag equal to 1 may indicate that, for purposes of alpha blending, after decoding the auxiliary picture samples, any auxiliary picture luma sample value that is greater than Min(alpha_opaque_value, alpha_transparent_value) should be increased by one to obtain the interpretation sample value for the auxiliary picture sample and any auxiliary picture luma sample value that is less than or equal to Min(alpha_opaque_value, alpha_transparent_value) should be used, without alteration, as the interpretation sample value for the decoded auxiliary picture sample value. In some aspects, when not present, the value of alpha_channel_incr_flag is inferred to be equal to 0.

An alpha_channel_clip_flag equal to 0 may indicate that no clipping operation is applied to obtain the interpretation sample values of the decoded auxiliary picture. An alpha_channel_clip_flag equal to 1 may indicate that the interpretation sample values of the decoded auxiliary picture are altered according to the clipping process described by the alpha_channel_clip_type_flag syntax element. In some aspects, when not present, the value of alpha_channel_clip_flag is inferred to be equal to 0.

An alpha_channel_clip_type_flag equal to 0 may indicate that, for purposes of alpha blending, after decoding the auxiliary picture samples, any auxiliary picture luma sample that is greater than (alpha_opaque_value−alpha_transparent_value)/2 is set equal to alpha_opaque_value to obtain the interpretation sample value for the auxiliary picture luma sample and any auxiliary picture luma sample that is less or equal than (alpha_opaque_value-alpha_transparent_value)/2 is set equal to alpha_transparent_value to obtain the interpretation sample value for the auxiliary picture luma sample. An alpha_channel_clip_type_flag equal to 1 may indicate that, for purposes of alpha blending, after decoding the auxiliary picture samples, any auxiliary picture luma sample that is greater than alpha_opaque_value is set equal to alpha_opaque_value to obtain the interpretation sample value for the auxiliary picture luma sample and any auxiliary picture luma sample that is less than or equal to alpha_transparent_value is set equal to alpha_transparent_value to obtain the interpretation sample value for the auxiliary picture luma sample.

In some aspects, when both alpha_channel_incr_flag and alpha_channel_clip_flag are equal to one, the clipping operation specified by alpha_channel_clip_type_flag should be applied first followed by the alteration specified by alpha_channel_incr_flag to obtain the interpretation sample value for the auxiliary picture luma sample. Further, in some aspects, it may be a requirement that bitstream conformance that when AuxId[lId ]is equal to AUX ALPHA or AUX_DEPTH, either of the following applies: chroma_format_idc is equal to 0 in the active SPS for the layer with nuh_layer_id equal to lId, or the value of all decoded chroma samples is equal to 1<<(BitDepthC−1) in all pictures that have nuh_layer_id equal to lId and for which this VPS raw byte sequence payload (RBSP) is the active VPS RBSP.

Figure 8:
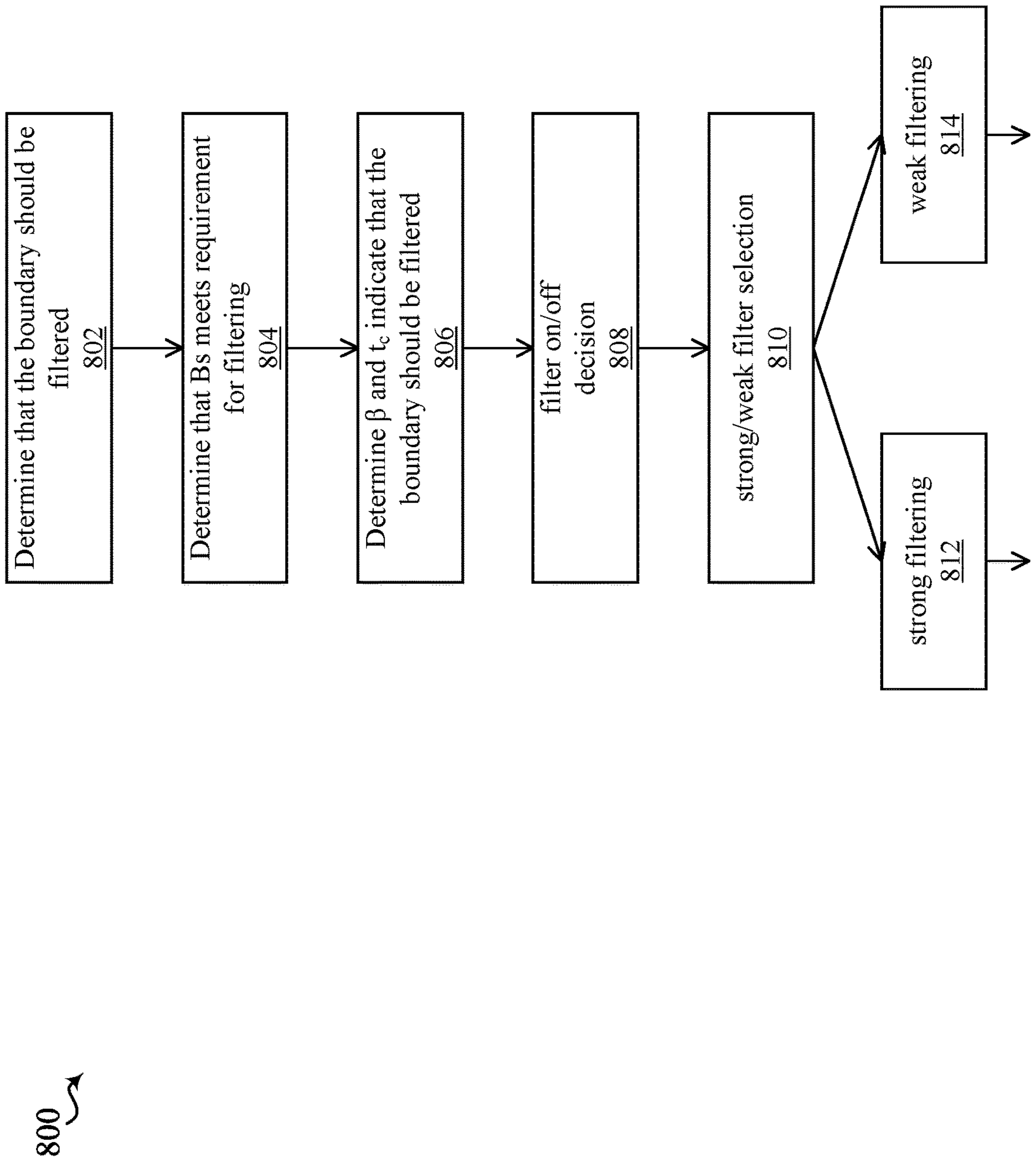
FIG. 8 is a flowchart of an example method for a deblocking filter process, in accordance with some aspects of the present disclosure.

FIG. 8 illustrates deblocking filter process 800, in accordance with some aspects of the present disclosure. In some aspects, as illustrated in FIG. 4, the process 800 may be performed for each CU in the same order as a decoding process by deblocking and SAO filters. Initially, vertical edges are filtered (horizontal filtering), then horizontal edges are filtered (vertical filtering). In some aspects, the video coder may only apply the deblocking filter process to 8×8 block boundaries, for both the luma and chroma samples. Further, a boundary can have three filtering status: no filtering, weak filtering, and strong filtering. Each filtering decision is based on boundary strength, Bs, and threshold values, β and $t_C$. In some aspects, the boundary strength may be one of three possible values: 0, 1, or 2. For the luma component, only block boundaries with Bs values greater than zero are filtered. For the chroma component, the chroma components, only boundaries with Bs equal to two are filtered.

For example, at block 802, the process 800 includes determining that the boundary should be filtered. At block 804, the process 800 includes determining that the Bs meets requirement for filtering. Further, at block 806, the process 800 includes determining that β and $t_C$ indicate that the boundary should be filtered. At block 808, the process 800 includes whether the filter is on or off. Also, at block 810, the process 800 includes determining whether to perform strong filtering or weak filtering. If the process 800 determines that strong filtering should be performed, the process 800 proceeds to block 812. If the process 800 determines that weak filtering should be performed, the process proceeds to block 814. At block 812, the process 800 includes performing strong filtering. At block 814, the process 800 includes performing weak filtering.

In some aspects, as described above with respect to FIG. 4, a SAO filter is applied to the reconstructed signal after the deblocking filter by using offsets specified for each CTB by the encoder. As described herein, a coding process may enable or disable a SAO filter for improved performance.

In some aspects, a reference software (e.g., HEVC Test Model) may determine whether or not the SAO process is to be applied for current slice. If SAO is applied for the slice, each CTB is classified as one of five SAO types as shown in Table 2 below. SAO classifies pixels into categories, and reduces distortion caused during video encoding by adding an offset to the pixels based the classification.

TABLE 2

Specification of SAO type

| SAO type | sample adaptive offset type to be used | Number of categories |
|---|---|---|
| 0 | None | 0 |
| 1 | 1-D 0-degree pattern edge offset | 4 |
| 2 | 1-D 90-degree pattern edge offset | 4 |
| 3 | 1-D 135-degree pattern edge offset | 4 |
| 4 | 1-D 45-degree pattern edge offset | 4 |
| 5 | band offset | 4 |

A SAO operation includes Edge Offset (EO) which uses edge properties for pixel classification in SAO types 1-4 and Band Offset (BO) which uses pixel intensity for pixel classification in SAO type 5. Each applicable CTB has SAO parameters including sao_merge_left_flag, sao_merge_up_flag, SAO type, and four offsets. If sao_merge_left_flag is equal to 1, the current CTB will reuse the SAO type and offsets of the CTB to the left. If sao_merge_up_flag is equal to 1, the current CTB will reuse SAO type and offsets of the CTB above.

Figure 9:
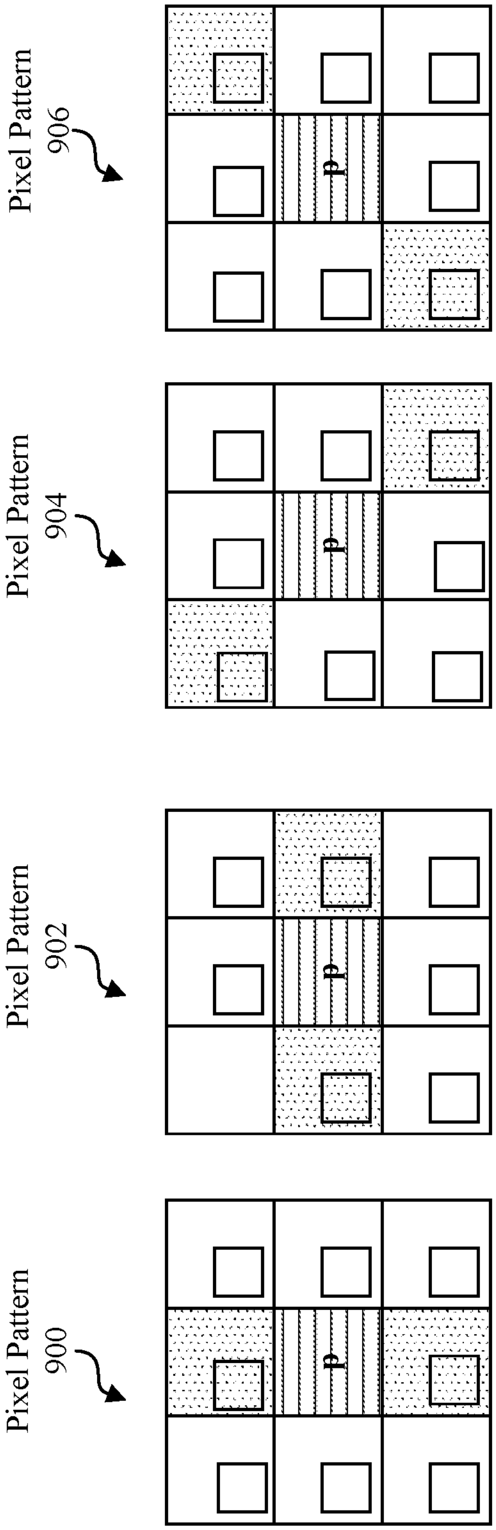
FIG. 9 is a diagram that illustrates four linear configurations of a current pixel and its neighboring pixels for pixel category determination, in accordance with some aspects of the present disclosure.
Figure 10:
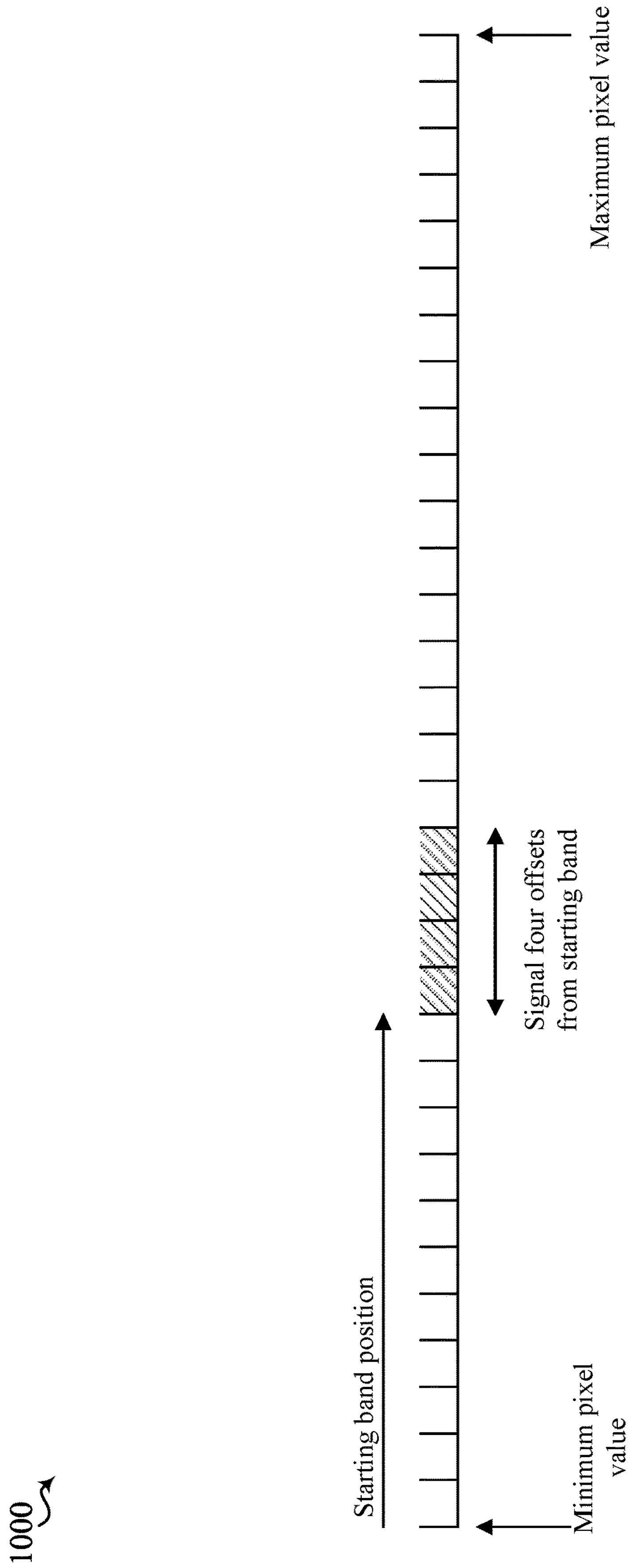
FIG. 10 is a diagram that illustrates an example of a band grouping, in accordance with some aspects of the present disclosure.

FIG. 9 illustrates four linear configurations of a current pixel and its neighboring pixels for pixel category determination, in accordance with some aspects of the present disclosure. As illustrated in FIG. 9, edge offset (EO) may use four 1-D 3-pixel patterns 900, 902, 904, and 906 for classification of the current pixel p by consideration of edge directional information, as illustrated in Error! Reference source not found. Pixel pattern 900 corresponds to a vertical line (90-degree), pixel pattern 902 corresponds to a horizontal line (0-degree), pixel pattern 904 corresponds to a 135-degree line, and pixel pattern 906 corresponds to 45-degree line. Each pixel configuration may be arranged as a short line responsive to intensity transition along the line. For example, a horizontal edge will cause a more noticeable intensity transition in the vertical line than lines having other orientations. Similarly, a vertical edge will cause a more noticeable intensity transition in the horizontal line than lines having other orientation. The selection of pixel configuration can be determined on a region by region basis and a flag is required for each region.

Further, each pixel is classified into one of five categories corresponding to none, valleys, edges, and peaks according to Error! Reference source not found. 3.

TABLE 3

Pixel classification for EO

| Category | Condition | Meaning |
|---|---|---|
| 0 | None of the below | Largely monotonic |
| 1 | p < 2 neighbors | Local minimum |
| 2 | p < 1 neighbor && p == 1 neighbor | Edge |

TABLE 3-continued

| Pixel classification for EO | | |
|---|---|---|
| Category | Condition | Meaning |
| 3 | p > 1 neighbor && p == 1 neighbor | Edge |
| 4 | p > 2 neighbors | Local maximum |

The Band offset (BO) classifies all pixels in one CTB region into 32 uniform bands by using the five most significant bits of the pixel value as the band index. In other words, the pixel intensity range is divided into 32 equal segments from zero to the maximum intensity value (e.g. 255 for 8-bit pixels). Four adjacent bands are grouped together and each group is indicated by its most left-hand position as shown in the band 1000 illustrated in Error! Reference source not found. The encoder searches all position to get the group with the maximum distortion reduction by compensating offset of each band.

Figure 11A:
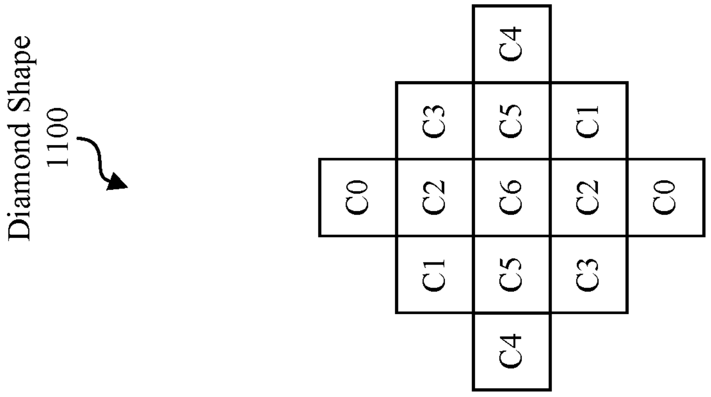
FIG. 11A is a diagram that illustrates an example of a 5×5 diamond filter shape, in accordance with some aspects of the present disclosure.
Figure 11B:
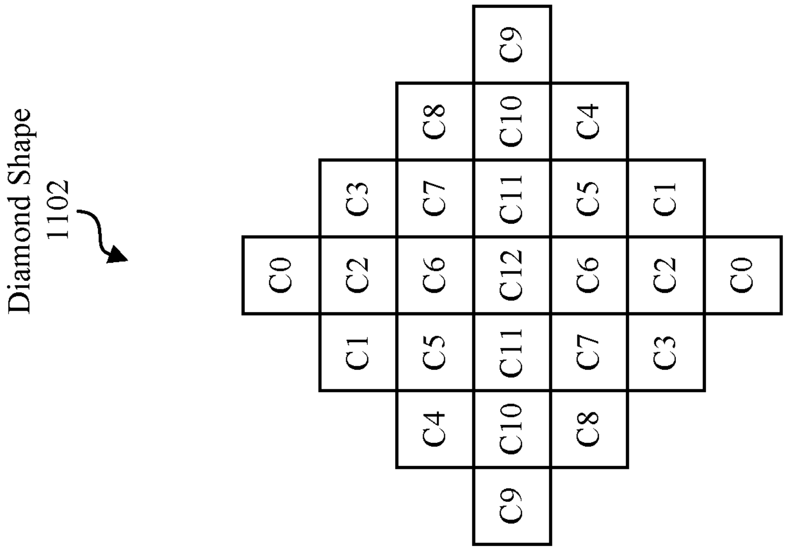
FIG. 11B is a diagram that illustrates an example of a 7×7 diamond filter shape, in accordance with some aspects of the present disclosure.
Figure 12A:
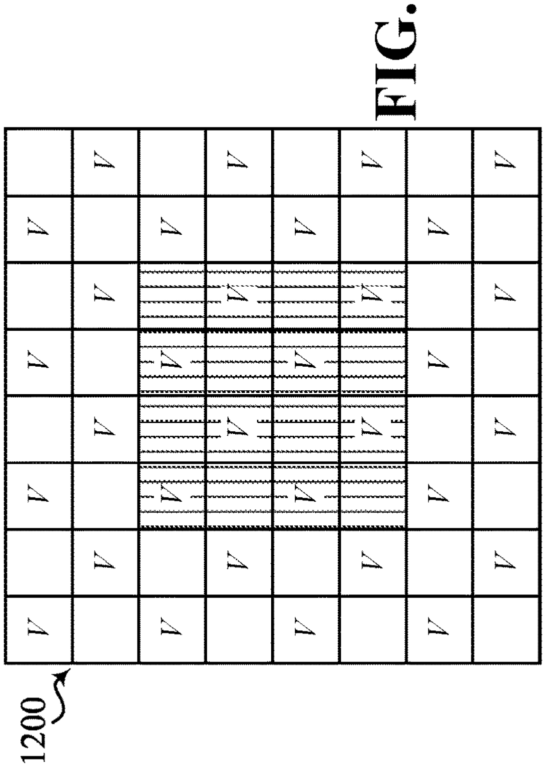
FIG. 12A is a diagram that illustrates a first example of subsampled Laplacian calculations for adaptive loop filter (ALF) classification, in accordance with some aspects of the present disclosure.
Figure 12B:
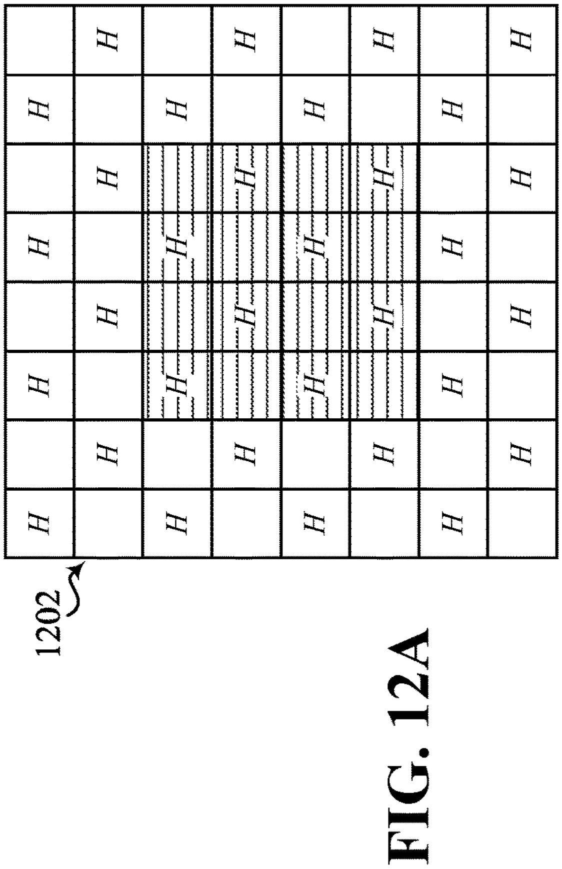
FIG. 12B is a diagram that illustrates a second example of subsampled Laplacian calculations for ALF classification, in accordance with some aspects of the present disclosure.
Figure 12C:
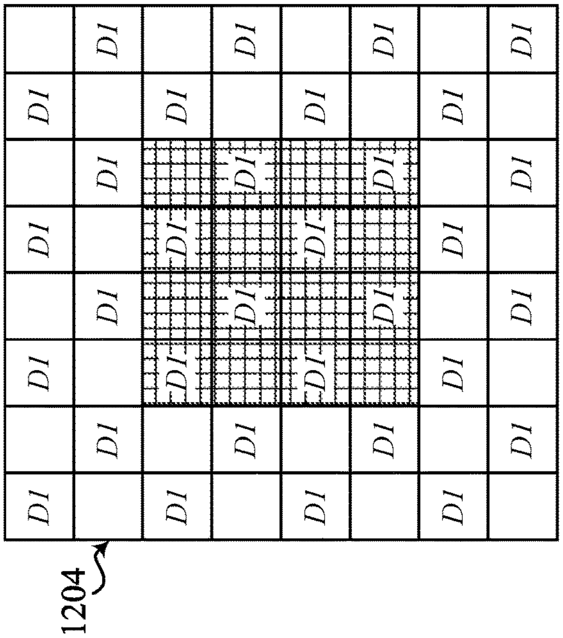
FIG. 12C is a diagram that illustrates a third example of subsampled Laplacian calculations for ALF classification, in accordance with some aspects of the present disclosure.
Figure 12D:
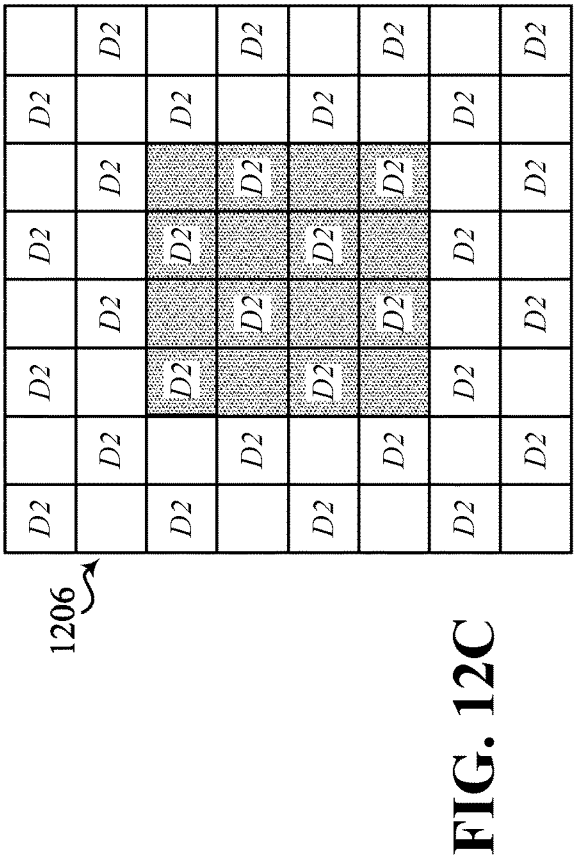
FIG. 12D is a diagram that illustrates a fourth example of subsampled Laplacian calculations for ALF classification, in accordance with some aspects of the present disclosure.

In VVC, a video coder may apply an adaptive loop filter (ALF) with block-based filter adaption. For the luma component, one among 25 filters is selected for each 4×4 block, based on the direction and activity of local gradients. In some aspects, as illustrated in FIGS. 11A-11B, two diamond filter shapes are used. The 7×7 diamond shape 1100 may be applied for a luma component and the 5×5 diamond shape 1102 is applied for the chroma components. For luma component, each 4×4 block is categorized into one out of 25 classes. The classification index C is derived based on its directionality D and a quantized value of activity Â, as follows:

$$C = 5D + \hat{A} \quad \text{(eq. 1)}$$

To calculate D and Â, gradients of the horizontal, vertical and two diagonal direction are first calculated using 1-D Laplacian:

$$g_v = \sum_{k=i-2}^{i+3}\sum_{l=j-2}^{j+3} V_{k,l},\ V_{k,l} = |2R(k,l) - R(k,l-1) - R(k,l+1)| \quad \text{(eq. 2)}$$

$$g_h = \sum_{k=i-2}^{i+3}\sum_{l=j-2}^{j+3} H_{k,l},\ H_{k,l} = |2R(k,l) - R(k-1,l) - R(k+1,l)| \quad \text{(eq. 3)}$$

$$g_{d1} = \sum_{k=i-2}^{i+3}\sum_{l=j-3}^{j+3} D1_{k,l},\quad D1_{k,l} = |2R(k,l) - R(k-1,l-1) - R(k+1,l+1)| \quad \text{(eq. 4)}$$

$$g_{d2} = \sum_{k=i-2}^{i+3}\sum_{j=j-2}^{j+3} D2_{k,l},\quad D2_{k,l} = |2R(k,l) - R(k-1,l+1) - R(k+1,l-1)| \quad \text{(eq. 5)}$$

Where indices i and j refer to the coordinates of the upper left sample within the 4×4 block and R(i, j) indicates a reconstructed sample at coordinate (i,j). In some aspects, to reduce the complexity of block classification, the subsampled 1-D Laplacian calculation is applied. As illustrated by the subsampled for the different gradients 1200 -1206 in FIGS. 12A-12D, the same subsampled positions are used for gradient calculation of all directions. Then D maximum and minimum values of the gradients of horizontal and vertical directions are set as:

$$g_{h,v}^{max} = \max(g_h, g_v),\ g_{h,v}^{min} = \min(g_h, g_v) \quad \text{(eq. 6)}$$

The maximum and minimum values of the gradient of two diagonal directions are set as:

$$g_{d0,d1}^{max} = \max(g_{d0}, g_{d1}),\ g_{d0,d1}^{min} = \min(g_{d0}, g_{d1}) \quad \text{(eq. 7)}$$

To derive the value of the directionality D, these values are compared against each other and with two thresholds $t_1$ and $t_2$ as follows:

Step 1. If both $$g_{h,v}^{max} \le t_1 \cdot g_{h,v}^{min} \text{ and } g_{d0,d1}^{max} \le t_1 \cdot g_{d0,d1}^{min}$$

are true, D is set to 0.

Step 2. If $$g_{h,v}^{max}/g_{h,v}^{min} > g_{d0,d1}^{max}/g_{d0,d1}^{min},$$

continue from Step 3; otherwise continue from Step 4.

Step 3.If $$g_{h,v}^{max} > t_2 \cdot g_{h,v}^{min},$$

D is set to 2; otherwise D is set to 1.

Step 4. If $$g_{d0,d1}^{max} > t_2 \cdot g_{d0,d1}^{min},$$

D is set to 4; otherwise D is set to 3.

The activity value A is calculated as:

$$A = \sum_{k=i-2}^{i+3}\sum_{l=j-2}^{j+3} (V_{k,l} + H_{k,l}) \quad \text{(eq. 8)}$$

A is further quantized to the range of 0 to 4, inclusively, and the quantized value is denoted as Â.

For chroma components in a picture, no classification method is applied, i.e. a single set of ALF coefficients is applied for each chroma component.

Before filtering each 4×4 luma block, geometric transformations such as rotation or diagonal and vertical flipping are applied to the filter coefficients f (k,l) and to the corresponding filter clipping values c(k,l) depending on gradient values calculated for that block. This is equivalent to applying these transformations to the samples in the filter support region. In some aspects, application of the transformations provides similarity among different blocks to which ALF has been applied by aligning their directionality. In some aspects, three geometric transformations, including diagonal, vertical flip and rotation are introduced:

$$\text{Diagonal: } f_D(k,l) = f(l,k),\ c_D(k,l) = c(l,k) \quad \text{(eq. 9)}$$

$$\text{Vertical flip: } f_V(k,l) = f(k, K-l-1),\ c_V(k,l) = c(k, K-l-1) \quad \text{(eq. 10)}$$

$$\text{Rotation: } f_R(k,l) = f(K-l-1, k),\ c_R(k,l) = c(K-l-1, k) \quad \text{(eq. 11)}$$

Where K is the size of the filter and 0≤k,l≤K−1 are coefficient coordinates, such that location (0,0) is at the upper left corner and location (K−1,K−1) is at the lower right corner. The transformations may be applied to the filter coefficients f(k,l) and to the clipping values c(k,l) depending on gradient values calculated for that block. The relationship between the transformation and the four gradients of the four directions are summarized in the following table.

TABLE 4

Mapping of the gradient calculated for one block and the transformations

| Gradient values | Transformation |
|---|---|
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation |

In the VTM, ALF filter parameters are signaled in Adaptation Parameter Set (APS). In one APS, up to 25 sets of luma filter coefficients and clipping value indexes, and up to one set of chroma filter coefficients and clipping value indexes could be signaled. To reduce bits overhead, filter coefficients of different classification can be merged. In slice header, the indices of the APSs used for the current slice are signaled.

In some aspects, clipping value indexes, which are decoded from the APS, allow determining clipping values using a Luma table of clipping values and a Chroma table of clipping values. These clipping values are dependent of the internal bitdepth. More precisely, the Luma table of clipping values and Chroma table of clipping values are obtained by the following formulas:

$$AlfClip_L = \left\{\text{round}\left(2^{B\frac{N-n+1}{N}}\right) \text{ for } n \in [1 \ldots N]\right\}, \quad \text{(eq. 12)}$$

$$AlfClip_C = \left\{\text{round}\left(2^{(B-8)+8\frac{(N-n)}{N-1}}\right) \text{ for } n \in [1 \ldots N]\right\} \quad \text{(eq. 13)}$$

Where B is equal to the internal bitdepth and N is equal to 4, which is the number of allowed clipping values in VTM.

In some aspects, the filtering process may be controlled at CTB level. Further, a flag may be signaled to indicate whether ALF is applied to a luma CTB. A luma CTB can choose a filter set among 16 fixed filter sets and the filter sets from APSs. A filter set index is signaled for a luma CTB to indicate which filter set is applied. The 16 fixed filter sets are pre-defined and hard-coded in both the encoder and the decoder.

The filter coefficients are quantized with norm equal to 128. In some aspects, in order to restrict the multiplication complexity, a bitstream conformance is applied so that the coefficient value of the non-central position shall be in the range of −27 to 27 −1, inclusive. Further, in some aspects, the central position coefficient is not signaled (i.e., excluded) in the bitstream and is considered as equal to 128.

At decoder side, when ALF is enabled for a CTB, each sample R(i,j) within the CU is filtered, resulting in sample value R'(i,j) as shown below, $$R'(i, j) = R(i, j) + \left(\left(\sum_{k\neq 0}\sum_{l\neq 0} f(k, l) \times K(R(i+k, j+l) - R(i, j),\ c(k, l)) + 64\right) \gg 7\right) \quad \text{(eq. 14)}$$

Where f(k,l) denotes the decoded filter coefficients, K(x, y) is the clipping function and c(k,l) denotes the decoded clipping parameters. The variable k and l varies between $$-\frac{L}{2} \text{ and } \frac{L}{2}$$

where L denotes the filter length. The clipping function K(x,y)=min(y,max(−y,x)) which corresponds to the function Clip3 (−y, y, x).

Figure 13:
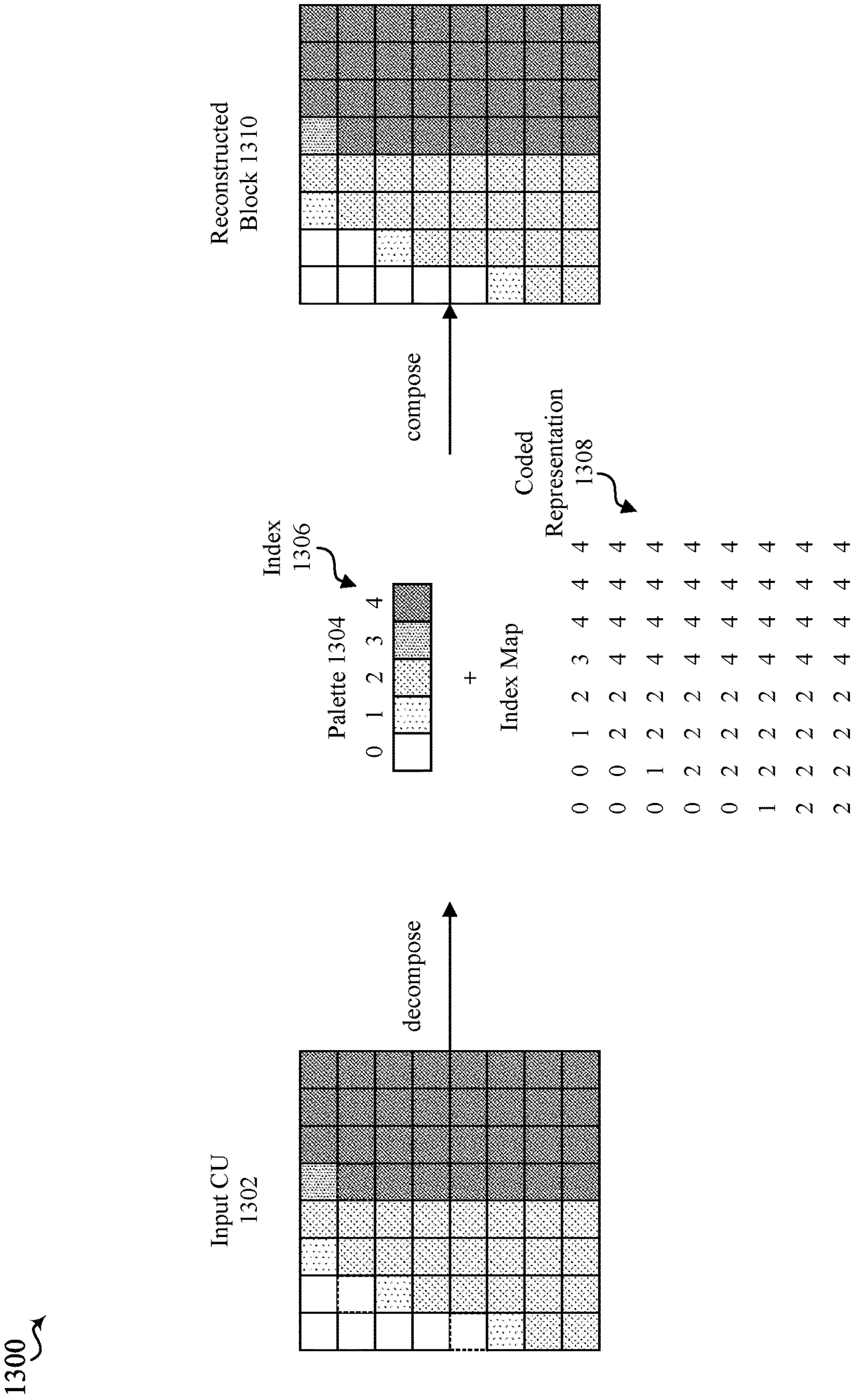
FIG. 13 illustrates a coding unit (CU) coded in a palette mode, in accordance with some aspects of the present disclosure.

FIG. 13 is a diagram 1300 that illustrates a CU coded in a palette mode, in accordance with some aspects of the present disclosure. As described herein, a coding process may enable or disable a palette mode for improved performance. In palette mode, the pixels in a CU are represented by a small set of representative color values referred to as a palette 1304. Further, in some aspects, the palette mode may indicate a sample that is outside the palette by signaling an escape symbol followed by component values or quantized component values. As used herein, in some aspects, an "escape pixel" may refer to a pixel that has not been signaled using the palette.

As illustrated in in Error! Reference source not found., a video encoder may identify the colors within the CU 1302, and generate an index 1306 for the colors of a palette 1304. Further, the video coder may generate a coded representation of 1308 the CU via palette coding. Upon receipt of the code coded representation 1308, a video decoder may employ the index 1306 to generate the reconstructed CU 1310.

Figure 14:
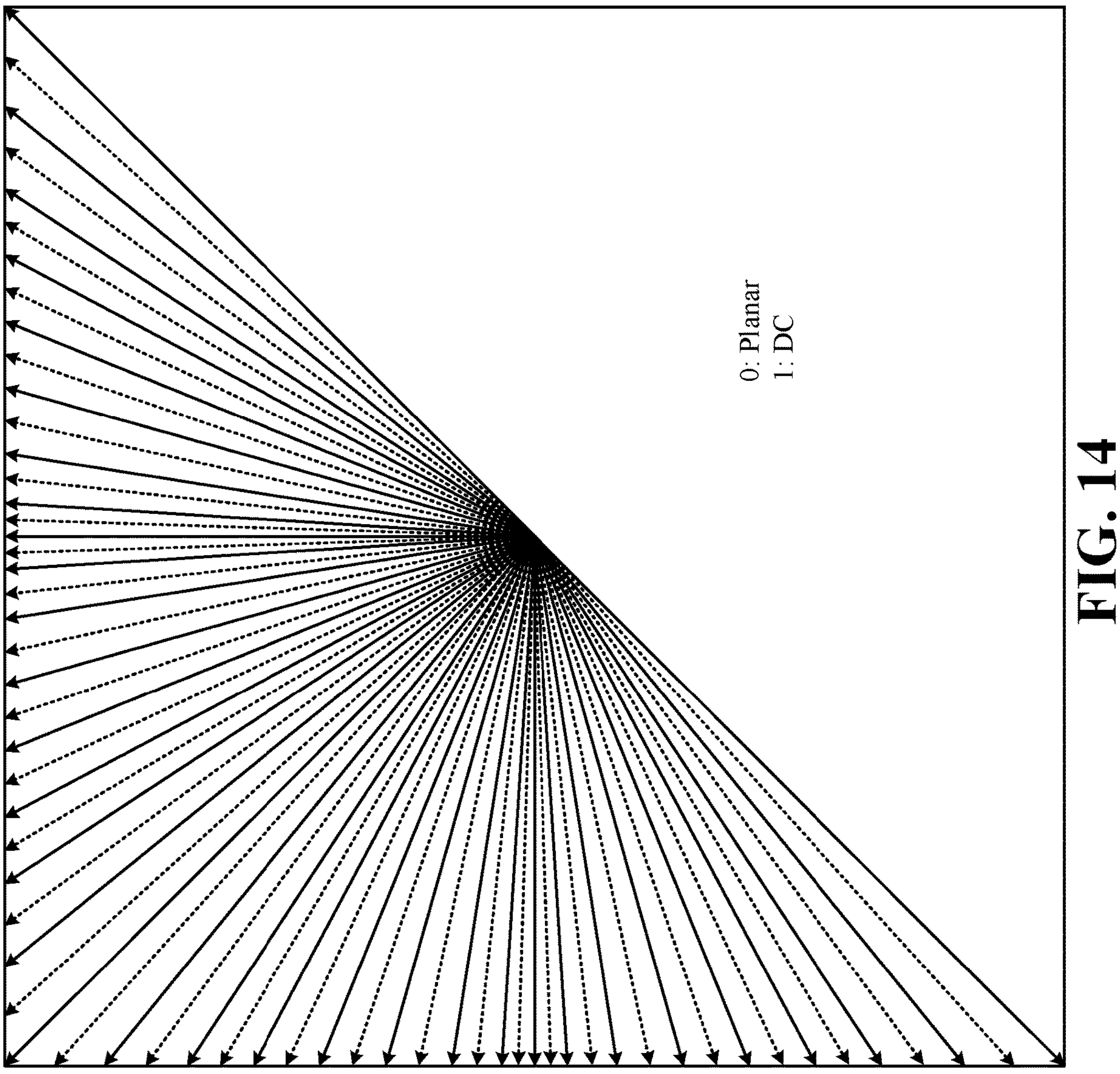
FIG. 14 is a diagram that illustrates examples of intra prediction modes in a compression operation (e.g., VVC), in accordance with various aspects of the disclosure

FIG. 14 is a diagram 1400 illustrating examples of intra prediction modes in a compression operation (e.g., VVC), in accordance with various aspects of the disclosure. In some aspects, to capture the arbitrary edge directions presented in natural video, the number of directional intra modes in VTM4 is extended from 33, as used in HEVC, to 65. The new directional modes not in HEVC are depicted as dotted lines in FIG. 14, and the planar and DC modes remain the same. These denser directional intra prediction modes apply for all block sizes and for both luma and chroma intra predictions.

Further, In the VTM4, the results of intra prediction of planar mode are further modified by a position dependent intra prediction combination (PDPC) method. PDPC is an intra prediction method which invokes a combination of the un-filtered boundary reference samples and HEVC style intra prediction with filtered boundary reference samples. PDPC is applied to the following intra modes without signaling: planar, DC, horizontal, vertical, bottom-left angular mode and its eight adjacent angular modes, and top-right angular mode and its eight adjacent angular modes.

The prediction sample pred(x,y) is predicted using an intra prediction mode (DC, planar, angular) and a linear combination of reference samples according to the equation as follows:

$$pred(x,y)=(wL\times R_{-1,y}+wT\times R_{x,-1}-wTL\times R_{-1,-1}+(64-wL-wT+wTL)\times pred(x,y)+32)\gg 6 \quad \text{(eq. 15)}$$

Where Rx,−1, R−1,y represent the reference samples located at the top and left of current sample (x,y), respectively, and R−1,−1 represents the reference sample located at the top-left corner of the current block.

In some aspects, if PDPC is applied to DC, planar, horizontal, and vertical intra modes, additional boundary filters are not needed, as required in the case of HEVC DC mode boundary filter or horizontal/vertical mode edge filters.

Figure 15:
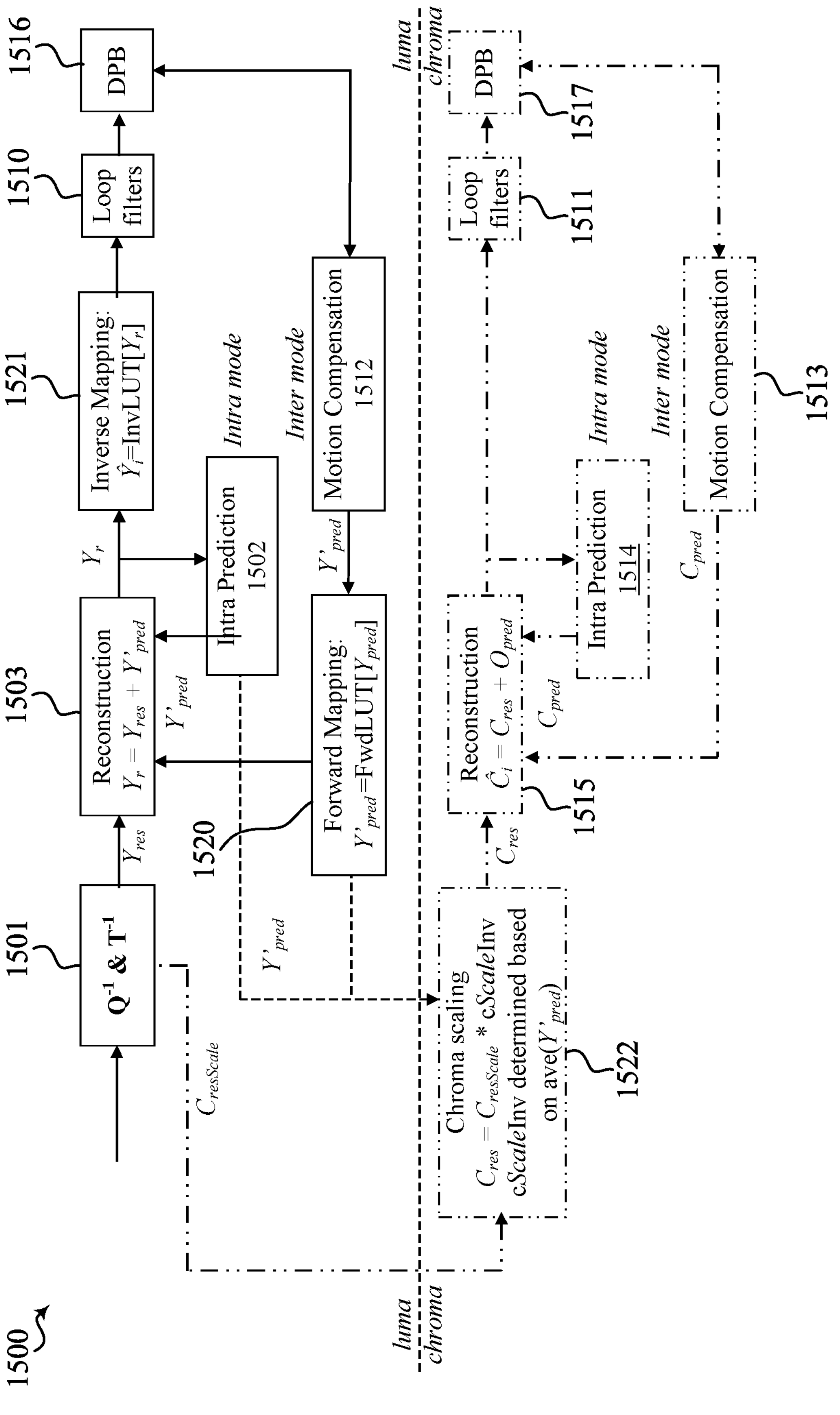
FIG. 15 is a diagram that illustrates an example architecture for luma mapping with chroma scaling, in accordance with various aspects of the disclosure.

FIG. 15 shows an exemplary architecture 1500 for luma mapping with chroma scaling, in accordance with various aspects of the disclosure. As illustrated in FIG. 15, in VTM4, a coding tool called luma mapping with chroma scaling (LMCS) may be incorporated as a processing block before the loop filters. LMCS has two main components: 1) in-loop mapping of the luma component based on adaptive piecewise linear models; 2) for the chroma components, luma-dependent chroma residual scaling is applied. As described herein, a coding process may enable or disable LMCS for improved performance.

In particular, Error! Reference source not found. illustrates an example of LMCS architecture 1500 from a decoder perspective. Further, the blocks 1501-1503 in FIG. 15 indicate where the processing is applied in the mapped domain; and these include the inverse quantization and inverse transform 1501, luma intra prediction 1502, and adding of the luma prediction together with the luma residual 1503. In addition, the blocks 1510-1517 in FIG. 15 indicate where the processing is applied in the original (i.e., non-mapped) domain; and these include loop filters 1510-1511 such as deblocking, ALF, and SAO, motion compensated prediction 1512-1513, chroma intra prediction 1514, adding of the chroma prediction together with the chroma residual 1515, and storage of decoded pictures as reference pictures 1516-1517. The blocks 1520 -1522 in Error! Reference source not found. are the new LMCS functional blocks, including forward and inverse mapping 1520-1521 of the luma signal and a luma-dependent chroma scaling process 1522. Like most other tools in VVC, LMCS can be enabled/disabled at the sequence level using an SPS flag.

Figure 16A:
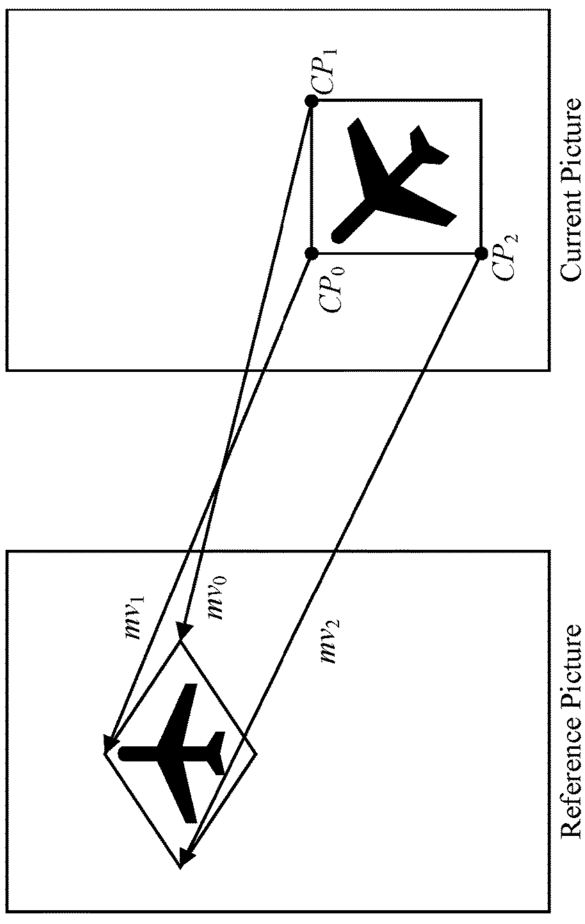
FIG. 16A is a diagram that illustrates an example of a 4-paramenter affine model, in accordance with various aspects of the disclosure.
Figure 16B:
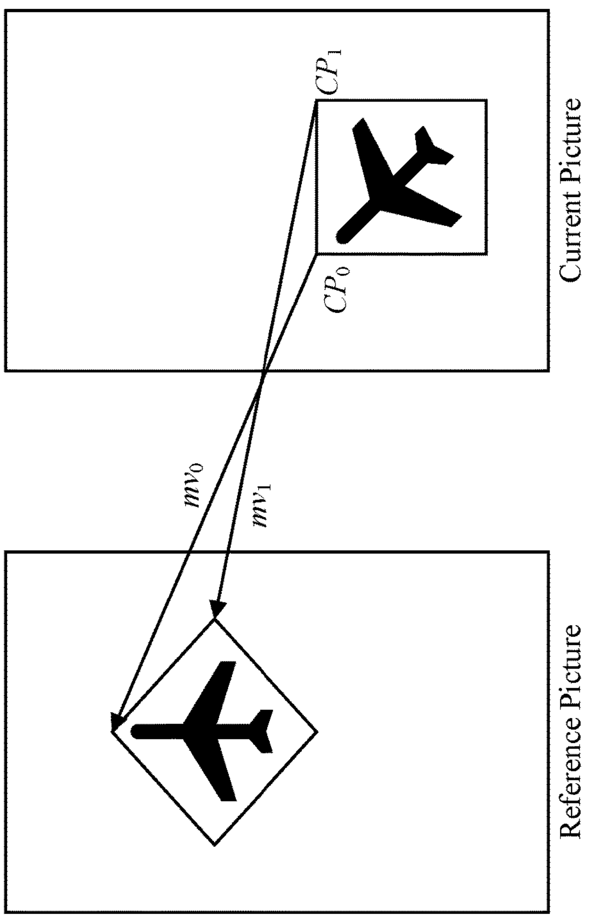
FIG. 16B is a diagram that illustrates an example of a 6-parameter affine model, in accordance with various aspects of the disclosure.
Figure 17:
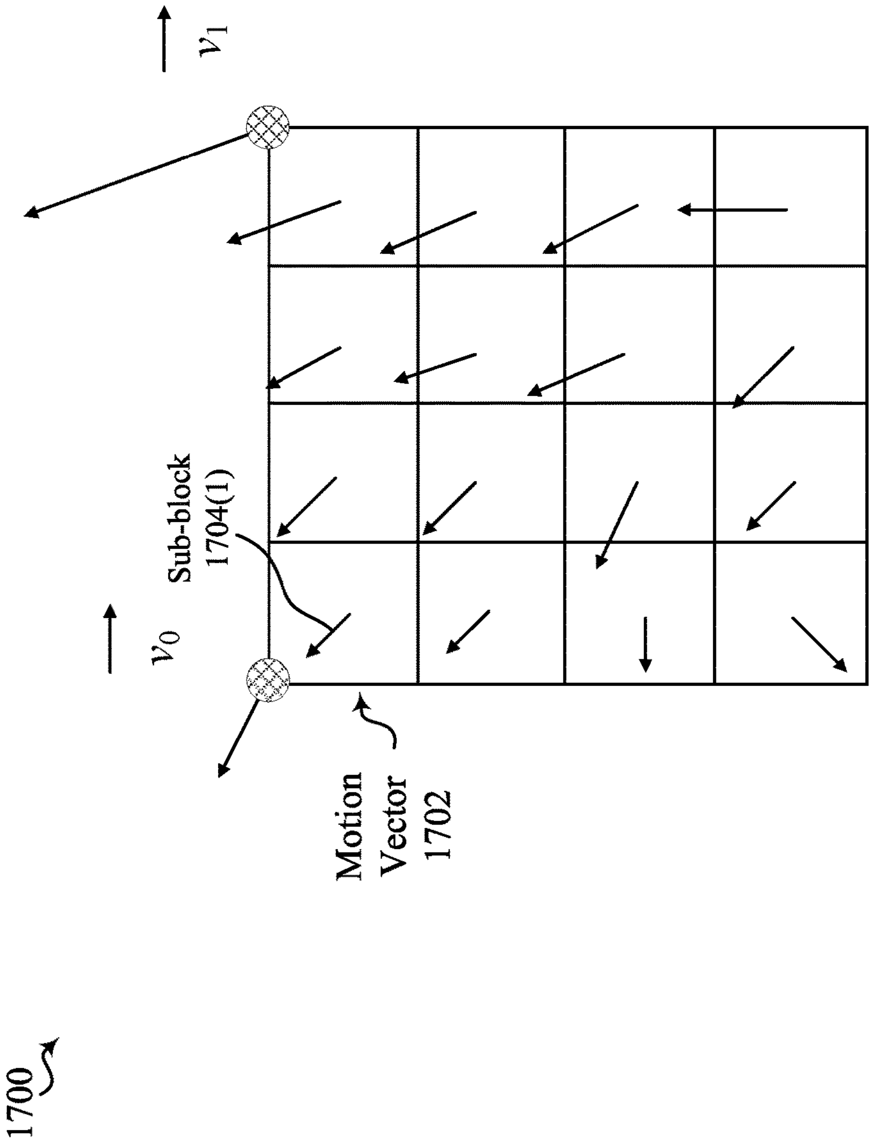
FIG. 17 is a diagram that illustrates an example of affine MVF per sub block, in accordance with various aspects of the disclosure.

FIGS. 16A-16B show examples of 4-paramenter affine model 1600 and 6-parameter affine model 1602, in accordance with various aspects of the disclosure. In HEVC, only translation motion model is applied for motion compensation prediction (MCP). While in the real world, there are many kinds of motion, e.g. zoom in/out, rotation, perspective motions and the other irregular motions. In VVC, a simplified affine transform motion compensation prediction is applied with 4-parameter affine model and 6-parameter affine model. As shown FIGS. 16A-16B, the affine motion field of the block is described by two control point motion vectors (CPMVs) for the 4-parameter affine model and 3 CPMVs for the 6-parameter affine model.

The motion vector field (MVF) of a block is described by the following equations with the 4-parameter affine model (wherein the 4-parameter are defined as the variables a, b, e and f) in equation 16 and 6-parameter affine model (wherein the 4-parameter are defined as the variables a, b, c, d, e and f) in equation 17 respectively:

$$\begin{cases} mv^h(x,y)=ax-by+e=\dfrac{(mv_1^h-mv_0^h)}{w}x-\dfrac{(mv_1^v-mv_0^v)}{w}y+mv_0^h \\ mv^v(x,y)=bx+ay+f=\dfrac{(mv_1^v-mv_0^v)}{w}x+\dfrac{(mv_1^h-mv_0^h)}{w}y+mv_0^v \end{cases} \quad \text{(eq. 16)}$$

$$\begin{cases} mv^h(x,y)=ax+cy+e=\dfrac{(mv_1^h-mv_0^h)}{w}x+\dfrac{(mv_2^h-mv_0^h)}{h}y+mv_0^h \\ mv^v(x,y)=bx+dy+f=\dfrac{(mv_1^v-mv_0^v)}{w}x+\dfrac{(mv_2^v-mv_0^v)}{h}y+mv_0^v \end{cases} \quad \text{(eq. 17)}$$

Where (mvh0,mvh0) is motion vector of the top-left corner control point, and (mvh1,mvh1) is motion vector of the top-right corner control point and (mvh2, mvh2) is motion vector of the bottom-left corner control point, all of the three motion vectors are called control point motion vectors (CPMV), (x,y) represents the coordinate of a representative point relative to the top-left sample within current block and (mvh(x,y),mvv(x,y)) is the motion vector derived for a sample located at (x,y). The CP motion vectors may be signaled (like in the affine AMVP mode) or derived on-the-fly (like in the affine merge mode). w and h are the width and height of the current block. In practice, the division is implemented by right-shift with a rounding operation. In VTM, the representative point is defined to be the center position of a sub-block, e.g., when the coordinate of the left-top corner of a sub-block relative to the top-left sample within current block is (xs,ys), the coordinate of the representative point is defined to be (xs+2,ys+2). For each sub-block (i.e., 4×4 in VTM), the representative point is utilized to derive the motion vector for the whole sub-block.

In order to further simplify the motion compensation prediction, sub-block based affine transform prediction is applied. To derive motion vector of each M×N (both M and N are set to 4 in current VVC) sub-block, the motion vector 1702 of the center sample of each sub-block 1704, as shown in Error! Reference source not found. 17, is calculated according to Equation (1) and (2), and rounded to 1/16fraction accuracy. Then the motion compensation interpolation filters for 1/16-pel are applied to generate the prediction of each sub-block with derived motion vector. The interpolation filters for 1/16-pel are introduced by the affine mode.

Figure 18:
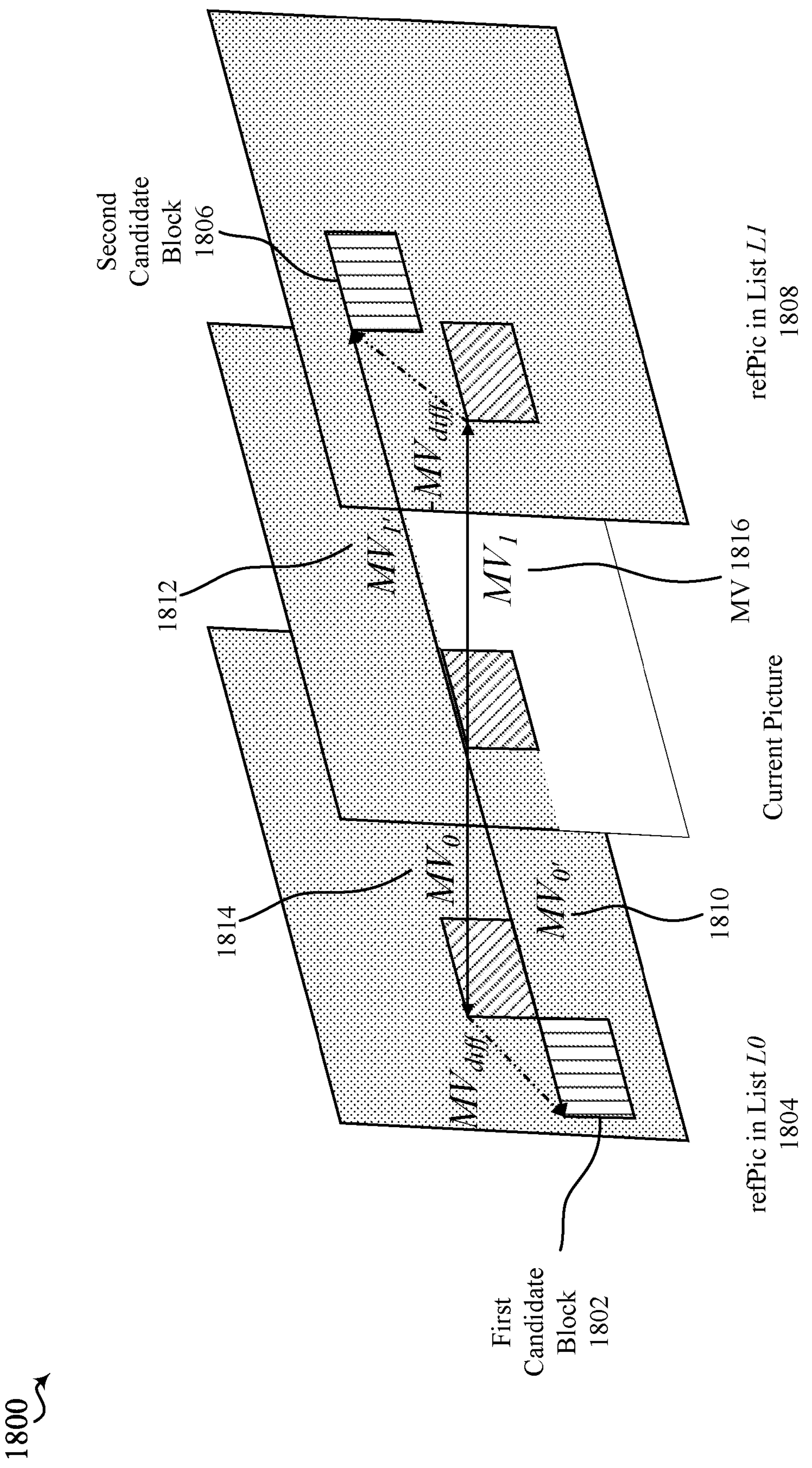
FIG. 18 is a diagram that illustrates an example of decoder side motion vector refinement (DMVR), in accordance with various aspects of the disclosure.

FIG. 18 is a diagram 1800 that illustrates an example of DMVR, in accordance with various aspects of the disclosure. As described herein, a coding process may enable or disable DMVR for improved performance.

In some aspects, in order to increase the accuracy of the motion vectors (MVs) of the merge mode, a bilateral-matching based decoder side motion vector refinement is applied in VVC. The bilateral template matching applied in the decoder to perform a distortion-based search between a bilateral template and the reconstruction samples in the reference pictures in order to obtain a refined MV without transmission of additional motion information.

In a bi-prediction operation, a video decoder may search for a refined MV around the initial MVs in the reference picture list L0and reference picture list L1. For multiple-reference picture management, a particular set of previously decoded pictures needs to be present in the decoded picture buffer (DPB) for the decoding of the remainder of the pictures in the bitstream. Further, there are two lists that are constructed as lists of pictures in the DPB, and these are called reference picture list 0 and list 1. An index called a reference picture index is used to identify a particular picture in one of these lists. For uni-prediction, a picture can be selected from either of these lists. For bi-prediction, two pictures are selected—one from each list.

Further, the video decoder may implement a bi-lateral matching method that calculates the distortion between a first candidate block 1802 in the reference picture list L0 1804 and a second candidate block 1806 in the reference picture list L1 1808. As illustrated in FIG. 18, the video decoder may calculate a sum of absolute differences (SAD) between the first candidate block 1802 and the second candidate block 1806 based on each of the MV candidates 1810-1812 around the initial MVs 1814-1816. The MV candidate with the lowest SAD becomes the refined MV and used to generate the bi-predicted signal.

Figure 19:
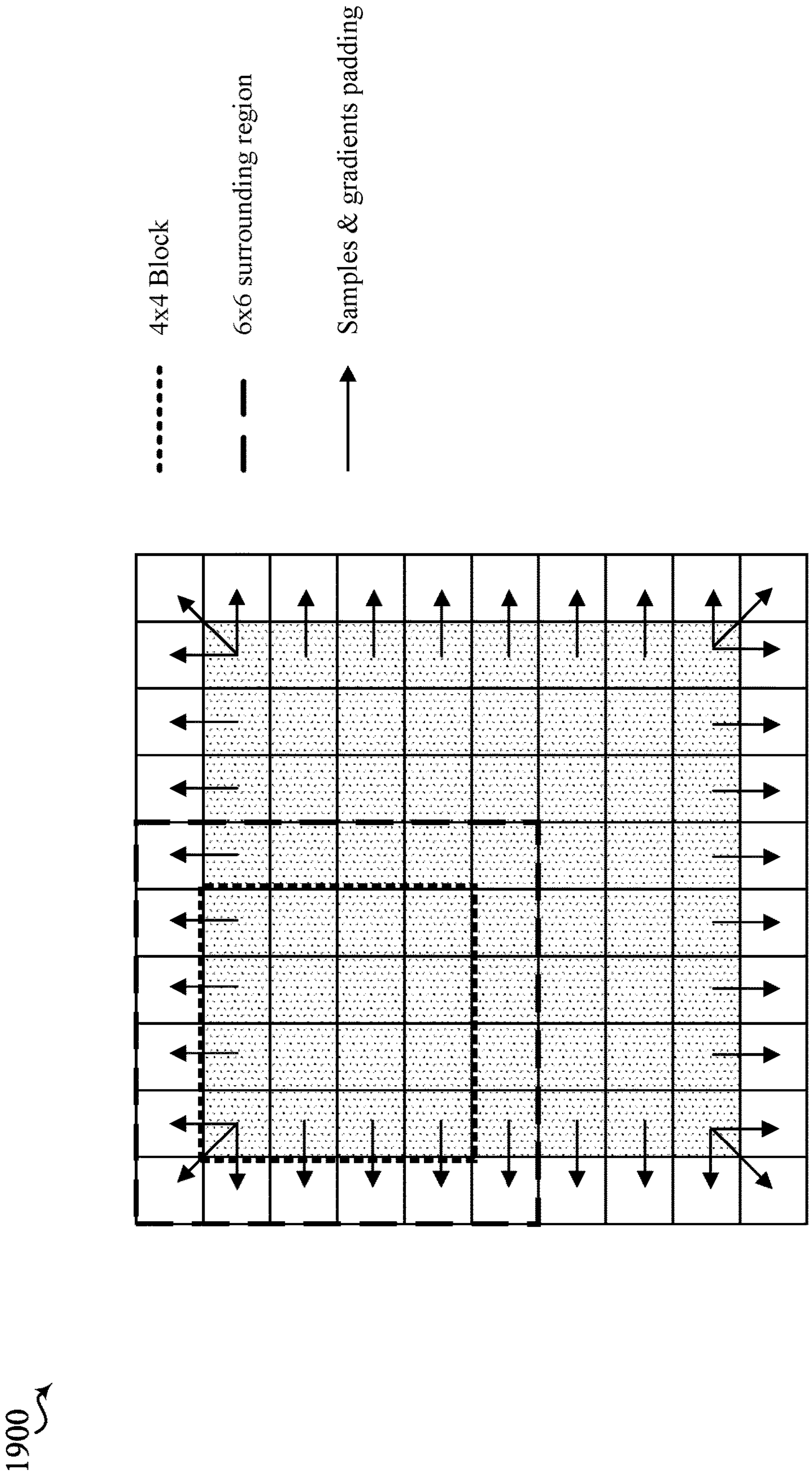
FIG. 19 is a diagram that illustrates an example of an example extended CU region used in a bi-directional optical flow (BDOF) tool, in accordance with various aspects of the disclosure.

FIG. 19 is a diagram 1900 that illustrates an example extended CU region used in a BDOF tool, in accordance with various aspects of the disclosure. In some aspects, a BDOF tool may be included in VVC. Further, as described herein, a coding process may enable or disable BDOF tool for improved performance.

In some examples, BDOF is used to refine the bi-prediction signal of a CU at the 4×4 sub-block level. For example, BDOF may be applied to a CU if it satisfies all the following conditions: the CU is coded using "true" bi-prediction mode, i.e., one of the two reference pictures is prior to the current picture in display order and the other is after the current picture in display order, the distances (i.e. POC difference) from two reference pictures to the current picture are same, both reference pictures are short-term reference pictures, the CU is not coded using affine mode or the ATMVP merge mode, the CU has more than 64 luma samples, both CU height and CU width are larger than or equal to 8 luma samples, the BCW weight index indicates equal weight, the WP is not enabled for the current CU, and the CIIP mode is not used for the current CU.

In some aspects, BDOF is only applied to the luma component. Further, the BDOF mode may be based on an optical flow concept, which assumes that the motion of an object is smooth. For each 4×4 sub-block, a motion refinement $(v_x,v_y)$ is calculated by minimizing the difference between the L0 and L1 prediction samples. The motion refinement is then used to adjust the bi-predicted sample values in the 4×4 sub-block.

The following steps are applied in the BDOF process.

First, the horizontal and vertical gradients, $$\frac{\partial I^{(k)}}{\partial x}(i,j) \text{ and } \frac{\partial I^{(k)}}{\partial y}(i,j),$$

k=0,1, of the two prediction signals are computed by directly calculating the difference between two neighboring samples, i.e., $$\frac{\partial I^{(k)}}{\partial x}(i,j) = \left(\left(I^{(k)}(i+1,j) \gg shift1\right) - \left(I^{(k)}(i-1,j) \gg shift1\right)\right) \quad \text{(eq. 18)}$$

$$\frac{\partial I^{(k)}}{\partial y}(i,j) = \left(\left(I^{(k)}(i,j+1) \gg shift1\right) - \left(I^{(k)}(i,j-1) \gg shift1\right)\right)$$

Where $I^{(k)}(i,j)$ are the sample value at coordinate (i,j) of the prediction signal in list k, k=0,1, and shift1 is calculated based on the luma bit depth, bitDepth, as shift1=max(6, bitDepth−6).

Then, the auto- and cross-correlation of the gradients, $S_1$, $S_2$, $S_3$, $S_5$ and $S_6$, are calculated as:

$$S_1 = \Sigma_{(i,j)\in\Omega}\mathrm{Abs}(\psi_x(i,j)), \quad \text{(eq. 19)}$$

$$S_3 = \Sigma_{(i,j)\in\Omega}\theta(i,j)\cdot\mathrm{Sign}(\psi_x(i,j))$$

$$S_2 = \sum_{(i,j)\in\Omega}\psi_x(i,j)\cdot\mathrm{Sign}(\psi_y(i,j))$$

$$S_5 = \Sigma_{(i,j)\in\Omega}\mathrm{Abs}(\psi_y(i,j)),$$

$$S_6 = \Sigma_{(i,j)\in\Omega}\theta(i,j)\cdot\mathrm{Sign}(\psi_y(i,j))$$

Where $$\psi_x(i,j) = \left(\frac{\partial I^{(1)}}{\partial x}(i,j) + \frac{\partial I^{(0)}}{\partial x}(i,j)\right) \gg n_a \quad \text{(eq. 20)}$$

$$\psi_y(i,j) = \left(\frac{\partial I^{(1)}}{\partial y}(i,j) + \frac{\partial I^{(0)}}{\partial y}(i,j)\right) \gg n_a$$

$$\theta(i,j) = \left(I^{(1)}(i,j) \gg n_b\right) - \left(I^{(0)}(i,j) \gg n_b\right)$$

Where Ω is a 6×6 window around the 4×4 sub-block, and the values of $n_a$ and $n_b$ are set equal to min(1, bitDepth−11) and min(4, bitDepth−8), respectively.

The motion refinement $(v_x,v_y)$ is then derived using the cross- and auto-correlation terms using the following:

$$v_x = S_1 > 0?\,clip3(-th'_{BIO}, th'_{BIO}, -((S_3\cdot 2^{n_b-n_a}) \gg \lfloor \log_2 S_1 \rfloor)):\ 0 \quad \text{(eq. 21)}$$

$$v_y = S_5 > 0?\,clip3$$

$$\left(-th'_{BIO}, th'_{BIO}, -\left(\left(S_6\cdot 2^{n_b-n_a} - \left((v_x S_{,2m}) \ll n_{S_2} + v_x S_{2,s}\right)/2\right) \gg \lfloor \log_2 S_5 \rfloor\right)\right):\ 0$$

Where $S_{2,m}=S_2>>n_{s_2}$, $$S_{2,s} = S_2\ \&\left(2^{n_{S_2}} - 1\right),$$

$th'_{BIO}2^{max(5,BD-7)}$). ⌊•⌋ is the floor function, and $n_{s_2}$=12.

Based on the motion refinement and the gradients, the following adjustment is calculated for each sample in the 4×4 sub-block:

$$b(x,y) = rnd\left(\left(v_x\left(\frac{\partial I^{(1)}(x,y)}{\partial x} - \frac{\partial I^{(0)}(x,y)}{\partial x}\right) + v_y\left(\frac{\partial I^{(1)}(x,y)}{\partial y} - \frac{\partial I^{(0)}(x,y)}{\partial y}\right) + 1\right)/2\right) \quad \text{(eq. 17)}$$

Finally, the BDOF samples of the CU are calculated by adjusting the bi-prediction samples as follows:

$$pred_{BDOF}(x,y) = \left(I^{(0)}(x,y) + I^{(1)}(x,y) + b(x,y) + o_{offset}\right) \gg \text{shift} \quad \text{(eq. 18)}$$

These values are selected such that the multipliers in the BDOF process do not exceed 15-bit, and the maximum bit-width of the intermediate parameters in the BDOF process is kept within 32-bit.

In some aspects, in order to derive the gradient values, some prediction samples $I^{(k)}(i,j)$ in list k(k=0,1) outside of the current CU boundaries need to be generated. As illustrated in FIG. 19, the BDOF in VVC uses one extended row/column around the CU's boundaries. In order to control the computational complexity of generating the out-of-boundary prediction samples, prediction samples in the extended area (white positions) are generated by taking the reference samples at the nearby integer positions (using floor( )operation on the coordinates) directly without interpolation, and the normal 8-tap motion compensation interpolation filter is used to generate prediction samples within the CU (gray positions). These extended sample values are used in gradient calculation only. For the remaining steps in the BDOF process, if any sample and gradient values outside of the CU boundaries are needed, they are padded (i.e. repeated) from their nearest neighbors.

When the width and/or height of a CU are larger than 16 luma samples, it will be split into sub-blocks with width and/or height equal to 16 luma samples, and the sub-block boundaries are treated as the CU boundaries in the BDOF process. The maximum unit size for BDOF process is limited to 16×16. For each sub-block, the BDOF process could skipped. When the SAD of between the initial L0 and L1 prediction samples is smaller than a threshold, the BDOF process is not applied to the sub-block. The threshold is set equal to (8*W*(H>>1), where W indicates the sub-block width, and H indicates sub-block height. To avoid the additional complexity of SAD calculation, the SAD between the initial L0 and L1 prediction samples calculated in DVMR process is re-used here.

If BCW is enabled for the current block, i.e., the BCW weight index indicates unequal weight, then bi-directional optical flow is disabled. Similarly, if WP is enabled for the current block, i.e., the luma_weight_1x_flag is 1 for either of the two reference pictures, then BDOF is also disabled. When a CU is coded with symmetric MVD mode or CIIP mode, BDOF is also disabled.

Figure 20:
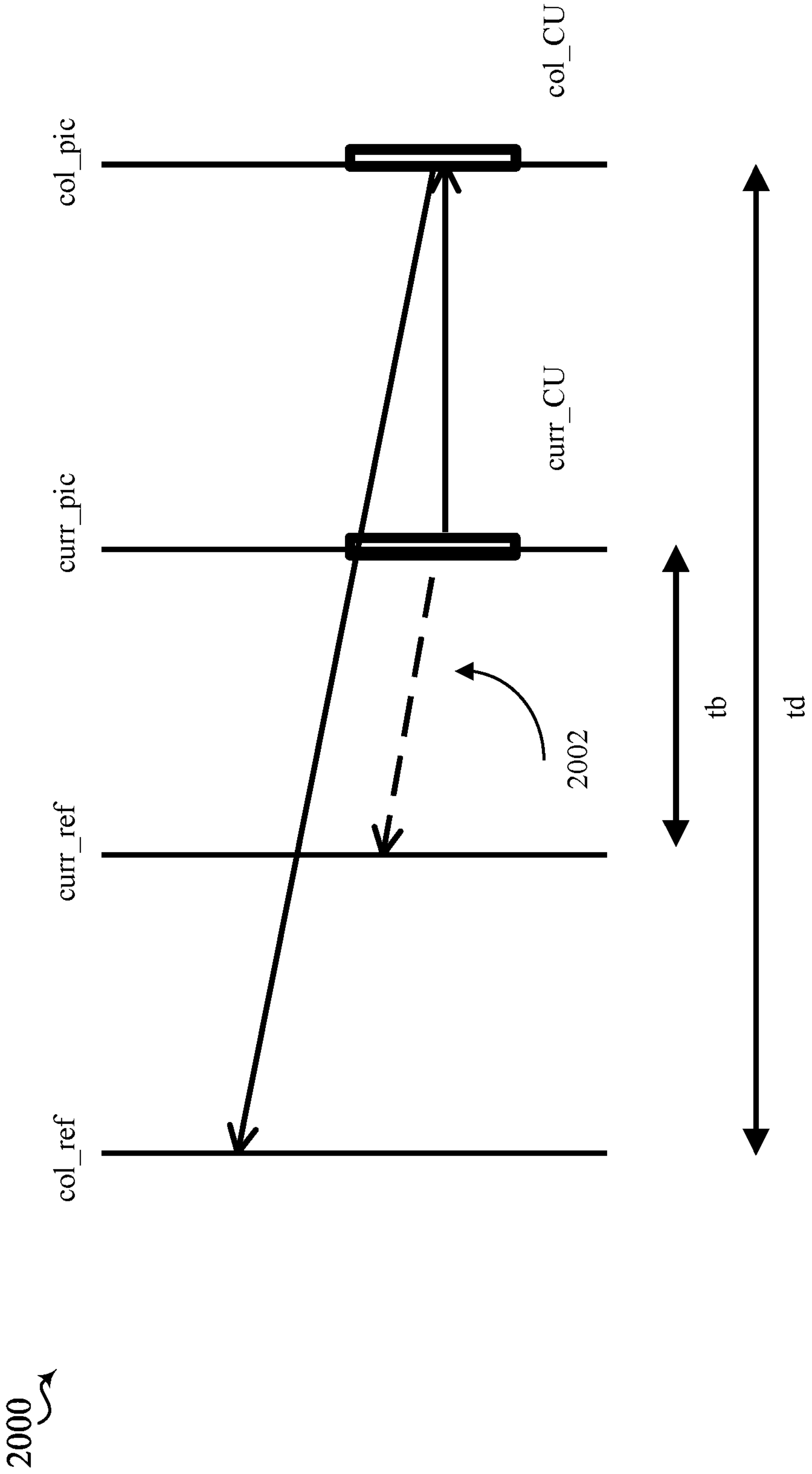
FIG. 20 is a diagram that illustrates an example of motion vector scaling for a temporal merge candidate, in accordance with various aspects of the disclosure.

FIG. 20 is a diagram 2000 that illustrates an example of candidate positions for temporal merge candidate, in accordance with various aspects of the disclosure. In some aspects, a video coder may implement a temporal motion vector prediction (TMVP) process that employs a motion vector in the previous coded frame to predict the current motion vector. Particularly, in the derivation of this temporal candidate, a scaled motion vector is derived based on co-located CU belonging to the co-located reference picture. The reference picture list to be used for derivation of the co-located CU is explicitly signaled in the slice header.

The scaled motion vector for temporal merge candidate 2002 is obtained as illustrated by the dotted line 2002 in FIG. 20, which is scaled from the motion vector of the co-located CU using the POC distances, tb and td, where tb is defined to be the POC difference between the reference picture of the current picture and the current picture, and td is defined to be the POC difference between the reference picture of the co-located picture and the co-located picture. The reference picture index of temporal merge candidate is set equal to zero.

Figure 21:
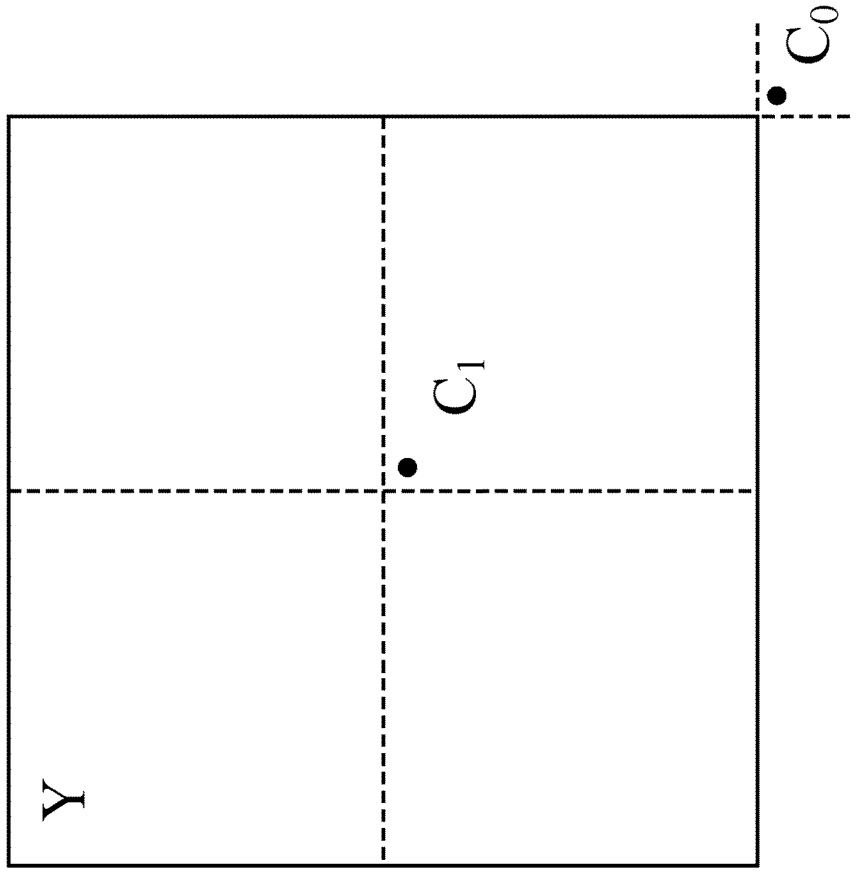
FIG. 21 is a diagram that illustrates an example of candidate positions for temporal merge candidates, in accordance with various aspects of the disclosure.

Further, the position for the temporal candidate is selected between candidates C0 and C1, as depicted in diagram 2100 of FIG. 21. If CU at position C0 is not available, is intra coded, or is outside of the current row of CTUs, position C1 is used. Otherwise, position C0 is used in the derivation of the temporal merge candidate.

Figure 22:
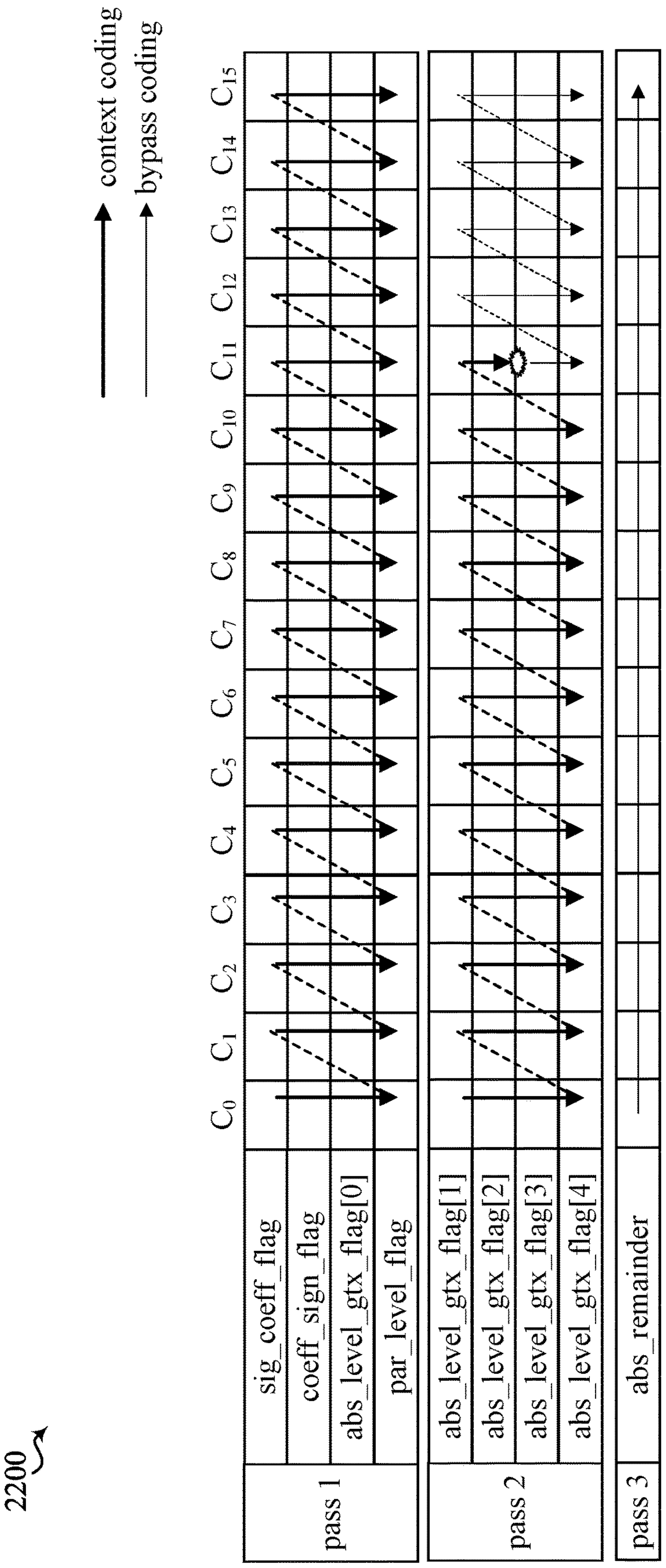
FIG. 22 is a diagram that illustrates an example residual coding process, in accordance with various aspects of the disclosure.

FIG. 22 illustrates residual coding passes for transform skip blocks, in accordance with various aspects of the disclosure. VVC allows the transform skip mode to be used for luma blocks of size up to MaxTsSize by MaxTsSize, where the value of MaxTsSize is signaled in the PPS and can be at most 32. When a CU is coded in transform skip mode, its prediction residual is quantized and coded using the transform skip residual coding process. In transform skip mode, the residuals of a TU are also coded in units of non-overlapped sub-blocks of size 4×4. For better coding efficiency, some modifications are made to customize the residual coding process towards the residual signal's characteristics. The following summarizes the differences between transform skip residual coding and regular transform residual coding: forward scanning order is applied to scan the sub-blocks within a transform block and also the positions within a sub-block; no signaling of the last (x, y) position; coded_sub_block_flag is coded for every sub-block except for the last sub-block when all previous flags are equal to 0; sig_coeff_flag context modelling uses a reduced template, and context model of sig_coeff_flag depends on top and left neighboring values; context model of abs_level_gt1 flag also depends on the left and top sig_coeff_flag context modelling uses a reduced template, and context model of sig_coeff_flag depends on top and left neighboring values; par_level_flag using only one context model; additional greater than 3, 5, 7, 9 flags are signaled to indicate the coefficient level, one context for each flag; modified rice parameter derivation for the binarization of the remainder values; context model of the sign flag is determined based on left and above neighboring values and the sign flag is parsed after sig_coeff_flag to keep all context coded bins together.

For each sub-block, if the coded_sub-block_flag is equal to 1 (i.e., there is at least one non-zero quantized residual in the sub-block), coding of the quantized residual levels is performed in three scan passes, as illustrated in FIG. 22. During the first scan pass: significance flag (sig_coeff_flag), sign flag (coeff_sign_flag), absolute level greater than 1 flag (abs_level_gtx_flag[0]), and parity (par_level_flag) are coded. For a given scan position, if sig_coeff_flag is equal to 1, then coeff_sign_flag is coded, followed by the abs_level_gtx_flag[0] (which specifies whether the absolute level is greater than 1). If abs_level_gtx_flag[0] is equal to 1, then the par_level_flag is additionally coded to specify the parity of the absolute level. During a greater than x scan pass: for each scan position whose absolute level is greater than 1, up to four abs_level_gtx_flag[i] for i=1 . . . 4 are coded to indicate if the absolute level at the given position is greater than 3, 5, 7, or 9, respectively. During a remainder scan pass: The remainder of the absolute level are coded for all scan positions with abs_level_gtx_flag[4] equal to 1 (that is, the absolute level is greater than 9). The remainder of the absolute levels are binarized using reduced rice parameter derivation template.

The bins in scan passes #1 and #2 (the first scan pass and the greater than x scan pass) are context coded until the maximum number of context coded bins in the TU have been exhausted. The maximum number of context coded bins in a residual block is limited to 2*block_width*block_height, or equivalently, 2 context coded bins per sample position on average. The bins in the last scan pass (the remainder scan pass) are bypass coded.

Further, for a block not coded in the BDPCM mode, a level mapping mechanism is applied to transform skip residual coding. Level mapping uses the top and left neighboring coefficient levels to predict the current coefficient level in order to reduce signaling cost. For a given residual position, denote absCoeff as the absolute coefficient level before mapping and absCoeffMod as the coefficient level after mapping. Let X0 denote the absolute coefficient level of the left neighboring position and let X1 denote the absolute coefficient level of the above neighboring position. The level mapping is performed as follows:

```
pred = max(X0, X1);
  if (absCoeff = = pred)
    absCoeffMod = 1;
  else
    absCoeffMod = (absCoeff < pred) ? absCoeff + 1 : absCoeff;
```

Then, the absCoeffMod value is coded as described above.

In JVET-M0413, a block-based Delta Pulse Code Modulation (BDPCM) is proposed to code screen contents efficiently and then adopted into VVC.

The prediction directions used in BDPCM can be vertical and horizontal prediction modes. The intra prediction is done on the entire block by sample copying in prediction direction (horizontal or vertical prediction) similar to intra prediction. The residual is quantized and the delta between the quantized residual and its predictor (horizontal or vertical) quantized value is coded. This can be described by the following: For a block of size M(rows)×N(cols), let r_(i,j), 0≤i≤M−1, 0≤j=N−1 be the prediction residual after performing intra prediction horizontally (copying left neighbor pixel value across the predicted block line by line) or vertically (copying top neighbor line to each line in the predicted block) using unfiltered samples from above or left block boundary samples. Let Q(r_(ij)),0≤i≤M−1, 0≤j≤N−1 denote the quantized version of the residual r_(i,j), where residual is difference between original block and the predicted block values. Then the block DPCM is applied to the quantized residual samples, resulting in modified M×N array R˜ with elements r̃_(i,j). When vertical BDPCM is signaled:

$$\tilde{r}_{i,j} = \begin{cases} Q(r_{i,j}), & i = 0, \ 0 \le j \le (N-1) \\ Q(r_{i,j}) - Q(r_{(i-1),j}), & 1 \le i \le (M-1), \ 0 \le j \le (N-1) \end{cases} \quad \text{(eq. 19)}$$

For horizontal prediction, similar rules apply, and the residual quantized samples are obtained by $$\tilde{r}_{i,j} = \begin{cases} Q(r_{i,j}), & 0 \le i \le (M-1), \ j = 0 \\ Q(r_{i,j}) - Q(r_{(i-1),j}), & 0 \le i \le (M-1), \ 1 \le j \le (N-1) \end{cases} \quad \text{(eq. 20)}$$

The residual quantized samples are sent to the decoder.

On the decoder side, the above calculations are reversed to produce $Q(r_{i,j})$,0≤i≤M−1, 0≤j≤N−1.

For vertical prediction case, $$Q(r_{i,j}) = \sum_{k=0}^{i} \tilde{r}_{k,j}, \ 0 \le i \le (M-1), \ 0 \le j \le (N-1) \quad \text{(eq. 21)}$$

For horizontal case, $$Q(r_{i,j}) = \sum_{k=0}^{j} \tilde{r}_{i,k}, \ 0 \le i \le (M-1), \ 0 \le j \le (N-1) \quad \text{(eq. 22)}$$

The inverse quantized residuals, $Q^{-1}(Q(r_{i,j}))$, are added to the intra block prediction values to produce the reconstructed sample values.

The main benefit of this scheme is that the inverse BDPCM can be done on the fly during coefficient parsing simply adding the predictor as the coefficients are parsed or it can be performed after parsing.

In VTM, the BDPCM also can be applied on chroma blocks and the chroma BDPCM has a separate flag and BDPCM direction from the luma BDPCM mode.

The specific order or hierarchy of blocks in the processes/flowcharts disclosed is an illustration of example approaches. Based upon design preferences, the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Figure 23A:
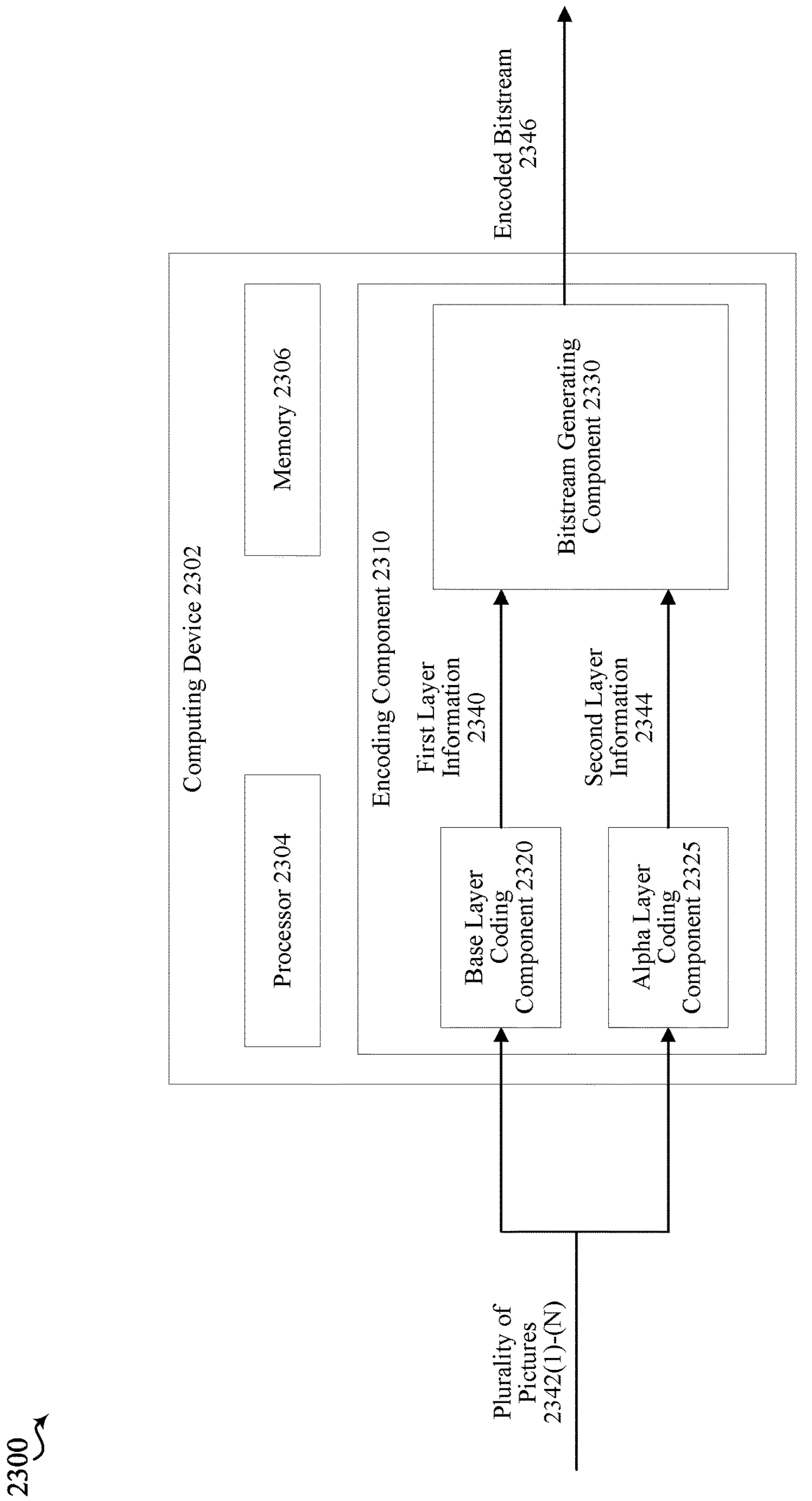
FIG. 23A is a diagram that illustrates a first computing device, in accordance with various aspects of the disclosure.
Figure 23B:
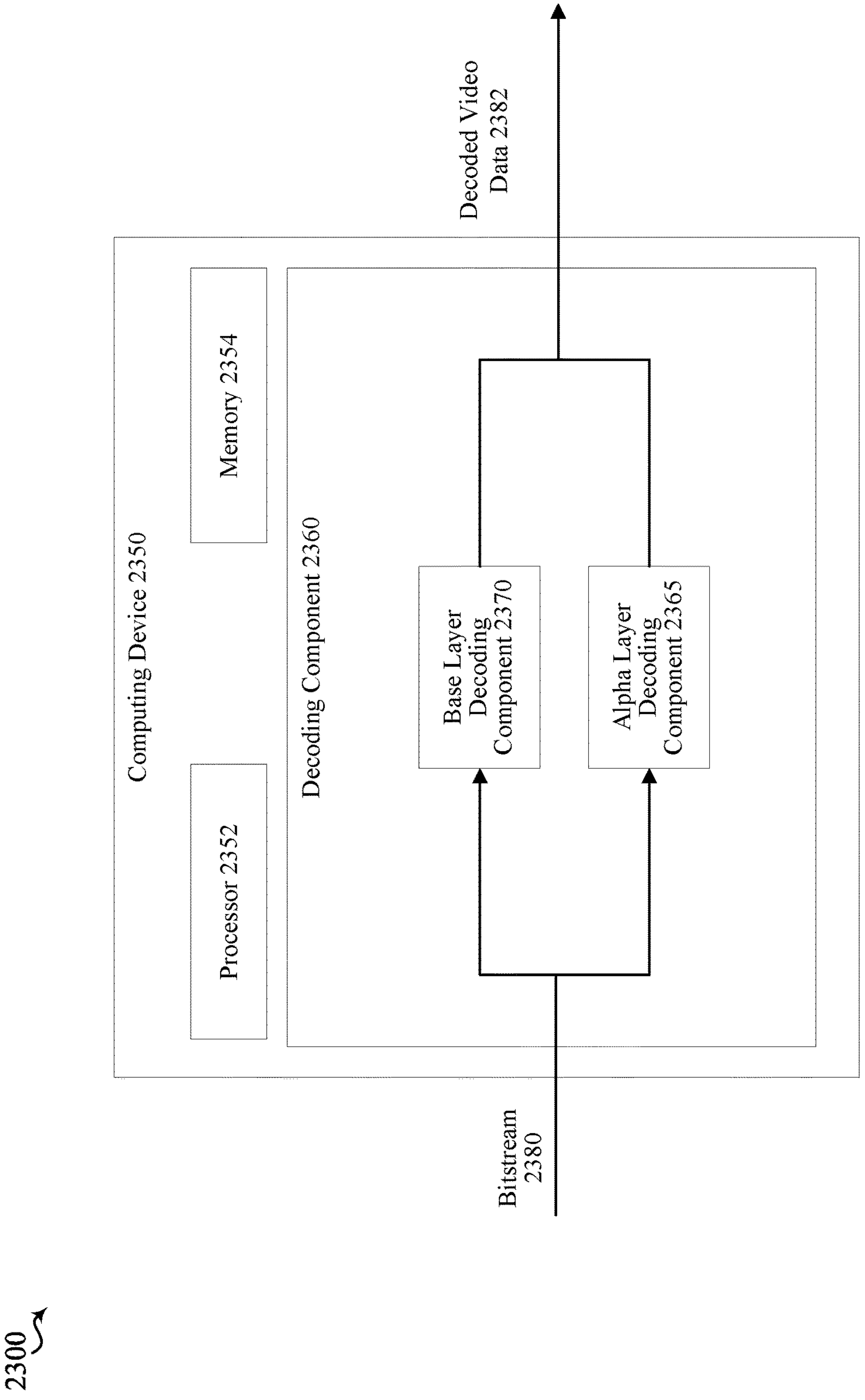
FIG. 23B is a diagram that illustrates a second computing device, in accordance with various aspects of the disclosure.

Referring to FIGS. 23A-B and FIG. 24, the computing device 2302 or the computing device 2350 may perform a method 2400 of video processing, by such as via execution of the encoding component 2310 by the processor 2304 and/or the memory 2306, the decoding component 2360 by the processor 2352 and/or the memory 2354, the video encoder 114, the video decoder 124, the video encoder 200, the video decoder 300, or the HEVC video encoder and decoder 400.

At block 2402, the method 2400 includes performing a conversion between a video comprising a plurality of pictures and a bitstream of the video, wherein each picture comprises an alpha layer and at least one base layer, wherein the bitstream comprises first layer information which is utilized in a first process performed on the at least one base layer and second layer information which is utilized in a second process performed on the alpha layer. For example, in an aspect, the computing device 2302, the processor 2304, the memory 2306, the encoding component 2310, the alpha layer coding component 2325, the base layer coding component 2320, and/or the bitstream generating component 2330 may be configured to or may comprise means for performing a conversion between a video comprising a plurality of pictures and a bitstream of the video, wherein each picture comprises an alpha layer and at least one base layer, wherein the bitstream comprises first layer information which is utilized in a first process performed on the at least one base layer and second layer information which is utilized in a second process performed on the alpha layer.

For instance, the base layer coding component 2320 may generate first layer information 2340 (e.g., NAL units) from a base layer of a plurality of pictures 2342(1)-(N). In some aspects, the base layer corresponds to the color channel of the plurality of pictures 2342(1)-(N). Further, in some aspects, the base layer coding component 2320 may determine the first layer information 2340 via a first encoding process, e.g., HEVC or VVC, in accordance with various aspects of the disclosure. Additionally, the alpha layer coding component 2325 may generate second layer information 2344 (e.g., NAL units) from an alpha layer of the plurality of pictures 2342(1)-(N). In some aspects, the alpha layer corresponds to a degree of transparency of the plurality of pictures 2342(1)-(N). In some aspects, the alpha layer coding component 2325 may determine the second layer information 2344 via a second encoding process that differs from the first encoding process implemented by the base layer coding component 2320. In some of these aspects, different processes may be applied to the alpha layer and base layer because some coding tools offer limited benefits when applied to the alpha layer. As such, the efficiency and size of the alpha layer coding component 2325 may be improved by tailoring the second encoding process to the alpha layer. In addition, the bitstream generating component 2330 may generate an encoded bitstream 2346 from the first layer information 2340 received from the base layer coding component 2320 and the second layer information 2344 received from the alpha layer coding component 2325.

As another example, in an aspect, the computing device 2350, the processor 2352, the memory 2354, the decoding component 2360, the alpha layer decoding component 2365, and/or the base layer decoding component 2370 may be configured to or may comprise means for performing a conversion between a video comprising a plurality of pictures 2382 and a bitstream 2380 of the video, wherein each picture 2382 comprises an alpha layer and at least one base layer, and wherein the bitstream 2380 comprises first layer information which is utilized in a first process performed on the at least one base layer and second layer information which is utilized in a second process performed on the alpha layer. For instance, the base layer decoding component 2370 may perform a first decoding process on a base layer of a bitstream 2380. In some aspects, the base layer corresponds to the color channel of the bitstream 2380. Further, in some aspects, the base layer decoding component 2370 may determine the plurality of pictures 2382 (e.g., decoded video data) via a first decoding process, e.g., HEVC or VVC, in accordance with various aspects of the disclosure. Further, the alpha layer decoding component 2365 may perform a second decoding process on an alpha layer of a bitstream 2380. In some aspects, the alpha layer corresponds to a degree of transparency of the bitstream 2380. Further, in some aspects, the alpha layer decoding component 2365 may determine the decoded video data 2382 via a second encoding process that differs from the first decoding process implemented by the base layer decoding component 2370.

In some aspects, the syntax elements used for coding the alpha layer by the alpha layer coding component 2325 may be different from the syntax elements used for coding the base layer by the base layer coding component 2320. In some other examples, the alpha layer coding component 2325 may disable one or more coding tools employed by the base layer coding component 2320 to determine the first layer information 2340. In some aspects, the disabled coding tool may be a loop filtering process, e.g., SAO, ALF, and/or deblocking filters. In some other aspects, the disable coding tool may include an intra boundary filter, an intra smooth filter, PDPC, LMCS, TMVP, DMVR, BDOF, and/or AFFINE. Further, a conformance bitstream shall satisfy that the coding tool is disabled for coding the alpha layer of the plurality of pictures 2342(1)-(N).

In some aspects, the alpha layer coding component 2325 may only enable a particular coding prediction mode for determining the second layer information 2344 from the plurality of pictures 2342(1)-(N). In some aspects, the particular code prediction mode may include a palette mode, an intra-prediction mode, an IBC prediction mode, a TSRC mode, or a BDCPM mode, as described in detail herein. In addition, default values may be used by a decoding device for the first block when the IBC mode is disabled. Further, in some aspects, the particular code prediction mode may only be applied to intra-pictures/intra-slices in the alpha layer.

In some aspects, a residual coding method may be enabled for the alpha layer coding component 2325 while disabled for the base layer coding component 2320. As such, the residual coding method may be used to determine the second layer information 2344 and not the first layer information 2340. In some aspects, the residual coding method may be TSRC in a VVC implementation.

In some aspects, the alpha layer coding component 2325 may have a limited set of intra-prediction modes enabled in comparison to the set of intra-prediction modes enabled for the base layer coding component 2320. In some aspects, the limited set of intra-prediction modes may include at least one of a vertical prediction mode (e.g., the INTRA_ANGULAR26 in the HEVC specification), horizontal prediction mode (e.g., the INTRA_ANGULAR10 in the HEVC specification), DC prediction mode (e.g., the INTRA_DC in the HEVC specification), or intra-prediction mode. In some other aspects, the limited set of intra-prediction modes may be limited to a single intra-prediction mode, and include one of a planar mode, a DC mode (e.g., mode index 1), a vertical prediction mode, or a horizontal prediction mode.

In some aspects, the alpha layer coding component 2325 may be limited to using integer values for MVs and/or MVDs during the second encoding process. In some other examples, the alpha layer coding component 2325 may be limited to use of specific partition types (e.g., 2N×2N, or quad-tree (QT)) during a partitioning step and/or a specific CU size. In yet still some other examples, the alpha layer coding component 2325 may be limited to employing TUs that have a size equal to the size of CUs used by the alpha layer coding component 2325 during the second encoding process. As described herein, the encoding component 2310 may use a TUs to encode a prediction residual and coding units used to encode a prediction type In some instances, different processes may be applied to the alpha layer and base layer because some coding tools offer limited benefits when applied to the alpha layer. As such, the efficiency and size of the alpha layer coding component 2325 may be improved by tailoring the second encoding process to the alpha layer.

In some aspects, the encoded bitstream 2346 may not include an indication of the disabled coding in the portion of the bitstream corresponding to the alpha layer (i.e., the second plurality of units). In some examples, the encoded bitstream 2346 may not include an indication corresponding to any of the disabled coding prediction modes. In some examples, when a coding tool is not disabled for the alpha layer coding component 2325, the disabling of the coding tool for the alpha layer may be inferred from the encoded bitstream 2346 at a decoder device (e.g., the computing device 2350). Further, in some examples, the encoded bitstream 2346 may not include an indication of intra-prediction mode for a block in the alpha layer. Additionally, in some examples, the encoded bitstream 2346 may include signaling of the intra-prediction mode for a block in the alpha layer based on the limited set of intra-prediction modes available to the alpha layer coding component 2325. For instance, whether the bit stream generating component 2330 signals the intra-prediction modes that have not been enabled and/or used by the alpha layer coding component 2325 may depend on the number of intra prediction modes in the limited set. In addition, in some examples, the encoded bitstream 2346 may not include signaling (i.e., exclude) of partition types (e.g. the part_mode in the HEVC specification), the split flag (e.g., the split_cu_flag in the HEVC specification), and/or the TU size being limited to being equal to the CU size.

Figure 25:
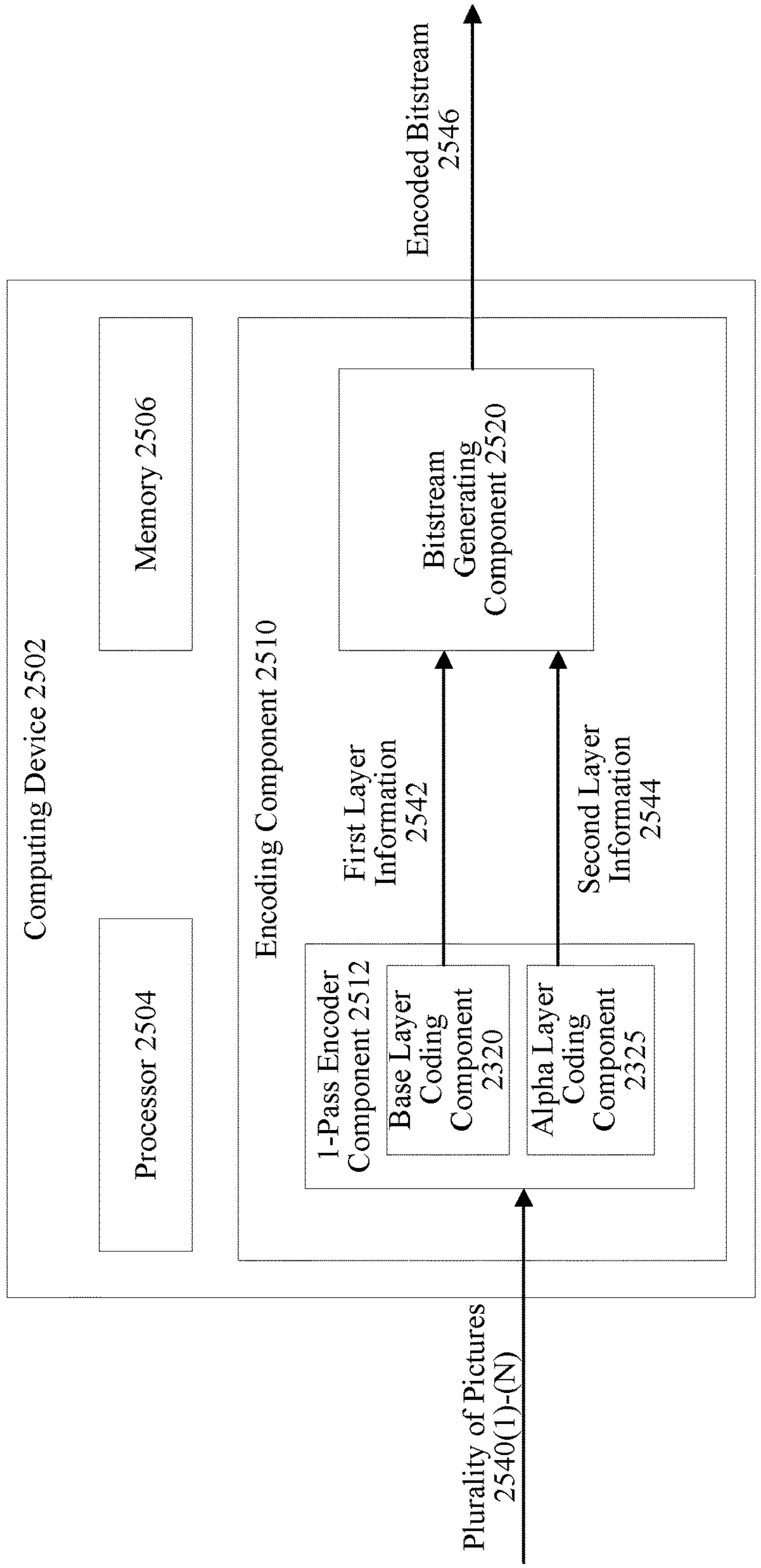
FIG. 25 is a diagram that illustrates a third computing device, in accordance with various aspects of the disclosure.

In an optional aspect, referring to FIG. 25 and FIG. 26, at block 2602, the method 2400 may include wherein the conversion is performed in a single-pass conversion between the alpha layer and the at least one base layer, and the first layer information and the second layer information are interleaved in the bitstream. For example, in an aspect, the computing device 2502, the processor 2504, the memory 2506, the encoding component 2510, the 1-pass encoder component 2512, the alpha layer coding component 2325, the base layer coding component 2320, and/or the bitstream generating component 2520 may be configured to or may comprise means for performing a single-pass conversion between the alpha layer and the at least one base layer, wherein the first layer information and the second layer information are interleaved in the bitstream.

For instance, the 1-pass encoder component 2512 may perform a one-pass encoding process on a plurality of pictures 2540(1)-(N) including at least one base layer and an alpha layer. The base layer coding component 2320 of the 1-pass encoder component 2512 may generate the first layer information 2542 from a base layer of the plurality of pictures 2540(1)-(N), and the alpha layer coding component 2325 may generate the second layer information 2544 from the alpha layer of the plurality of pictures 2342(1)-(N). Further, the bitstream generating component 2520 may generate an encoded bitstream 2546 by interleaving the first layer information 2542 and the second layer information 2544. In some aspects, the first layer information 2542 and the second layer information 2544 are interleaved in a CTU basis. Some examples of the first layer information 2542 may include luminance channel information and/or chrominance channel information. Further, some examples of the second layer information 2544 may include alpha channel information. Additionally, in some aspects, one or more syntax elements are included in the bitstream for a picture to separate the first layer information 2542 and the second layer information 544. For instance, in some aspects, generating the encoded bitstream may include signaling a syntax for an individual frame to separate an alpha bitstream from a color bitstream.

Figure 27:
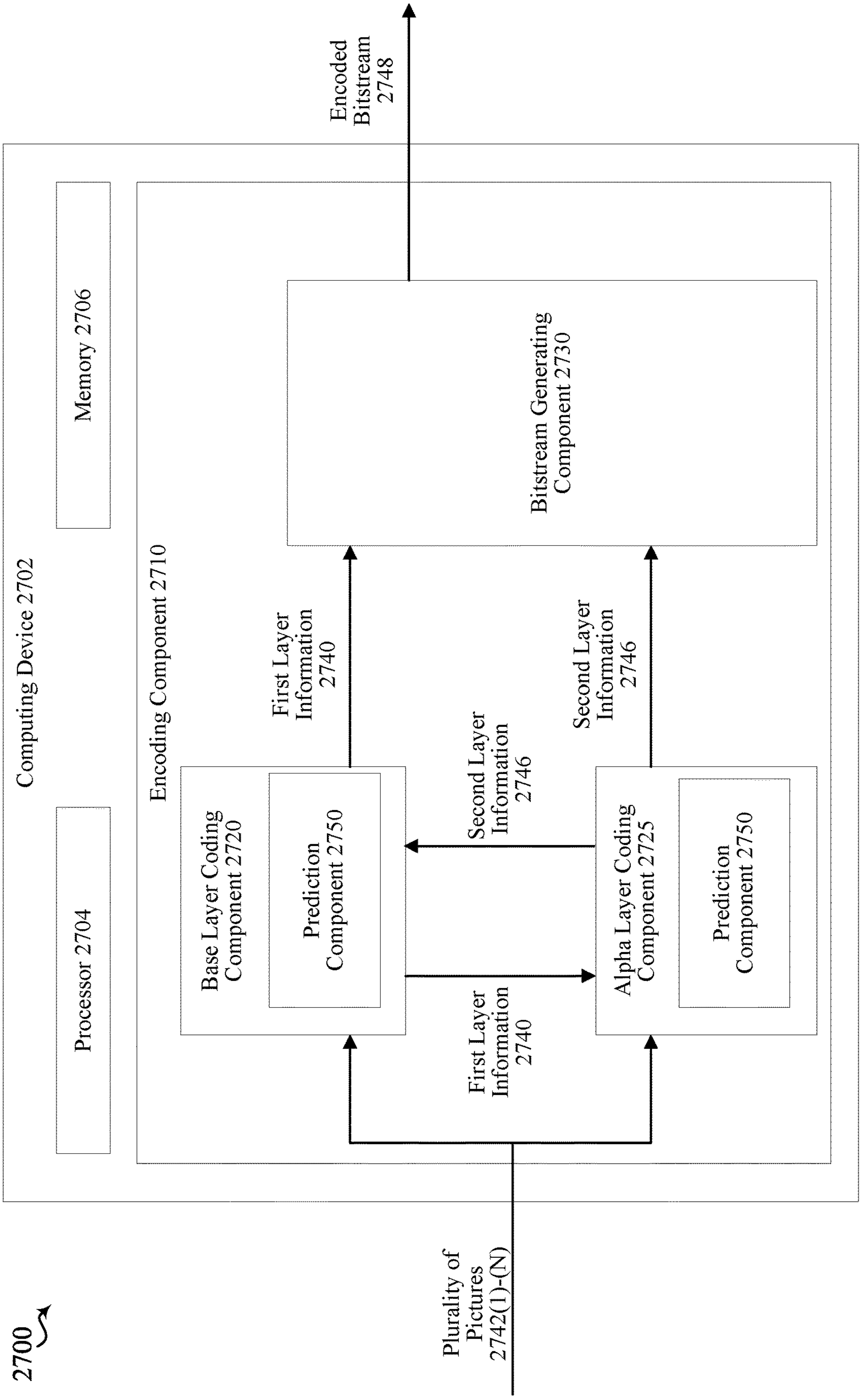
FIG. 27 is a diagram that illustrates a fourth computing device, in accordance with various aspects of the disclosure.
Figure 28:
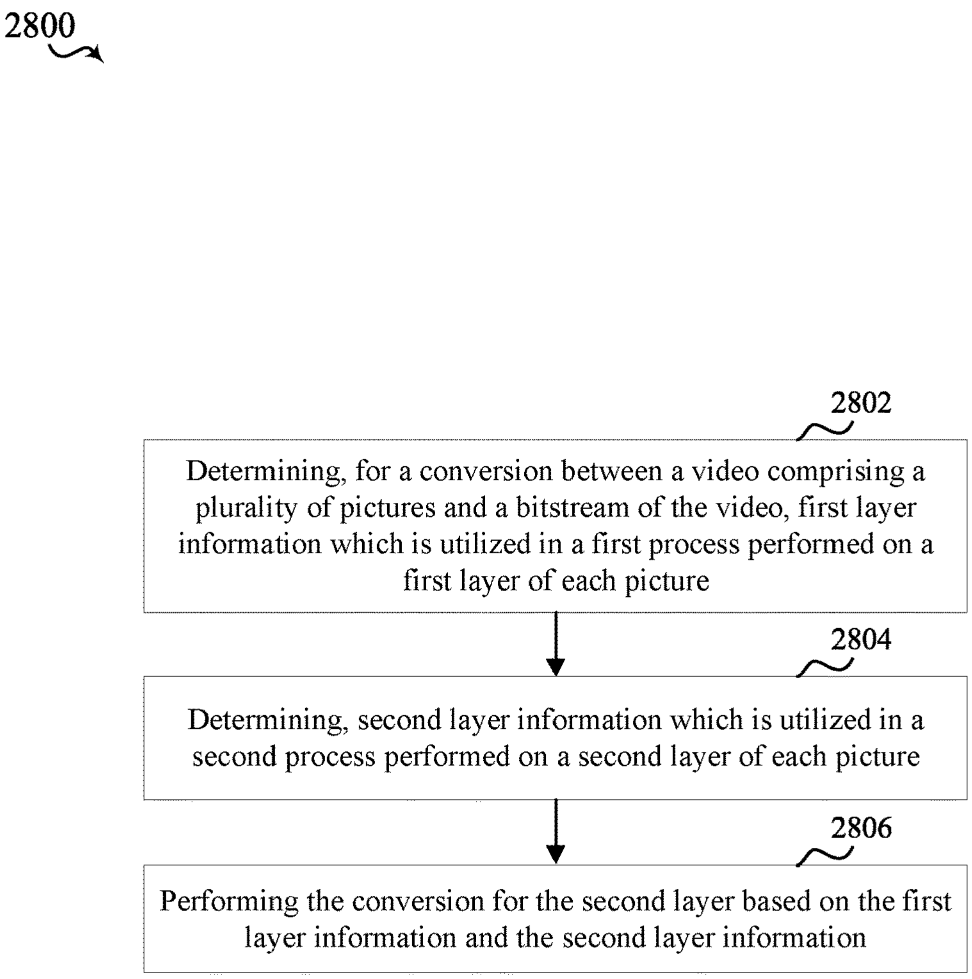
FIG. 28 is a flowchart of a third example method for video processing, in accordance with some aspects of the present disclosure.

Referring to FIG. 27 and FIG. 28, in operation, the computing device 2702 may perform a method 2800 of video coding, by such as via execution of the encoding component 2710 by the processor 2704 and/or the memory 2706, the video encoder 114, the video decoder 124, the video encoder 200, the video decoder 300, or the HEVC video encoder and decoder 400.

At block 2802, the method 2800 includes determining, for a conversion between a video comprising a plurality of pictures and a bitstream of the video, first layer information which is utilized in a first process performed on a first layer of each picture. For example, in an aspect, the computing device 2702, the processor 2704, memory 2706, the encoding component 2710, the alpha layer coding component 2725, and/or the base layer coding component 2720 may be configured to or may comprise means for determining, for a conversion between a video comprising a plurality of pictures and a bitstream of the video, first layer information which is utilized in a first process performed on a first layer of each picture.

For example, the base layer coding component 2720 may generate first layer information 2740 (e.g., NAL units) from a base layer of a plurality of pictures 2742(1)-(N). In some aspects, the base layer corresponds to the color channel of the plurality of pictures 2742(1)-(N). Further, in some aspects, the base layer coding component 2720 may determine the first layer information 2740 via a first encoding process, e.g., HEVC or VVC, in accordance with various aspects of the disclosure. Alternatively, the determining at block 2802 may include generating the second layer information 2746from an alpha layer of the plurality of pictures 2742(1)-(N) via a second encoding process. In some aspects, the alpha layer corresponds to a degree of transparency of the plurality of pictures. In some examples, the first or second layer information may include intra-prediction mode information, motion information (e.g., MVs, MVDs, reference picture indices, etc.), a motion candidate index (e.g., AMVP index, merge index, etc.), and/or partition information (e.g. split flags).

At block 2804, the method 2800 includes determining, second layer information which is utilized in a second process performed on a second layer of each picture. For example, in an aspect, the computing device 2702, the processor 2704, the memory 2706, the encoding component 2710, the base layer coding component 2720, and/or the alpha layer coding component 2725 may be configured to or may comprise means for determining, second layer information which is utilized in a second process performed on a second layer of each picture.

For example, the alpha layer coding component may generate the second layer information 2746 from an alpha layer of the plurality of pictures 2742(1)-(N) based on the first layer information 2740 received from the base layer coding component 2720. In some aspects, the alpha layer corresponds to a degree of transparency of the plurality of pictures. Alternatively, the determining at block 2804 may include generating the first layer information 2740 (e.g., NAL units) from a base layer of a plurality of pictures 2742(1)-(N) based on the second layer information 2746 received from the alpha layer coding component 2725. In some examples, the first layer information may correspond to information in a first block associated with the first layer and be used as a predictor for coding a second block associated with the second layer. Further, in some aspects, the first block and the second block may be co-located. Additionally, in some aspects, the first block may have a same top-left position and a same size with those of a second block or the neighboring blocks around the first block. In some other examples, as described in detail below, the first layer information may be luma information of a first block associated with the first layer and used to predict a second block associated with the second layer. As used herein, in some aspects, "collocated" may refer to two or more units sharing at least a same position in different processing units.

Further, for example, the determining at block 2804 may be performed to take advantage of cross-layer correlations between the base layer and the alpha layer, thereby improving the efficiency of the encoding process implemented by the encoding component 2710.

At block 2806, the method 2800 includes performing the conversion for the second layer based on the first layer information and the second layer information. For example, in an aspect, the computing device 2702, the processor 2704, the memory 2706, the encoding component 2710, and/or the bitstream generator component 2730 may be configured to or may comprise means for performing the conversion for the second layer based on the first layer information and the second layer information.

For example, the bitstream generator component 2730 may generate an encoded bitstream 2748 from the first layer information 2740 received from the base layer coding component 2720 and the second layer information 2746 received from the alpha layer coding component 2725, wherein either one of the first layer information 2740 or the second layer information 2746 is converted based on the other.

Figure 29:
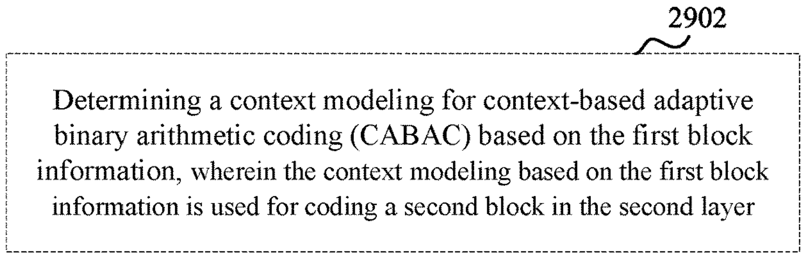
FIG. 29 is a flowchart of a fourth example method for video processing, in accordance with some aspects of the present disclosure.

In an optional aspect, referring to FIG. 29, at block 2902, the first layer information includes first block information of a first block in the first layer, and the method 2800 may further include determining a context modeling for context-based adaptive binary arithmetic coding (CABAC) based on the first block information, wherein the context modeling based on the first block information is used for coding a second block in the second layer. For example, in an aspect, the computing device 2702, the processor 2704, the memory 2706, the encoding component 2710, the base layer coding component 2720, the alpha layer coding component 2725, and/or the prediction component 2750 may be configured to or may comprise means for determining a context modeling for context-based adaptive binary arithmetic coding (CABAC) based on the first block information, wherein the context modeling based on the first block information is used for coding a second block in the second layer.

For example, the prediction component 2750 may determine a predictive context based on the first layer information 2740. In some aspects, the prediction component 2750 may perform context modeling based on the first layer information 2740. In some other examples, the first layer information 2740 may be directly inherited, and signaling of the first layer information of the another block is skipped. Further, the second layer information 2746 may be determined by the alpha layer coding component 2725 based on a block of the second layer and the predictive context. Alternatively, the first layer information 2740 may be determined by a base layer coding component 2720 based on a block of the first layer and a predictive context determined based on the second layer information 2746.

In addition, the bitstream generator component 2730 may generate the encoded bitstream 2748 from the first layer information 2740 received from the base layer coding component 2720 and the second layer information 2746 received from the alpha layer coding component 2725, wherein either the first layer information 2740 or the second layer information 2746 is generated using the predictive context.

Figure 30:
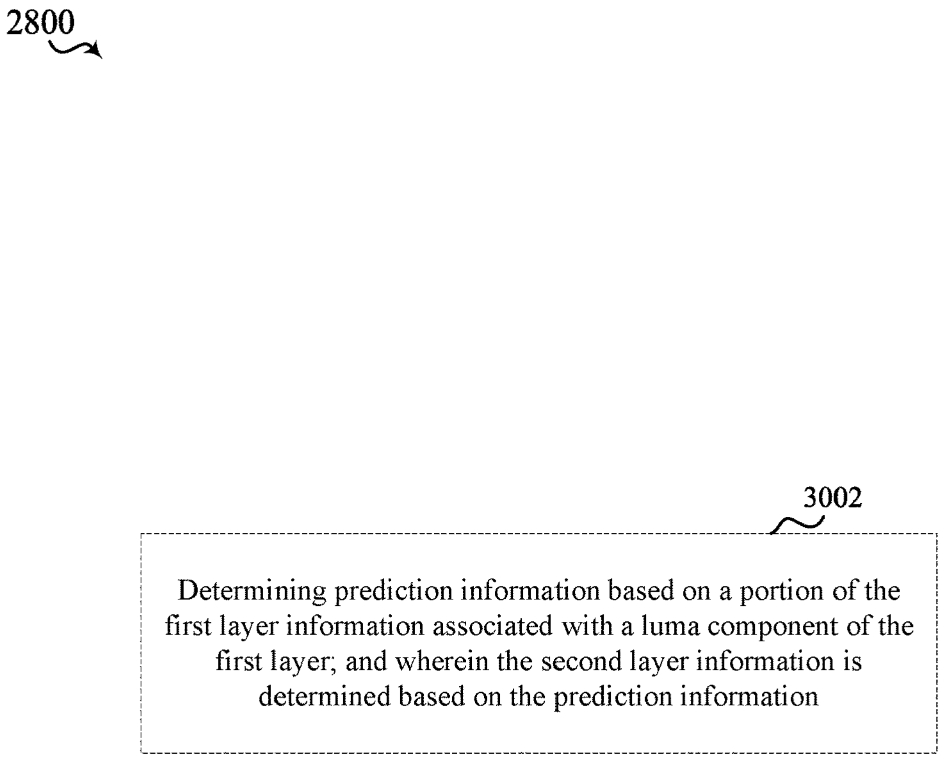
FIG. 30 is a flowchart of a fifth example method for video processing, in accordance with some aspects of the present disclosure.

In an optional aspect, referring to FIG. 30, at block 3002, the method 2800 may further include determining prediction information based on a portion of the first layer information associated with a luma component of the first layer; and wherein the second layer information is determined based on the prediction information. For example, in an aspect, the computing device 2702, the processor 2704, the memory 2706, the encoding component 2710, the base layer coding component 2720, the alpha layer coding component 2725, and/or the prediction component 2750 may be configured to or may comprise means for determining prediction information based on a portion of the first layer information associated with a luma component of the first layer; and wherein the second layer information is determined based on the prediction information. For example, the prediction component 2750 may determine prediction information based on luma information of a first block associated with the base layer of the plurality of pictures 2742(1)-(N). In addition, the bitstream generator component 2730 may generate an encoded bitstream 2748 from the first layer information 2740 received from the base layer coding component 2720 and the second layer information 2746 received from the alpha layer coding component 2725, wherein either the first layer information 2740 or the second layer information 2746 is generated using the prediction information based on the luma information.

Figure 31:
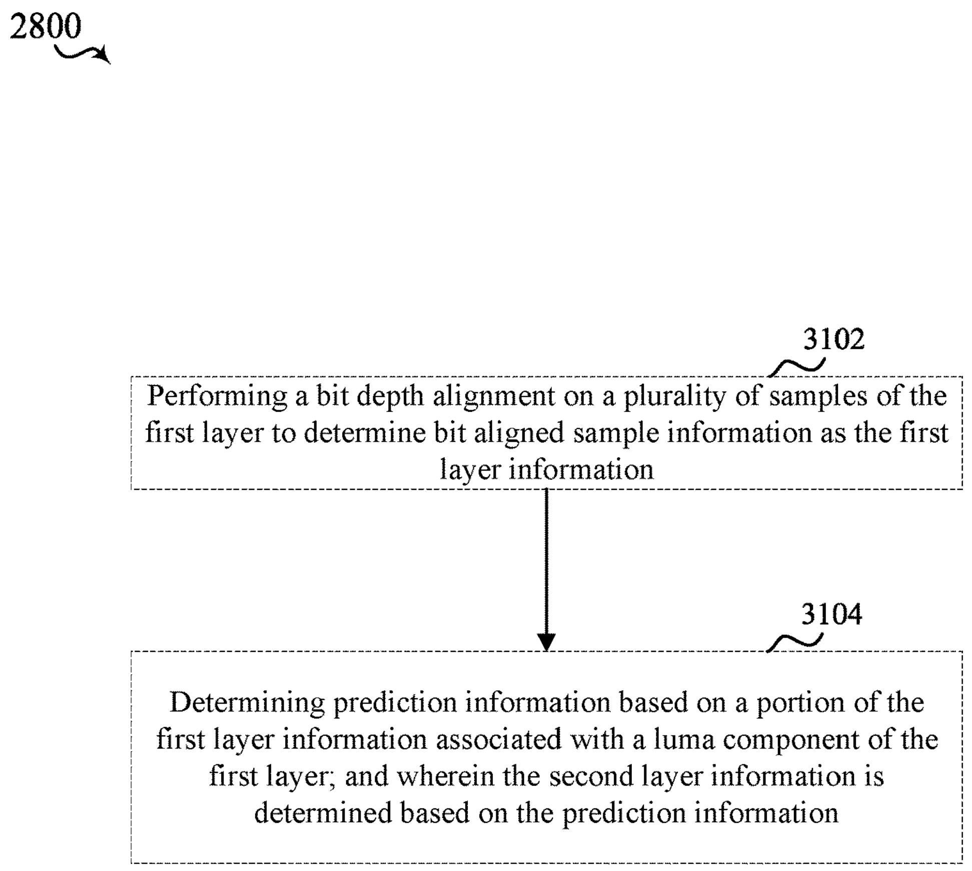
FIG. 31 is a flowchart of a sixth example method for video processing, in accordance with some aspects of the present disclosure.

In an optional aspect, referring to FIG. 31, at block 3102, the method 2800 may further include performing a bit depth alignment on a plurality of samples of the first layer to determine bit aligned sample information as the first layer information. For example, in an aspect, the computing device 2702, the processor 2704, the memory 2706, the encoding component 2710, the base layer coding component 2720, the alpha layer coding component 2725, and/or the prediction component 2750 may be configured to or may comprise means for performing a bit depth alignment on a plurality of samples of the first layer to determine bit aligned sample information as the first layer information.

For example, the performing at block 3102 may include performing a bit-depth alignment on plurality of pictures 2742(1)-(N)plurality of pictures 2742(1)-(N)a plurality of samples of the first layer to determine bit aligned sample information as the first layer information 2740. In some examples, the bit alignment may be performed by scaling the layer with smaller/lower bit depth to match the bit depth of the other component through left bit shift before inverse color transform.

In this optional aspect, at block 3104, the method 3100 may further include determining prediction information based on a portion of the first layer information associated with a luma component of the first layer; and wherein the second layer information is determined based on the prediction information. For example, in an aspect, the computing device 2702, the processor 2704, the memory 2706, the encoding component 2710, the base layer coding component 2720, the alpha layer coding component 2725, and/or the prediction component 2750 may be configured to or may comprise means for determining prediction information based on a portion of the first layer information associated with a luma component of the first layer; and wherein the second layer information is determined based on the prediction information. For example, the determining at block 3104 may include determining prediction information based on a luma component of the bit aligned sample information, and wherein the second layer information 2746 is determined during the second process using a second block of the second layer and the prediction information. In addition, the bitstream generator component 2730 may generate an encoded bitstream 2748 from the first layer information 2740 received from the base layer coding component 2720 and the second layer information 2746 received from the alpha layer coding component 2725, wherein either the first layer information 2740 or the second layer information 2746 is generated using the prediction information.

Figure 32:
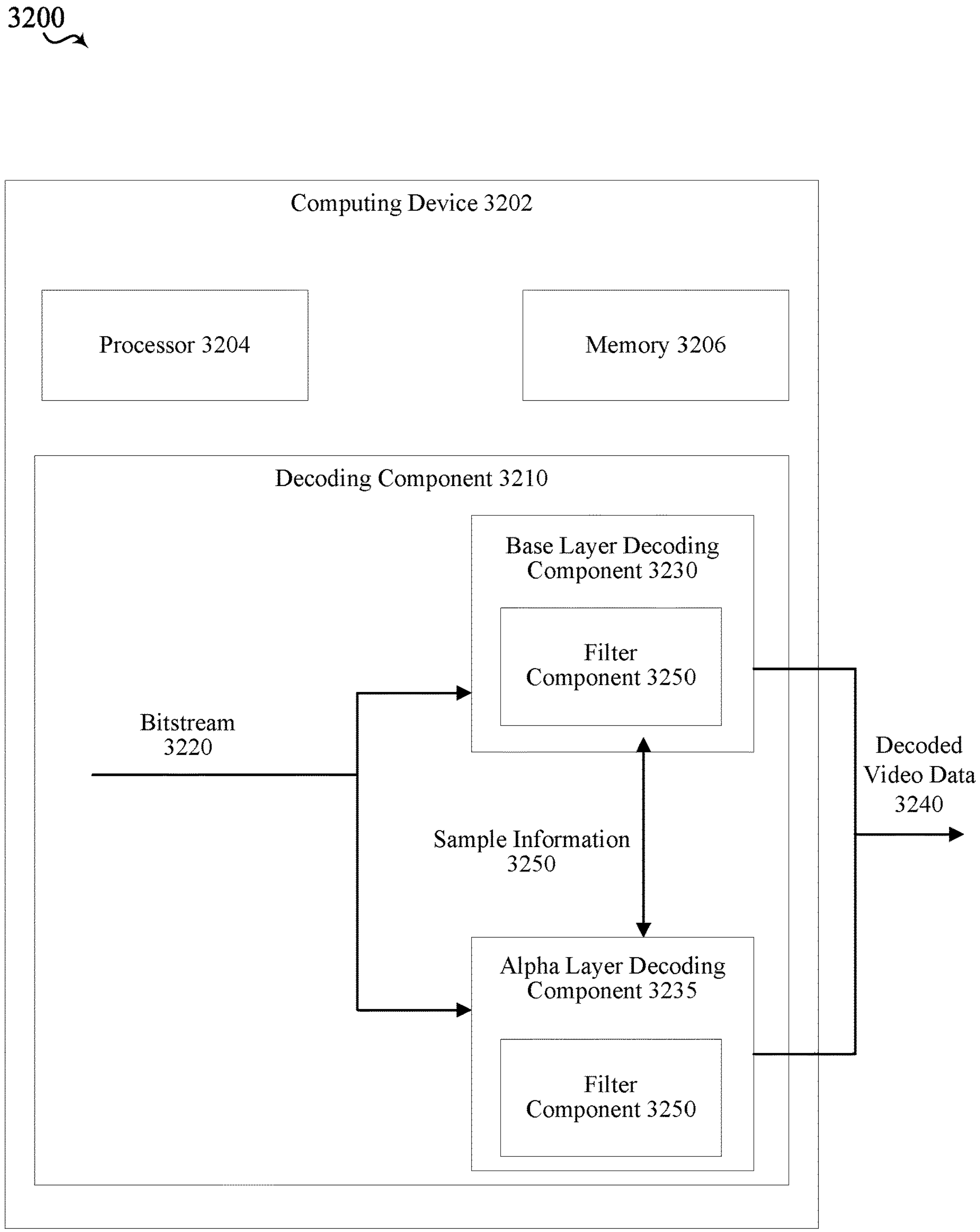
FIG. 32 is a diagram that illustrates a fifth computing device, in accordance with various aspects of the disclosure.

Referring to FIG. 32 and FIG. 33, in operation, the computing device 3202 may perform a method 3300 of video decoding, by such as via execution of decoding component 3210 by the processor 3204 and/or the memory 3206, the video decoder 124, the video decoder 300, and/or the HEVC video encoder and decoder 400.

At block 3302, the method 3300 includes performing a conversion between a video comprising a plurality of pictures and a bitstream of the video, wherein each picture comprises a first layer and a second layer, wherein first layer information which is utilized in a first process performed on a first layer and second layer information which is utilized in a second process performed on a second layer are included in the bitstream, and wherein the second process comprises a reconstruction in which a second block in the second layer is reconstructed based on the samples of at least a first block in the first layer. For example, in an aspect, the computing device 3202, the processor 3204, the memory 3206, the decoding component 3210, the base layer coding component 3230, and/or the alpha layer coding component 3235 may be configured to or may comprise means for performing a conversion between a video comprising a plurality of pictures and a bitstream of the video, wherein each picture comprises a first layer and a second layer, wherein first layer information which is utilized in a first process performed on a first layer and second layer information which is utilized in a second process performed on a second layer are included in the bitstream, and wherein the second process comprises a reconstruction in which a second block in the second layer is reconstructed based on the samples of at least a first block in the first layer.

For example, the performing at block 3302 may include receiving the bitstream 3220 including a first layer information associated with a base channel and a second layer information associated with an alpha channel. In some aspects, the alpha layer corresponds to a degree of transparency of the bitstream 3220, and the base channel corresponds to a color channel of the bitstream 3220. Further, the performing at block 3302 may include reconstructing one or more blocks of the first layer of the bitstream 3220 via a first process of the base layer coding component 3230 utilizing the first layer information to generate the decoded video data 3240. Further, reconstruction of the one or more blocks by the base layer coding component 3230 may generate sample information 3250. In addition, the alpha layer coding component 3235 may use the sample information 3250 to reconstruct a block of the second layer of the bitstream 3220. Alternatively, the performing at block 3304 may include reconstructing the first block of the bitstream 3220 using the alpha layer coding component 3235 to generate the decoded video data 3240. Further, reconstruction of one or more reference blocks of the second layer by the alpha layer coding component 3235 may generate the sample information 3250. In addition, the base layer decoding component 3230 may use the sample information 3250 to reconstruct a block of the first layer of the bitstream 3220.

In some aspects, a reference block may be a co-located luma block. In some other aspects, a reference block may be a neighboring block to a co-located luma block. In some other aspects, the reference block may be determined based on a multiplication operation or a bitwise operation (e.g., multiplying or bit shifting the reference). In some examples, the sample information may be samples that have not been processed via a loop filtering process (e.g., SAO, ALF, deblocking filters, etc.) of the base layer coding component 3230 or alpha layer coding component 3235. In some other examples, the sample information may be samples that have been processed via a loop filtering process (e.g., SAO, ALF, deblocking filters, etc.) of the base layer coding component or alpha layer coding component.

Further, for example, the performing at block 3302 may permit a video encoder to tailor an encoding process performed by the video encoder to the alpha layer, which may provide efficiency improvements over standardized approaches.

Figure 34:
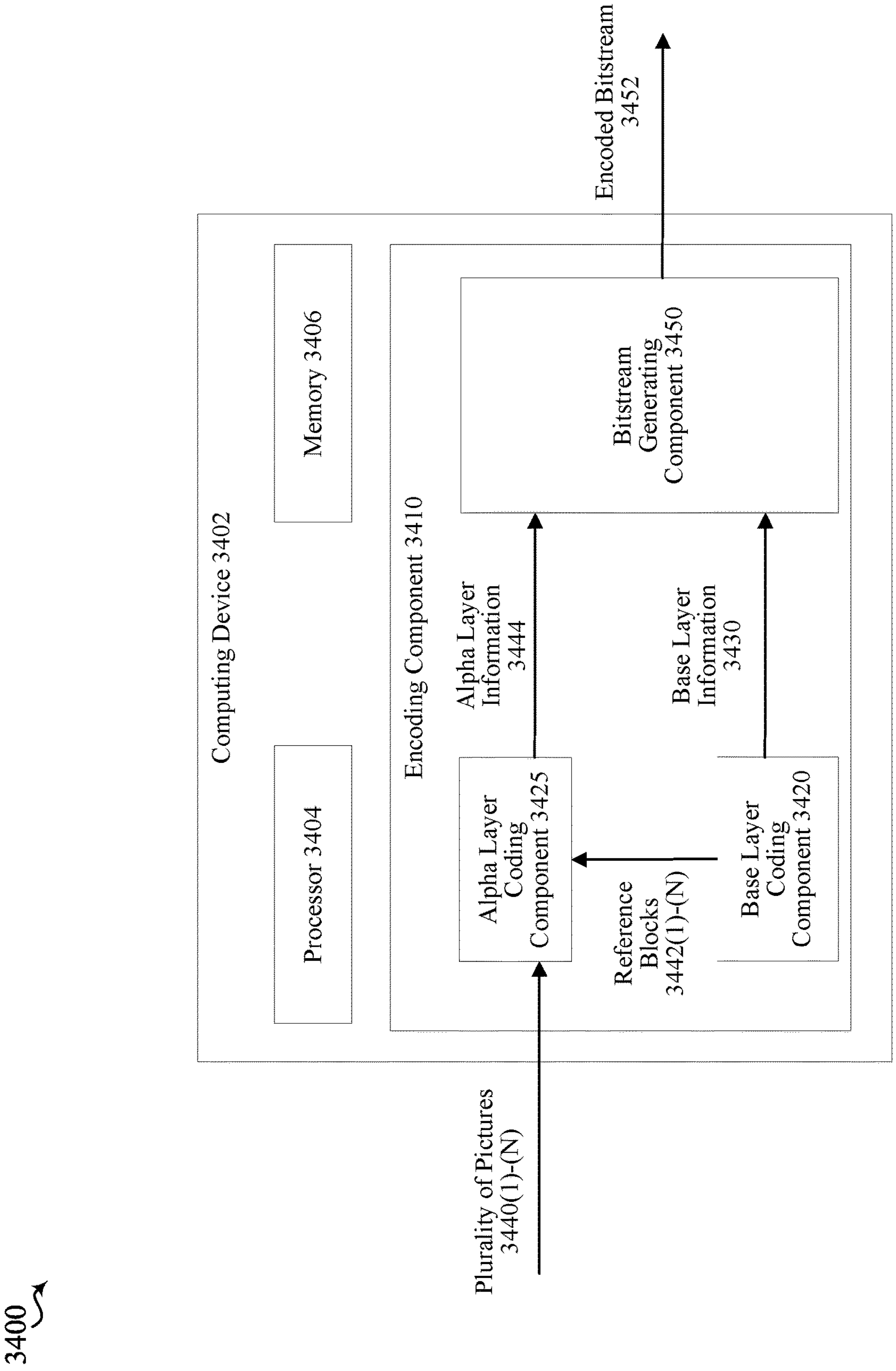
FIG. 34 is a diagram that illustrates a sixth computing device, in accordance with various aspects of the disclosure.
Figure 35:
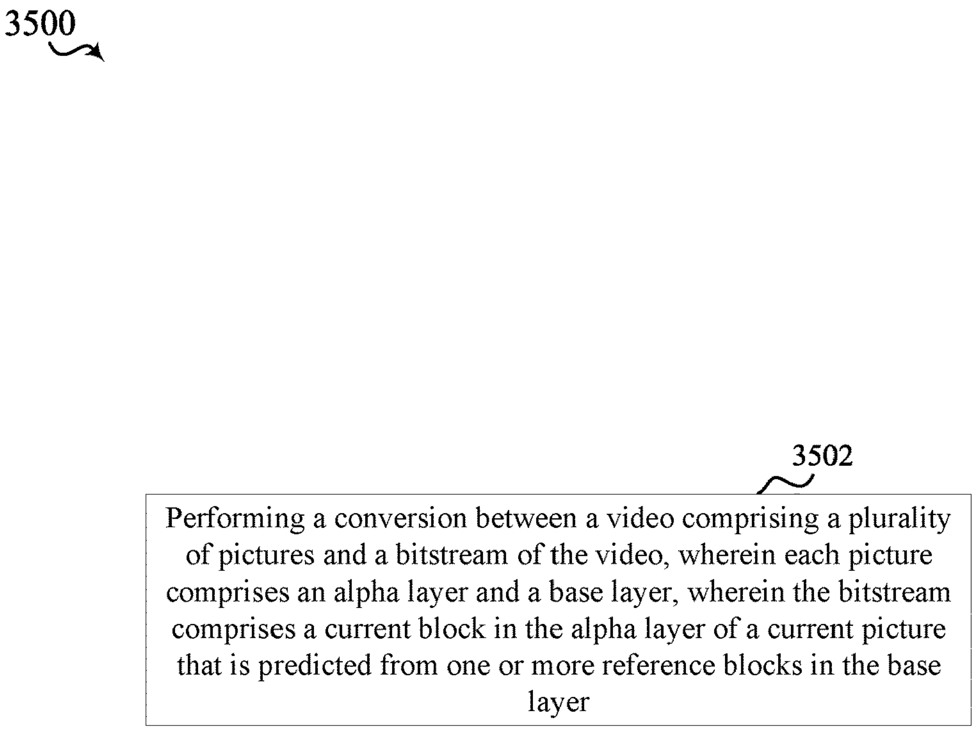
FIG. 35 is a flowchart of an eighth example method for video processing, in accordance with some aspects of the present disclosure.

Referring to FIG. 34 and FIG. 35, in operation, the computing device 3402 may perform a method 3300 of video coding, by such as via execution of the encoding component 3410 by the processor 3404 and/or the memory 3406, the video encoder 114, the video decoder 124, the video encoder 200, the video decoder 300, or the HEVC video encoder and decoder 400.

At block 3502, the method 3500 includes performing a conversion between a video comprising a plurality of pictures and a bitstream of the video, wherein each picture comprises an alpha layer, wherein the bitstream comprises a current block in the alpha layer of a current picture that is predicted from one or more reference blocks in the base layer. For example, in an aspect, the computing device 3402, the processor 3404, the memory 3406, the encoding component 3410, the base layer coding component 3420, and/or the alpha layer coding component 3425 may be configured to or may comprise means for performing a conversion between a video comprising a plurality of pictures and a bitstream of the video, wherein each picture comprises an alpha layer, wherein the bitstream comprises a current block in the alpha layer of a current picture that is predicted from one or more reference blocks in the base layer.

For example, the base layer coding component 3420 may generate base layer information 3430 from a base layer of a plurality of pictures 3440(1)-(N). In some aspects, the base layer corresponds to the color channel of a plurality of pictures 3440(1)-(N). Further, in some aspects, the base layer coding component 3420 may determine the base layer information 3430 via a first coding process, e.g., HEVC or VVC, in accordance with various aspects of the disclosure. Further, the alpha layer coding component 3425 may receive the plurality of pictures 3440(1)-(N) including an alpha layer corresponding to a degree of transparency of the picture, and predict a first block associated with the alpha layer during a second coding process based on one or more reference blocks 3442(1)-(N) (e.g., a plurality of previously-coded blocks) associated with the base layer when generating the alpha layer information 3444. Further, the first block may be in a different picture 3440 from the one or more previously-coded pictures. For instance, the prediction block of the alpha layer information 3444 may be generated based on the last one, two, or four coded pictures 3440. In some examples, the alpha layer coding component 3425 may predict the current block based on at least one of a weighted average function, a maximum function, or a filtering function applied to samples of the previously-coded blocks. In some examples, the alpha layer coding component 3425 may predict the current block based on determining the weighted average of a plurality of reference blocks 3442. In some examples, as described herein, the alpha layer coding component 3425 may predict the current block based on motion information associated with one or more reference blocks. Further, for example, the predicting at block 3302 may be performed to take advantage of inter-layer correlations between alpha channels and base channels in different images and/or videos, thereby improving the efficiency of the encoding process implemented by the encoding component 3410. In addition, the bit stream generating component 3450 may generate an encoded bitstream 3452 from the alpha layer information 3444 received from the alpha layer coding component 3425, wherein the alpha layer information 3444 are generated using a block prediction determined by the alpha layer coding component 3425.

In some aspects, the encoded bitstream 3452 may be generated without reference picture information (e.g., RPS, RPL). Additionally, in some aspects, the encoded bitstream 3452 may be generated without an indication of a prediction direction (e.g. inter_pred_idc in the HEVC specification). In some other aspects, the encoded bitstream 3452 may be generated to signal motion information of the one or more reference blocks, and/or an indices of the pictures containing the one or more reference blocks. Further, the encoded bitstream may generated be with or without signaling motion information of the one or more reference blocks based on at least one of header information (e.g., a DPS/SPS/VPS/PPS/APS/picture header/slice header/tile group header/ Largest coding unit (LCU)/Coding unit (CU)/LCU row/group of LCUs/TU/PU block/Video coding unit), a position of a coding unit, coded mode information for blocks containing a sample at an edge, block dimension information, block shape information, a color format indication (e.g., 4:2:0, 4:4:4, RGB or YUV)), a coding tree structure, color component information, a temporal layer identifier, or coding standard information (e.g., a profile, a level, and/or a tier of a coding standard). In some aspects, profiles, tiers, and levels specify conformance points for implementing the standard in an interoperable way across various applications that have similar functional requirements. A profile defines a set of coding tools or algorithms that can be used in generating a conforming bitstream, whereas a level places constraints on certain key parameters of the bitstream, corresponding to decoder processing load and memory capabilities. Level restrictions are established in terms of maximum sample rate, maximum picture size, maximum bit rate, minimum compression ratio and capacities of the DPB, and the coded picture buffer (CPB) that holds compressed data prior to its decoding for data flow management purposes.

Figure 36:
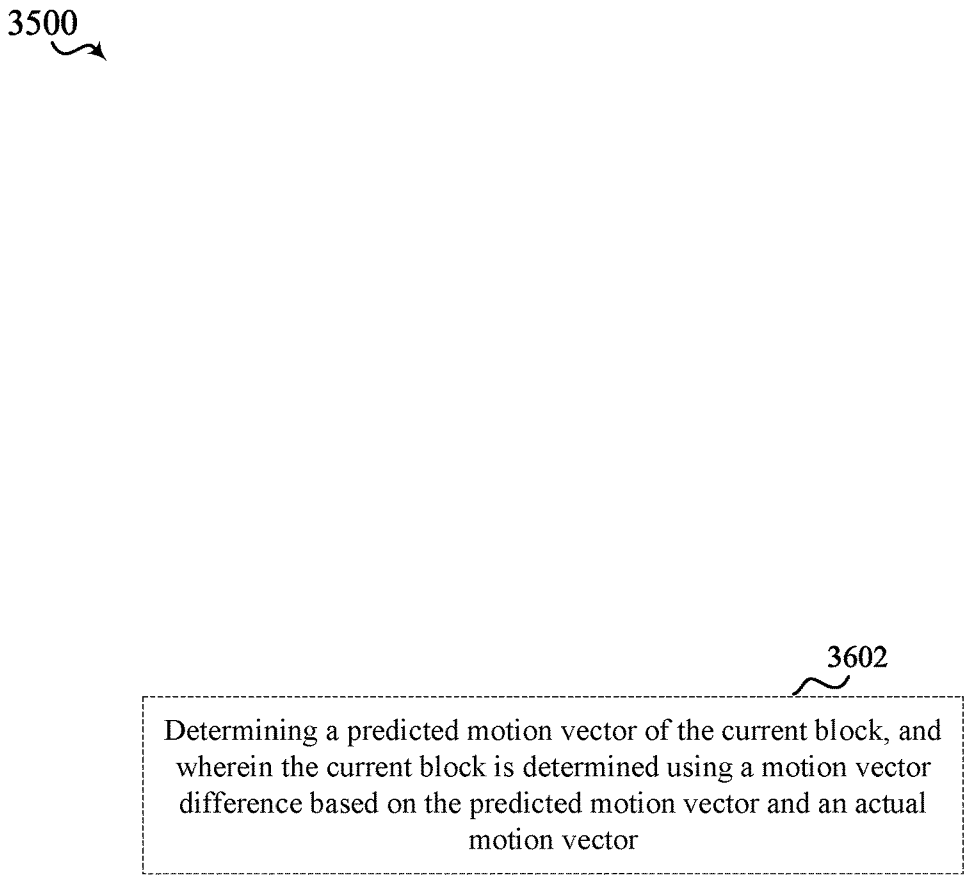
FIG. 36 is a flowchart of a ninth example method for video processing, in accordance with some aspects of the present disclosure.

In an optional aspect, referring to FIG. 36, at block 3602, the method 3500 may further include determining a predicted motion vector of the current block, and wherein the current block is determined using a motion vector difference based on the predicted motion vector and an actual motion vector. For example, in an aspect, the computing device 3402, the processor 3404, the memory 3406, and/or the alpha layer coding component 3425 may be configured to or may comprise means for determining a predicted motion vector of the current block, and wherein the current block is determined using a motion vector difference based on the predicted motion vector and an actual motion vector.

For example, the determining at block 3602 may include predicting a MV of the current block of the plurality of pictures 344 (1)-(N), and comparing the predicted MV to a plurality of reference MVs corresponding to one or more frames other than the frame including the current block. In some examples, the one or more reference blocks may share the same MV prediction. In some other examples, the one or more reference blocks may have different MV predictions.

Further, the bitstream generation component 3450 may generate a signal corresponding to the predicted MV or the MVD determined from the predicted MV and the plurality of reference MVs. Further, an index of the reference picture may be signaled ahead of the MV or MVD. In some aspects, the index of the reference picture may be signaled ahead of the MV or MVD based at least in part on the value of the index. Alternatively, in some aspect, the MV or MVD may be inferred.

The detailed inventions below should be considered as examples to explain general concepts. These inventions should not be interpreted in a narrow way. Furthermore, these inventions can be combined in any manner.

Coding Tools Selection for Alpha Layer Coding

1. The syntax elements used for coding the alpha layer may be different from those for coding the base layer (e.g., the luma component).
   a. In one example, certain syntax elements may be not coded during the coding of the alpha layer while they are coded during the coding the base layer.
2. The decoding process of the alpha layer may be different from those for the base layer (e.g., the luma component).
   a. In one example, the intra prediction process or the interpolation process may be defined according to the layer information.
3. It is proposed to disable a coding tool denoted by X when coding the alpha layer.
   a. X denote a tool in the loop filtering process.
      i. X is SAO, ALF or/and deblocking filters, etc.
   b. X may be the intra boundary filter/intra smooth filter.
   c. X may be the PDPC.
   d. X may be the LMCS.
   e. X may be the TMVP/DMVR/BDOF/AFFINE.
   f. Alternatively, furthermore, a conformance bitstream shall satisfy that the coding tool X is disabled for coding the alpha layer.
   g. Alternatively, furthermore, indication of the coding tool X is not present in the bitstream for coding the alpha layer.
      i. Alternatively, furthermore, when not present, the tool X is inferred to be disabled.
4. It is proposed to only enable a coding prediction mode denoted by X when coding the alpha layer.
   a. In one example, X is the palette mode.
   b. In one example, X is the intra prediction mode.
   c. In one example, X is the IBC prediction mode.
      i. Alternatively, furthermore, for the first block to be decoded, its prediction samples may be set to default values.
   d. In one example, X is the Transform Skip Residual Coding (TSRC) in the VVC design.
   e. In one example, X is the BDPCM mode.
   f. Alternatively, furthermore, indication of all the other coding prediction modes are not present.
   g. In one example, the above methods are only applied to intra pictures/intra slices in the alpha layer.
5. It is proposed to only enable a residual coding method denoted by X when coding the alpha layer.
   a. In one example, the X is the Transform Skip Residual Coding (TSRC) in the VVC design.
6. It is proposed to only enable a limited set of intra prediction modes for coding the alpha layer instead of all supported intra prediction modes for coding the base layer.
   a. In one example, the limited set of intra prediction modes may include one or multiple of the vertical, horizontal, DC, intra prediction mode.
   b. In one example, number of intra prediction modes in the limited set may be set to 1.
      i. In one example, X is the planar mode. (e.g., the INTRA_PLANAR in the HEVC specification).
      ii. Alternatively, in one example, X is the DC mode. (e.g., the INTRA_DC in the HEVC specification).
      iii. Alternatively, in one example, X is the vertical prediction mode. (e,g., the INTRA_ANGULAR26 in the HEVC specification).
      iv. Alternatively, in one example, X is the horizontal prediction mode. (e,g., the INTRA_ANGULAR10 in the HEVC specification).
      v. Alternatively, furthermore, indication of intra prediction mode for a block in the alpha layer may be not present.
   c. Alternatively, furthermore, the signalling of the intra prediction mode for a block in the alpha layer may be dependent on the limited set.
      i. In one example, the signalling of the remaining intra prediction mode may depend on the number of intra prediction modes in the limited set.
7. It is proposed that only integer MVs/MVDs are allowed.
8. Only certain partition types (e.g., 2N×2N, or QT) and/or certain CU size is allowed for coding the alpha layer.

a. Alternatively, furthermore, the signaling of partition types (e.g. the part_mode in the HEVC specification) is not present in the bitstream.
b. Alternatively, furthermore, the signalling of split flag (e.g., the split_cu_flag in the HEVC specification) is not present in the bitstream.
c. Alternatively, furthermore, the TU size is limited to be equal to the CU size.

Cross Layers Prediction

9. It is proposed that the information of one layer among the two layers (i.e., base layer and alpha layer) may be used for coding the other layer.
a. In one example, the information of a block in one layer may be used for context modeling when coding the information of another block in the other layer.
i. Alternatively, the information of a block in in one layer may be directly inherited by another block in the other layer, and signalling of the information of the another block is skipped.
b. In one example, the information of a block in one layer may be used as a predictor for coding the information of another block in the other layer.
c. In one example, the information of base layer may be used for coding alpha layer.
d. Alternatively, the information of alpha layer may be used for coding base layer.
e. In one example, the information of a block in one layer may directly use the information of the co-located block in the other layer.
f. In one example, the information of a block in one layer may be predicted from the luma component of the other layer.
g. In one example, the information of a block in one layer may be predicted from the luma component of the other layer after bit-depth alignment.
h. In one example, the information mentioned above may include the following:
i. In one example, the information may be the intra prediction mode.
ii. In one example, the information may be the motion information, e.g., motion vectors, reference picture indices.
iii. In one example, the information may be the motion candidate index (e.g., AMVP index, merge index).
iv. In one example, the information may be related to the partitions (e.g. split flags).

Let R be a Reference Block, C be the Current Block to be Reconstructed in the Alpha Layer 10. A block in the one layer among the two layers (i.e., base layer and alpha layer) may be reconstructed based on the samples of one or more blocks in another layer.
a. In one example, the block C may be predicted from one or multiple reference blocks in the base layer.
b. In one example, a reference block may be the co-located luma block.
c. In one example, a reference block may be a neighboring block around the co-located luma block.
d. In one example, C may be derived by R*a+b.
i. In one example, a may be 1 and b may be 0.
e. In one example, C may be derived by (R<<a)+b
i. In one example, a and b may be 0.
f. In one example, C may be derived by (R>>a)+b
i. In one example, a and b may be 0.
g. In one example, the reference blocks may denote the samples before the loop filtering process (e.g. SAO, ALF, Deblocking filters)
i. Alternatively, in one example, the reference blocks may denote the samples after the loop filtering process (e.g. SAO, ALF, Deblocking filters)

1-Pass Encoding

11. It is proposed that one pass coding for the two layers (i.e., base layer and alpha layer) wherein the information related to the color channel and alpha channel may be interleaved in the bitstream.
a. In one example, the color channels and alpha channel may be interleaved CTU-by-CTU.
b. One or more syntaxes are additionally signaled for each frame to separate the bitstreams of color channel and alpha channel.

Joint Coding for Different Pictures with Alpha Channel

Let $N_i$ be the $i^{th}$ picture.

12. It is proposed that only one cross-picture prediction method is allowed for coding blocks in the alpha layer wherein in the cross-picture method, wherein at least one of one or multiple reference blocks in other pictures may be utilized. The one or multiple reference blocks are in the base layer.
a. Alternatively, furthermore, other prediction methods that utilize the information of current picture may be allowed.
b. Alternatively, furthermore, the other pictures wherein the reference blocks are from may be pre-defined, such as the ones which are the previously coded K frames.
i. In one example, K is equal to 1, 2, 4.
ii. In one example, the information of reference pictures (e.g., RPS, RPL) is not present in the bitstream even the current picture uses the cross-picture prediction.
c. Alternatively, furthermore, the indication of prediction direction (e.g. inter_pred_idc in the HEVC specification) is not present in the bitstream.
d. In one example, the cross-picture prediction method may be defined as a function of samples in the multiple reference blocks, such as weighted average, maximum, being filtered via a filtering function.
e. In one example, a block of $N_i$ in the alpha channel may be predicted from the weighted average of multiple reference blocks.
i. In one example, the weights may be equal.
ii. In one example, the motion information of a reference block may be explicitly signalled in the bitstream.
a. The index of the picture containing the reference block may be explicitly signalled in the bitstream.
a. Alternative, in one example, the index of the picture containing the reference block may be inferred.
i. In one example, the index of the picture containing the reference block may be set equal to M.
b. The motion vector may be explicitly signalled in the bitstream.
a. Alternative, in one example, the motion vector may be inferred.
i. In one example the motion vector may be set equal to (x,y).

c. The motion vector may be first predicted by a motion vector prediction then the motion vector difference is explicitly signalled in the bitstream.
a. In one example, the motion vector prediction may be the motion vectors of the pictures other than
b. In one example, all reference blocks may share a same motion vector prediction.
i. In one example, one or more reference blocks may have different motion vector predictions.
c. In one example, the motion vector difference may be inferred.
i. In one example the motion vector difference may be set equal to (x,y).
d. In one example, the index of reference picture is signalled ahead of the motion vector or motion vector difference, the motion vector or motion vector difference may be signalled based on the value of the index of reference picture .
i. In one example, the motion vector or motion vector difference may be signalled when the index of reference picture is equal to M.
1. Alternatively, in one example, the motion vector or motion vector difference may be inferred when the index of reference picture is not equal to M.
ii. In one example, the motion vector or motion vector difference may be signalled when the index of reference picture is not equal to M.
1. Alternatively, in one example, the motion vector or motion vector difference may be inferred when the index of reference picture is equal to M.
iii. In one example, the motion information of some reference blocks may be signalled and other reference blocks may be inferred.
a. In one example, whether to signal or infer a motion information of a reference block may be based on
a. A message signaled in the DP S/SP S/VP S/PP S/AP S/picture header/slice header/tile group header/ Largest coding unit (LCU)/Coding unit (CU)/LCU row/group of LCUs/TU/PU block/ Video coding unit
b. Position of CU/PU/TU/block/Video coding unit
c. Coded modes of blocks containing the samples along the edges
d. Block dimension/Block shape of current block and/or its neighboring blocks
e. Indication of the colour format (such as 4:2:0, 4:4:4, RGB or YUV)
f. Coding tree structure (such as dual tree or single tree)
g. Slice/tile group type and/or picture type
h. Colour component (e.g. may be only applied on Cb or Cr)
i. Temporal layer ID
j. Profiles/Levels/Tiers of a standard General Claim 13. In the above examples, a, b, x, y, M, and/or K are integer numbers (e.g. 0 or 1) and may depend on
a. A message signaled in the DPS/SPS/VPS/PPS/APS/ picture header/slice header/tile group header/Largest coding unit (LCU)/Coding unit (CU)/LCU row/group of LCUs/TU/PU block/Video coding unit
b. Position of CU/PU/TU/block/Video coding unit
c. Coded modes of blocks containing the samples along the edges
d. Block dimension/Block shape of current block and/or its neighboring blocks
e. Indication of the colour format (such as 4:2:0, 4:4:4, RGB or YUV)
f. Coding tree structure (such as dual tree or single tree)
g. Slice/tile group type and/or picture type
h. Colour component (e.g. may be only applied on Cb or Cr)
i. Temporal layer ID
j. Profiles/Levels/Tiers of a standard
k. Alternatively, a and b may be signalled to the decoder.

Clause 1. A method of video processing, comprising:
performing a conversion between a video comprising a plurality of pictures and a bitstream of the video, wherein each picture comprises an alpha layer and at least one base layer;
wherein the bitstream comprises first layer information which is utilized in a first process performed on the at least one base layer and second layer information which is utilized in a second process performed on the alpha layer.

Clause 2. The method of any preceding clause, wherein the at least one base layer corresponds to at least one color channel of the plurality of pictures, and the alpha layer corresponds to a degree of transparency of the plurality of pictures.

Clause 3. The method of any preceding clause, wherein the first layer information is determined based on the first process using a first plurality of syntax elements, and the second layer information is determined based on the second process using a second plurality of syntax elements different from the first plurality of syntax elements.

Clause 4. The method of any preceding clause, wherein the first plurality of syntax elements comprise at least one syntax element that is excluded from the second plurality of syntax elements.

Clause 5. The method of any preceding clause, wherein the second process is different from the first process.

Clause 6. The method of any preceding clause, wherein the first process, based on the first layer information for the at least one base layer, and the second process, based on the second layer information for the alpha layer, use at least one of a layer-specific intra prediction process or a layer-specific interpolation process.

Clause 7. The method of any preceding clause, wherein when determining the second layer information, at least one coding tool for performance of the second process on the alpha layer is disabled.

Clause 8. The method of any preceding clause, wherein the at least one coding tool includes at least one of a loop filtering process tool, a sample adaptive offset (SAO), an adaptive loop filter (ALF), a deblocking filter, an intra boundary filter, an intra smooth filter, a position dependent intra prediction combination method (PDPC), a luma mapping with chroma scaling (LMCS), a temporal motion vector prediction (TMVP), a decoder side motion vector refinement (DMVR), a bi-directional optical flow (BDOF), or an affine motion compensation prediction (AMCP).

Clause 9. The method of any preceding clause, wherein the bitstream is a conformance bitstream that at least one coding tool is disabled during the second process.

Clause 10. The method of any preceding clause, wherein when a syntax element that indicates whether the coding tool is enabled or disabled during the second process is excluded from the bitstream, the coding tool is inferred to be disabled.

Clause 11. The method of any preceding clause, wherein at least one coding prediction tool is enabled for performance of the second process on the alpha layer and the at least one coding prediction tool is disabled for performance of the first process on the at least one base layer.

Clause 12. The method of any preceding clause, wherein the at least one coding prediction tool includes a palette mode, an intra prediction mode, an intra block copy (IBC) prediction mode, a transform skip residual coding (TSRC) mode, a block-based quantized residual domain delta pulse code modulation mode.

Clause 13. The method of any preceding clause, wherein the at least one coding prediction tool is applied to intra pictures or intra slices within the alpha layer.

Clause 14. The method of any preceding clause, wherein a specific residual coding mode is enabled for performance of the second process on the alpha layer.

Clause 15. The method of any preceding clause, wherein the specific residual coding mode includes a transform skip residual coding (TSRC) mode, and a residual coding for transform mode is disabled for performance of the second process on the alpha layer.

Clause 16. The method of any preceding clause, wherein a first plurality of intra-prediction modes are used for performance of the first process on the at least one base layer, and a second plurality of intra-prediction modes are used for performance of the second process on the alpha layer, an amount of the first plurality of intra-prediction modes being greater than an amount of the second plurality of intra-prediction modes.

Clause 17. The method of any preceding clause, wherein the second plurality of intra-prediction modes include at least one of a vertical prediction mode, a horizontal prediction mode, a DC prediction mode, or a portion of all intra-prediction modes.

Clause 18. The method of any preceding clause, wherein a present of a syntax element of an intra-prediction mode for a block in the alpha layer is based on the second plurality of intra-prediction modes.

Clause 19. The method of any preceding clause, wherein the syntax element of remaining intra prediction modes is present based on the number of the second plurality of intra-prediction modes.

Clause 20. The method of any preceding clause, wherein only integer motion vectors and/or motion vector differences are used for performance of the second process on the alpha layer.

Clause 21. The method of any preceding clause, wherein a particular partition type of a plurality of partition types for partitioning prediction blocks are used for performance of the second process on the alpha layer.

Clause 22. The method of any preceding clause, wherein the particular partition type is 2Nx2N or quadtree (QT).

Clause 23. The method of any preceding clause, wherein a syntax element that indicates the particular partition type is excluded from the bitstream.

Clause 24 The method of any preceding clause, wherein a particular coding unit size is used for performance of the second process on the alpha layer.

Clause 25. The method of any preceding clause, wherein a split flag to indicate splitting a block is excluded from the bitstream.

Clause 26. The method of any preceding clause, wherein transform units used to encode a prediction residual are identical with coding units for performance of the second process on the alpha layer.

Clause 27. The method of any preceding clause, wherein the conversion is performed in a single-pass conversion between the alpha layer and the at least one base layer, and the first layer information and the second layer information are interleaved in the bitstream.

Clause 28. The method of any preceding clause, wherein the first layer information and the second layer information are interleaved in a coding tree unit (CTU) basis. Clause 29. The method of any preceding clause, wherein one or more syntax elements are included in the bitstream for a picture to separate the first layer information and the second layer information.

Clause 30. The method of any preceding clause, wherein a first plurality of units corresponding to the first layer or the second plurality of units corresponding to the second layer include a plurality of network abstraction layer (NAL) units.

Clause 31. The method of any preceding clause, wherein the conversion includes encoding the video into the bitstream.

Clause 32. The method of any preceding clause, wherein the conversion includes decoding the video from the bitstream.

Clause 33. The method of any preceding clause, wherein the conversion includes generating the bitstream from the video; and wherein the method further comprising:

a. storing the bitstream in a non-transitory computer-readable recording medium.

Clause 34. An apparatus for processing video data comprising a processor and a non-transitory memory with instructions thereon, wherein the instructions upon execution by the processor, cause the processor to:

perform a conversion between a video comprising a plurality of pictures and a bitstream of the video, wherein each picture comprises an alpha layer and at least one base layer;

wherein the bitstream comprises first layer information which is utilized in a first process performed on the at least one base layer and second layer information which is utilized in a second process performed on the alpha layer.

Clause 35. A non-transitory computer-readable recording medium storing a bitstream of a video which is generated by a method performed by a video processing apparatus, wherein the method comprises:

generating a bitstream of the video from the video comprising a plurality of picture, wherein each picture comprises an alpha layer and at least one base layer;

wherein the bitstream comprises first layer information which is utilized in a first process performed on the at least one base layer and second layer information which is utilized in a second process performed on the alpha layer.

Clause 36. A non-transitory computer-readable storage medium storing instructions that cause a processor to:

perform a conversion between a video comprising a plurality of pictures and a bitstream of the video, wherein each picture comprises an alpha layer and at least one base layer;

wherein the bitstream comprises first layer information which is utilized in a first process performed on the at least one base layer and second layer information which is utilized in a second process performed on the alpha layer.

Clause 37. A method of video processing, comprising:

determining, for a conversion between a video comprising a plurality of pictures and a bitstream of the video, first layer information which is utilized in a first process performed on a first layer of each picture;

determining, second layer information which is utilized in a second process performed on a second layer of each picture; and performing the conversion for the second layer based on the first layer information and the second layer information.

Clause 38. The method of any preceding clause, wherein the first layer is a base layer corresponding to a color channel of the plurality of pictures, and the second layer is an alpha layer corresponding to a degree of transparency of the plurality of pictures.

Clause 39. The method of any preceding clause, wherein the first layer is an alpha layer corresponding to a degree of transparency of the plurality of pictures, and the second layer is a base layer corresponding to a color channel of the plurality of pictures.

Clause 40. The method of any preceding clause, wherein a first plurality of units corresponding to the first layer and a second plurality of units corresponding to the second layer include a plurality of network abstraction layer (NAL) units.

Clause 41. The method of any preceding clause, wherein the first layer information includes first block information of a first block in the first layer.

Clause 42. The method of any preceding clause, further comprising determining a context modeling for context-based adaptive binary arithmetic coding (CABAC) based on the first block information, wherein the context modeling based on the first block information is used for coding a second block in the second layer.

Clause 43. The method of any preceding clause, wherein second block information of a second block in the second layer is inherited from the first block information and the second block information is excluded in the bitstream.

Clause 44. The method of any preceding clause, wherein the first block information is used as a predictor for coding second block information of a second block in the second layer.

Clause 45. The method of any preceding clause, wherein the first block information is used for coding a second block in the second layer, and wherein the first block has a same top-left position and a same size with those of the second block.

Clause 46. The method of any preceding clause, further comprising determining prediction information based on a portion of the first layer information associated with a luma component of the first layer; and wherein the second layer information is determined based on the prediction information.

Clause 47. The method of any preceding clause, further comprising:

performing a bit depth alignment on a plurality of samples of the first layer to determine bit aligned sample information as the first layer information; and determining prediction information based on a portion of the first layer information associated with a luma component of the first layer; and wherein the second layer information is determined based on the prediction information.

Clause 48. The method of any preceding clause, wherein the first layer information includes at least one of the following: intra-prediction mode information, motion information, a motion candidate index, or partition information for block structures of the first process and the second process.

Clause 49. The method of any preceding clause, further comprising:

a second block in the second layer is reconstructed based on samples of at least a first block in the first layer.

Clause 50. The method of any preceding clause, wherein the first block has a same top-left position and a same size with those of the second block or neighboring blocks around the first block.

Clause 51. The method of any preceding clause, wherein the second block is reconstructed by performing a bitwise operation on the first block.

Clause 52. The method of any preceding clause, wherein the bitwise operation is denoted by $C=R*a+b$; where C is a sample of the second block, and R is a sample of the first block, a and b are constant.

Clause 53. The method of any preceding clause, wherein $a=1$, $b=0$.

Clause 54. The method of any preceding clause, wherein the bitwise operation is denoted by $C=(R<<a)+b$ or by $C=(R>>a)+b$; where C is a sample of the second block, and R is a sample of the first block, a and b are constant.

Clause 55. The method of any preceding clause, wherein $a=0$, $b=0$.

Clause 56. The method of any preceding clause, wherein the first block is denoted by the samples before performing a loop filtering process or by the samples after performing a loop filtering process.

Clause 57. The method of any preceding clause, wherein the loop filtering process includes at least one of sample adaptive offset (SAO), adaptive loop filter (ALF) or deblocking filters.

Clause 58. The method of any preceding clause, wherein the conversion includes encoding the video into the bitstream.

Clause 59. The method of any preceding clause, wherein the conversion includes decoding the video from the bitstream.

Clause 60. The method of any preceding clause, wherein the conversion includes generating the bitstream from the video; and wherein the method further comprising:

storing the bitstream in a non-transitory computer-readable recording medium.

Clause 61. An apparatus for processing video data comprising a processor and a non-transitory memory with instructions thereon, wherein the instructions upon execution by the processor, cause the processor to:

determine, for a conversion between a video comprising a plurality of pictures and a bitstream of the video, first layer information which is utilized in a first process performed on a first layer of each picture;

determine, second layer information which is utilized in a second process performed on a second layer of each picture; and perform the conversion for the second layer based on the first layer information and the second layer information.

Clause 62. A non-transitory computer-readable recording medium storing a bitstream of a video which is generated by a method performed by a video processing apparatus, wherein the method comprises:

determining, for a conversion between a video comprising a plurality of pictures and a bitstream of the video, first layer information which is utilized in a first process performed on a first layer of each picture;

determining, second layer information which is utilized in a second process performed on a second layer of each picture; and generating a bitstream of the video from the video comprises the second layer based on the first layer information and the second layer information, wherein the first layer information and the second layer information is utilized for the second layer.

Clause 63. A non-transitory computer-readable storage medium storing instructions that cause a processor to:

determine, for a conversion between a video comprising a plurality of pictures and a bitstream of the video, first layer information which is utilized in a first process performed on a first layer of each picture;

determine, second layer information which is utilized in a second process performed on a second layer of each picture; and perform the conversion for the second layer based on the first layer information and the second layer information.

Clause 64. A method for video decoding, comprising:

performing a conversion between a video comprising a plurality of pictures and a bitstream of the video, wherein each picture comprises a first layer and a second layer;

wherein first layer information which is utilized in a first process performed on a first layer and second layer information which is utilized in a second process performed on a second layer are included in the bitstream; and wherein the second process comprises a reconstruction in which a second block in the second layer is reconstructed based on the samples of at least a first block in the first layer.

Clause 65. The method of any preceding clause, wherein the first layer is a base layer corresponding to a color channel of the plurality of pictures, and the second layer is an alpha layer corresponding to a degree of transparency of the plurality of pictures.

Clause 66. The method of any preceding clause, wherein the first layer is an alpha layer corresponding to a degree of transparency of the plurality of pictures, and the second layer is a base layer corresponding to a color channel of the plurality of pictures.

Clause 67. The method of any preceding clause, wherein the first block has a same top-left position and a same size with those of the second block or the neighboring blocks around the first block.

Clause 68. The method of any preceding clause, wherein the second block is reconstructed by performing a bitwise operation on the first block.

Clause 69. The method of any preceding clause, wherein the bitwise operation is denoted by $C=R*a+b$; where C is a sample of the second block, and R is a sample of the first block, a and b are constant.

Clause 70. The method of any preceding clause, wherein $a=1$, $b=0$.

Clause 71. The method of any preceding clause, wherein the bitwise operation is denoted by $C=(R<<a)+b$ or by $C=(R>>a)+b$; where C is a sample of the second block, and R is a sample of the first block, a and b are constant.

Clause 72. The method of any preceding clause, wherein $a=0$, $b=0$.

Clause 73 The method of any preceding clause, wherein the first block is denoted by the samples before performing a loop filtering process or by the samples after performing a loop filtering process.

Clause 74. The method of any preceding clause, wherein the loop filtering process includes at least one of sample adaptive offset (SAO), adaptive loop filter (ALF) or deblocking filters.

Clause 75. The method of any preceding clause, wherein the conversion includes encoding the video into the bitstream.

Clause 76. The method of any preceding clause, wherein the conversion includes decoding the video from the bitstream.

Clause 77. The method of any preceding clause, wherein the conversion includes generating the bitstream from the video; and wherein the method further comprising:

storing the bitstream in a non-transitory computer-readable recording medium.

Clause 78. An apparatus for processing video data comprising a processor and a non-transitory memory with instructions thereon, wherein the instructions upon execution by the processor, cause the processor to:

perform a conversion between a video comprising a plurality of pictures and a bitstream of the video, wherein each picture comprises a first layer and a second layer;

wherein first layer information which is utilized in a first process performed on a first layer and second layer information which is utilized in a second process performed on a second layer are included in the bitstream; and wherein the second process comprises a reconstruction in which a second block in the second layer is reconstructed based on the samples of at least a first block in the first layer.

Clause 79. A non-transitory computer-readable recording medium storing a bitstream of a video which is generated by a method performed by a video processing apparatus, wherein the method comprises:

generating a bitstream of the video from a video comprising a plurality of pictures, wherein each picture comprises a first layer and a second layer;

wherein first layer information which is utilized in a first process performed on a first layer and second layer information which is utilized in a second process performed on a second layer are included in the bitstream; and wherein the second process comprises a reconstruction in which a second block in the second layer is reconstructed based on the samples of at least a first block in the first layer.

Clause 80. A non-transitory computer-readable storage medium storing instructions that cause a processor to:

perform a conversion between a video comprising a plurality of pictures and a bitstream of the video, wherein each picture comprises a first layer and a second layer;

wherein first layer information which is utilized in a first process performed on a first layer and second layer information which is utilized in a second process performed on a second layer are included in the bitstream; and wherein the second process comprises a reconstruction in which a second block in the second layer is reconstructed based on the samples of at least a first block in the first layer.

Clause 81. A method of video processing, comprising:

performing a conversion between a video comprising a plurality of pictures and a bitstream of the video, wherein each picture comprises an alpha layer;

wherein the bitstream comprises a current block in the alpha layer of a current picture that is predicted from one or more reference blocks in the base layer.

Clause 82. The method of any preceding clause, wherein at least one of the one or more reference blocks is located in the current picture.

Clause 83. The method of any preceding clause, wherein at least one of the one or more reference blocks is located in at least one picture different from the current picture.

Clause 84. The method of any preceding clause, wherein the at least one picture comprises a predefined number (k) of previously-coded pictures.

Clause 85. The method of any preceding clause, wherein k=1, 2 or 4.

Clause 86. The method of any preceding clause, wherein the reference information of at least one picture is excluded from the bitstream.

Clause 87. The method of any preceding clause, wherein an indication of prediction direction for the current block is excluded from the bitstream.

Clause 88. The method of any preceding clause, wherein the current block is predicted by performing a function based on a sample of the one or more reference blocks.

Clause 89. The method of any preceding clause, wherein the function includes at least one of a weighted average, a maximum function, or a filtering function.

Clause 90. The method of any preceding clause, wherein weights in the function of weighted average are equal.

Clause 91. The method of any preceding clause, wherein motion information of at least one of the one or more reference blocks is included in the bitstream.

Clause 92. The method of any preceding clause, wherein the motion information includes an index of a picture including one of the one or more reference blocks.

Clause 93. The method of any preceding clause, wherein an index of a picture including one of the one or more reference blocks is excluded from the bitstream.

Clause 94. The method of any preceding clause, wherein the motion information includes a motion vector of one of the one or more reference blocks.

Clause 95. The method of any preceding clause, wherein a motion vector of one of the one or more reference blocks is excluded from the bitstream and inferred to a default value.

Clause 96. The method of any preceding clause, further comprising determining a predicted motion vector of the current block, and wherein the current block is determined using a motion vector difference based on the predicted motion vector and an actual motion vector.

Clause 97. The method of any preceding clause, wherein the bitstream includes the motion vector difference.

Clause 98. The method of any preceding clause, wherein the motion vector difference is excluded from the bitstream and inferred to a default value.

Clause 99. The method of any preceding clause, wherein the predicted motion vector of the current block is determined using a plurality of motion vectors corresponding to a plurality of different pictures.

Clause 100. The method of any preceding clause, wherein the current block is predicted using the one or more reference blocks, and the one or more reference blocks have a same predicted motion vector.

Clause 101. The method of any preceding clause, wherein the current block is predicted using the one or more reference blocks, and the one or more reference blocks have different motion vector predictions.

Clause 102. The method of any preceding clause, wherein the bitstream includes an index of a picture including one of one or more reference blocks prior to the motion vector difference.

Clause 103. The method of any preceding clause, wherein the bitstream includes a motion vector or a motion vector difference associated with one of one or more reference blocks based on an index of a picture including the one of one or more reference blocks.

Clause 104. The method of any preceding clause, further comprising determining whether to present motion information of one of one or more reference blocks within the bitstream or infer the motion information.

Clause 105. The method of any preceding clause, further comprising determining whether to present motion information of one of one or more reference blocks within the bitstream or infer the motion information based on at least one of header information, a position of a coding unit, coded mode information for blocks containing a sample at an edge, block dimension information, block shape information, a color format indication, a coding tree structure, color component information, a temporal layer identifier, or coding standard information.

Clause 106. The method of any preceding clause, wherein the conversion includes encoding the video into the bitstream.

Clause 107. The method of any preceding clause, wherein the conversion includes decoding the video from the bitstream.

Clause 108. An apparatus for processing video data comprising a processor and a non-transitory memory with instructions thereon, wherein the instructions upon execution by the processor, cause the processor to:

performing a conversion between a video comprising a plurality of pictures and a bitstream of the video, wherein each picture comprises an alpha layer;

wherein the bitstream comprises a current block in the alpha layer of a current picture that is predicted from one or more reference blocks in the base layer.

Clause 108. A non-transitory computer-readable recording medium storing a bitstream of a video which is generated by a method performed by a video processing apparatus, wherein the method comprises:

generating the bitstream from the video comprising a plurality of pictures, wherein each picture comprises an alpha layer;

wherein the bitstream comprises a current block in the alpha layer of a current picture that is predicted from one or more reference blocks in the base layer.

Clause 109. A non-transitory computer-readable storage medium storing instructions that cause a processor to:

performing a conversion between a video comprising a plurality of pictures and a bitstream of the video, wherein each picture comprises an alpha layer;

wherein the bitstream comprises a current block in the alpha layer of a current picture that is predicted from one or more reference blocks in the base layer.

Clause 110. A method for storing bitstream of a video, comprising:

generating the bitstream from the video comprising a plurality of pictures and the bitstream of the video, wherein each picture comprises an alpha layer, wherein the bitstream comprises a current block in the alpha layer of a current picture that is predicted from one or more reference blocks in the base layer; and storing the bitstream in a non-transitory computer-readable recording medium.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The previous description is provided to enable any person having ordinary skill in the art to practice the various aspects described herein. Various modifications to these aspects will be readily apparent to a person having ordinary skill in the art, and the generic principles defined herein may be applied to other aspects. The claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to a person having ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of video processing, comprising:

determining, for a conversion between a video comprising a plurality of pictures and a bitstream of the video, first layer information which is utilized in a first process performed on a first layer of each picture;

determining, second layer information which is utilized in a second process performed on a second layer of each picture; and performing the conversion for the second layer based on the first layer information and the second layer information, wherein the first layer is a base layer corresponding to a color channel of the plurality of pictures, the second layer is an alpha layer corresponding to a degree of transparency of the plurality of pictures, wherein the first layer information includes first block information of a first block in the first layer, and the method further comprises:

determining a predictive context based on the first layer information by performing a context modeling for context-based adaptive binary arithmetic coding (CABAC), the context modeling being determined based on the first block information; and determining the second layer information based on a second block in the second layer and the predictive context, wherein the conversion is performed in a single-pass conversion between the first layer and the second layer, the bitstream is generated by interleaving the first layer information and the second layer information in a coding tree unit basis and signaling one or more syntaxes for an individual frame to separate an alpha bitstream from a color bitstream, wherein performing the conversion for the second layer comprises:

predicting a current block in the alpha layer by determining a weighted average of a plurality of reference blocks associated with the base layer, wherein the plurality of reference blocks are from a plurality of previously-coded pictures, and wherein a syntax element used for coding the alpha layer by an alpha layer coding component is different from a syntax element used for coding the base layer by a base layer coding component, the alpha layer coding component disables a coding tool employed by the base layer coding component to determine the first layer information, the coding tool is a loop filtering process, and a conformance bitstream satisfies that the coding tool is disabled for coding the alpha layer of the plurality of pictures.

2. The method of claim 1, wherein the first block information is used as a predictor for coding second block information of a second block in the second layer.

3. The method of claim 1, wherein the first block information is used for coding a second block in the second layer, and wherein the first block has a same top-left position and a same size with those of the second block.

4. The method of claim 1, further comprising determining prediction information based on a portion of the first layer information associated with a luma component of the first layer; and wherein the second layer information is determined based on the prediction information.

5. The method of claim 1, further comprising:

performing a bit depth alignment on a plurality of samples of the first layer to determine bit aligned sample information as the first layer information; and determining prediction information based on a portion of the first layer information associated with a luma component of the first layer; and wherein the second layer information is determined based on the prediction information.

6. The method of claim 1, wherein the first layer information includes at least one of the following: intra-prediction mode information, motion information, a motion candidate index, or partition information for block structures of the first process and the second process.

7. The method of claim 1, further comprising:

a second block in the second layer is reconstructed based on samples of at least a first block in the first layer.

8. The method of claim 7, wherein the first block has a same top-left position and a same size with those of the second block or neighboring blocks around the first block.

9. The method of claim 7, wherein the second block is reconstructed by performing a bitwise operation on the first block.

10. The method of claim 9, wherein the bitwise operation is denoted by C=R*a+b; where C is a sample of the second block, and R is a sample of the first block, a and b are constant.

11. The method of claim 9, wherein the bitwise operation is denoted by C=(R<<a)+b or by C=(R>>a)+b; where C is a sample of the second block, and R is a sample of the first block, a and b are constant.

12. The method of claim 7, wherein the first block is denoted by the samples before performing a loop filtering process or by the samples after performing a loop filtering process.

13. The method of claim 12, wherein the loop filtering process includes at least one of sample adaptive offset (SAO), adaptive loop filter (ALF) or deblocking filters.

14. The method of claim 1, wherein the conversion includes encoding the video into the bitstream.

15. The method of claim 1, wherein the conversion includes decoding the video from the bitstream.

16. An apparatus for processing video data comprising a processor and a non-transitory memory with instructions thereon, wherein the instructions upon execution by the processor, cause the processor to:

determine, for a conversion between a video comprising a plurality of pictures and a bitstream of the video, first layer information which is utilized in a first process performed on a first layer of each picture;

determine, second layer information which is utilized in a second process performed on a second layer of each picture; and perform the conversion for the second layer based on the first layer information and the second layer information, wherein the first layer is a base layer corresponding to a color channel of the plurality of pictures, the second layer is an alpha layer corresponding to a degree of transparency of the plurality of pictures, wherein the first layer information includes first block information of a first block in the first layer, and the instructions further cause the processor to:

determine a predictive context based on the first layer information by performing a context modeling for context-based adaptive binary arithmetic coding (CABAC), the context modeling being determined based on the first block information; and determine the second layer information based on a second block in the second layer and the predictive context, wherein the conversion is performed in a single-pass conversion between the first layer and the second layer, the bitstream is generated by interleaving the first layer information and the second layer information in a coding tree unit basis and signaling one or more syntaxes for an individual frame to separate an alpha bitstream from a color bitstream, wherein the instructions causing the processor to perform the conversion for the second layer further cause the processor to:

predict a current block in the alpha layer by determining a weighted average of a plurality of reference blocks associated with the base layer, wherein the plurality of reference blocks are from a plurality of previously-coded pictures, and wherein a syntax element used for coding the alpha layer by an alpha layer coding component is different from a syntax element used for coding the base layer by a base layer coding component, the alpha layer coding component disables a coding tool employed by the base layer coding component to determine the first layer information, the coding tool is a loop filtering process, and a conformance bitstream satisfies that the coding tool is disabled for coding the alpha layer of the plurality of pictures.

17. A non-transitory computer-readable recording medium, wherein the computer-readable recording medium stores instructions, and the instructions, when executed by a processor, cause the processor to:

determine, for a conversion between a video comprising a plurality of pictures and a bitstream of the video, first layer information which is utilized in a first process performed on a first layer of each picture;

determine, second layer information which is utilized in a second process performed on a second layer of each picture; and generate generating a bitstream of the video from the video based on the first layer information and the second layer information, wherein the first layer is a base layer corresponding to a color channel of the plurality of pictures, the second layer is an alpha layer corresponding to a degree of transparency of the plurality of pictures, wherein the first layer information includes first block information of a first block in the first layer, and the instructions further cause the processor to:

determine a predictive context based on the first layer information by performing a context modeling for context-based adaptive binary arithmetic coding (CABAC), the context modeling being determined based on the first block information; and determine the second layer information based on a second block in the second layer and the predictive context, wherein the conversion is performed in a single-pass conversion between the first layer and the second layer, the bitstream is generated by interleaving the first layer information and the second layer information in a coding tree unit basis and signaling one or more syntaxes for an individual frame to separate an alpha bitstream from a color bitstream, wherein the instructions causing the processor to perform the conversion for the second layer further cause the processor to:

predict a current block in the alpha layer by determining a weighted average of a plurality of reference blocks associated with the base layer, wherein the plurality of reference blocks are from a plurality of previously-coded pictures, and wherein a syntax element used for coding the alpha layer by an alpha layer coding component is different from a syntax element used for coding the base layer by a base layer coding component, the alpha layer coding component disables a coding tool employed by the base layer coding component to determine the first layer information, the coding tool is a loop filtering process, and a conformance bitstream satisfies that the coding tool is disabled for coding the alpha layer of the plurality of pictures.

18. A non-transitory computer-readable storage medium storing instructions that cause a processor to:

determine, for a conversion between a video comprising a plurality of pictures and a bitstream of the video, first layer information which is utilized in a first process performed on a first layer of each picture;

determine, second layer information which is utilized in a second process performed on a second layer of each picture; and perform the conversion for the second layer based on the first layer information and the second layer information, wherein the first layer is a base layer corresponding to a color channel of the plurality of pictures, the second layer is an alpha layer corresponding to a degree of transparency of the plurality of pictures, wherein the first layer information includes first block information of a first block in the first layer, and the instructions further cause the processor to:

determine a predictive context based on the first layer information by performing a context modeling for context-based adaptive binary arithmetic coding (CABAC), the context modeling being determined based on the first block information; and determine the second layer information based on a second block in the second layer and the predictive context, wherein the conversion is performed in a single-pass conversion between the first layer and the second layer, the bitstream is generated by interleaving the first layer information and the second layer information in a coding tree unit basis and signaling one or more syntaxes for an individual frame to separate an alpha bitstream from a color bitstream, wherein the instructions causing the processor to perform the conversion for the second layer further cause the processor to:

predict a current block in the alpha layer by determining a weighted average of a plurality of reference blocks associated with the base layer, wherein the plurality of reference blocks are from a plurality of previously-coded pictures, and wherein a syntax element used for coding the alpha layer by an alpha layer coding component is different from a syntax element used for coding the base layer by a base layer coding component, the alpha layer coding component disables a coding tool employed by the base layer coding component to determine the first layer information, the coding tool is a loop filtering process, and a conformance bitstream satisfies that the coding tool is disabled for coding the alpha layer of the plurality of pictures.

* * * * *